US009648068B1

(12) United States Patent
Narsude et al.

(10) Patent No.: US 9,648,068 B1
(45) Date of Patent: May 9, 2017

(54) PARTITIONABLE UNIFIERS IN DISTRIBUTED STREAMING PLATFORM FOR REAL-TIME APPLICATIONS

(71) Applicant: DataTorrent Inc., Santa Clara, CA (US)

(72) Inventors: Chetan Narsude, Sunnyvale, CA (US); Thomas Weise, Mountain View, CA (US); Pramod Immaneni, San Jose, CA (US); Amol Kekre, Fremont, CA (US)

(73) Assignee: DataTorrent, Inc., Santa Clara, CA (US)

( * ) Notice: Subject to any disclaimer, the term of this patent is extended or adjusted under 35 U.S.C. 154(b) by 308 days.

(21) Appl. No.: 14/205,357

(22) Filed: Mar. 11, 2014

Related U.S. Application Data

(60) Provisional application No. 61/776,545, filed on Mar. 11, 2013, provisional application No. 61/838,870, filed on Jun. 24, 2013, provisional application No. 61/957,267, filed on Jun. 25, 2013.

(51) Int. Cl.
*G06F 17/30* (2006.01)
*H04L 29/06* (2006.01)

(52) U.S. Cl.
CPC .................... *H04L 65/60* (2013.01)

(58) Field of Classification Search
CPC .... H04L 67/10; H04L 65/60; G06F 17/30516
See application file for complete search history.

(56) References Cited

U.S. PATENT DOCUMENTS

| | | | |
|---|---|---|---|
| 2009/0024622 A1* | 1/2009 | Chkodrov | G06F 17/30463 |
| 2011/0154339 A1* | 6/2011 | Lee | G06F 9/5027 718/100 |
| 2011/0313844 A1* | 12/2011 | Chandramouli | G06Q 30/0241 705/14.42 |
| 2012/0078975 A1* | 3/2012 | Chen | G06F 17/30516 707/803 |

(Continued)

OTHER PUBLICATIONS

Miner et al., "MapReduce Design Patterns", Dec. 7, 2012, O'Reilly Media, Pertinent Section:The Effects of YARN.*

(Continued)

*Primary Examiner* — Chris Parry
*Assistant Examiner* — Stephen Houlihan
(74) *Attorney, Agent, or Firm* — Martine Penilla Group, LLP

(57) ABSTRACT

Software for a distributed streaming platform receives an application that runs on a streaming platform. The application is structured as a directed acyclic graph (DAG) with operators as nodes and streams as edges between nodes. The application includes an operator that receives a plurality of values, counts the values that are unique, and emits the unique values in a stream. The software partitions the operator into at least two partitioned instances. Then the software assigns a unique value emitting from a partitioned instance to one of a plurality of unifiers according to a pre-defined scheme. Each unifier creates a count of the unique values received by the unifier. Then the software transmits the counts from each of the unifiers to a downstream instance of an operator that aggregates the counts into a sum. And the software displays the sum in a graphical user interface (GUI).

20 Claims, 41 Drawing Sheets

(56) References Cited

U.S. PATENT DOCUMENTS

2013/0346625 A1* 12/2013 Lam ..................... G06F 9/542
    709/231

OTHER PUBLICATIONS

Neumeyer et al., S4: Distributed Stream Computing Platform, 2010 IEEE International Conference on Data Mining Workshops, pp. 170-177
Derrick Harris, 5 reasons why the future of Hadoop is real-time (relatively speaking) (Mar. 7, 2013).
Hortonworks.com, Introducing Apache Hadoop YARN (Aug. 3, 2012).
Hortonworks.com, Apache Hadoop YARN—Background and an Overview (Aug. 7, 2012).
Hortonworks.com, Apache Hadoop YARN—Concepts and Applications (Aug. 15, 2012).
Hortonworks.com, Moving Hadoop Beyond Batch with Apache YARN (May 15, 2013).
Nathan Marz, Documentation, storm Wiki, GitHub (downloaded on May 20, 2013).
Nathan Marz, Serialization, storm Wiki, GitHub (downloaded on May 20, 2013).
Chris Aniszczyk, Drinking from the Streaming API, Twitter Blog (/engineering) (Feb. 28, 2013).
Apache Flume, Flume 1.3.0 User Guide (downloaded on May 20, 2013).
Hadoop MapReduce Next Generation—Capacity Scheduler (downloaded on May 29, 2013).
S4: Distributed Stream Computing Platform (downloaded on Jun. 15, 2013).
Andy Feng, Storm and Hadoop: Convergence of Big-Data and Low-Latency Processing (Feb. 27, 2013).
Nathan Marz, Tutorial, storm Wiki, GitHub (downloaded on Sep. 3, 2013).
StreamBase, StreamBase Announces Hadoop Integration to Provide Real-Time Analytics for Big Data, HFT Review (Jun. 20, 2012).
Sam Ritchie, Streaming MapReduce with Summingbird (/2013/streaming-mapreduce-with-summingbird) (Sep. 3, 2013).
Twitter Developers, The Streaming APIs (Sep. 24, 2012).
Think Big, Ingestion and Streaming (downloaded on May 20, 2013).
Brian Proffitt, YARN expands Hadoop's big data wardrobe, ITworld.com (Aug. 21, 2012).
Ying Zhang et al., A Unified Approach to Fault Tolerance and Dynamic Power Management in Fixed-Priority Real-Time Embedded Systems, IEEE Transactions on Computer-Aided Design of Integrated Circuits and Systems, vol. 25, No. 1 (Jan. 2006).
Ju-kay Kwek, Google BigQuery gets smarter with large results, productivity improvements, and updated pricing, Google Official Enterprise Blog (Jun. 11, 2013).
Ju-kay Kwek, Stream your data into BigQuery in real-time, Google Official Enterprise Blog (Sep. 18, 2013).
Google BigQuery goes real-time with streaming inserts, time-based queries, and more, Google Platform Blog (Sep. 18, 2013).
The Reactive Manifesto, v1.1, (Sep. 23, 2013).

* cited by examiner

The components include
- STRAM: Streaming Application Master
- StramChild: STRAM's Hadoop Container Manager
- Webservice: Webservice provided by STRAM
- CLI: Command Line Interface
- DAG: Operators and Streams
- Buffer Server: Data flow server between writer and reader(s)
- Reservoir Buffer: Buffer that merges incoming streams into a single queue
- Hadoop Components: RM, Yarn, HDFS, Hadoop Containers

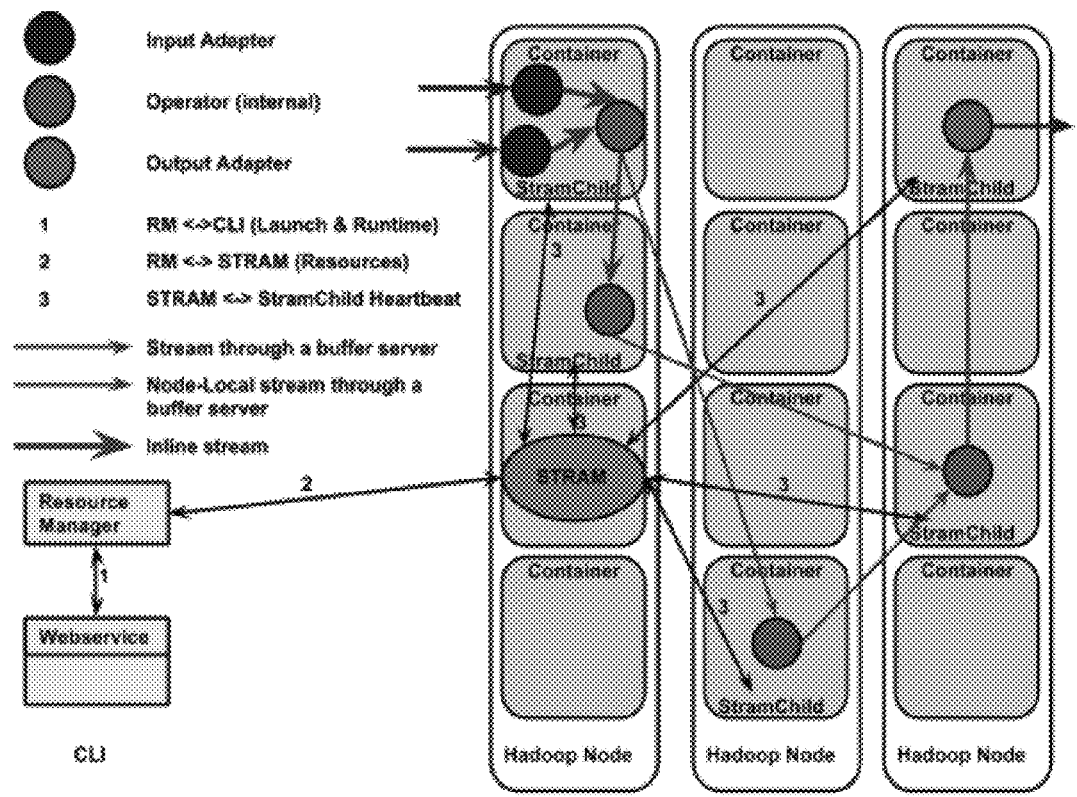

NO PARTITION
(NOT SCALABLE)

2.

ROUND-ROBIN PARTITION WITH
FALSE UNIQUES

3.

STICKY KEY PARTITION (e.g., BASED ON
FIRST LETTER OF SURNAME) RESULTING IN
NO FALSE UNIQUES, BUT SKEWED

PARTITIONABLE UNIFIERS

PARTITIONABLE UNIFIERS IN DISTRIBUTED STREAMING PLATFORM FOR REAL-TIME APPLICATIONS

RELATED APPLICATIONS

This application claims priority to U.S. Provisional Patent Application Ser. No. 61/776,545, entitled "Real-Time Streaming Platform for Hadoop", filed on Mar. 11, 2013, U.S. Provisional Patent Application Ser. No. 61/838,870, entitled "A Distributed Streaming Platform for Real-Time Applications", filed on Jun. 24, 2013, and U.S. Provisional Patent Application Ser. No. 61/957,267, entitled "Distributed Streaming Platform for Real-Time Applications", filed on Jun. 25, 2013. This application is related to U.S. patent application Ser. No. 13/927,108, entitled "Distributed Streaming Platform for Real-Time Applications", filed on Jun. 25, 2013. This application is also related to U.S. patent application Ser. No. 13/928,357, entitled "Dynamic Partitioning of Instances in Distributed Streaming Platform for Real-Time Applications", and U.S. patent application Ser. No. 13/928,351, entitled "Checkpointing in Distributed Streaming Platform for Real-Time Applications", and U.S. patent application Ser. No. 13/928,363, entitled "Dynamic Adjustments in Distributed Streaming Platform for Real-Time Applications", all of which were filed on Jun. 26, 2013.

Additionally, this application is related to U.S. patent application Ser. No. 14/203,551, entitled "Thread-Local Streams in Distributed Streaming Platform for Real-Time Applications", which was filed on Mar. 10, 2014. And this application is related to U.S. application Ser. No. 14/205,234, entitled "Formula-Based Load Evaluation in Distributed Streaming Platform for Real-Time Applications", and U.S. application Ser. No. 14/205,320, entitled "Scalable Local Cache in Distributed Streaming Platform for Real-Time Applications", both of which were contemporaneously filed.

The disclosures of all of the applications identified in the above paragraphs are incorporated herein by reference.

BACKGROUND

Streaming applications operate on input data which is not retrieved from persistent storage, but which arrives as one or more continuous sequence of items. Such input data might be streaming media such as streaming audio or streaming video. Or such input data might be other than streaming audio or streaming video, e.g., real-time streaming text. Examples of the latter type of input data include real-time electronic stock tickers published by financial websites such as Yahoo! Finance, CNBC, Bloomberg, or NASDAQ and real-time content streams published by websites such as Twitter and Facebook which leverage interest and/or social graphs.

As the sources of streaming data proliferate, scalability has become an issue for streaming applications that process such data and the platforms which run the streaming applications. Outside of the area of streaming applications, scalability has been addressed by distributed batch-processing platforms based on the Map-Reduce or similar frameworks. However, these platforms typically operate on input data originating in persistent storage, e.g., the persistent storage of the commodity servers that make up a Hadoop cluster. That is to say, in terms of a stock-and-flow model, these platforms operate on a stock rather than a flow (or stream).

Performance is also an issue for streaming applications and their platforms, since it is often desirable that a streaming application operate in real time or near real-time. In the past, streaming applications achieved real-time performance by sacrificing data integrity or data completeness. For distributed batch-processing platforms based on Map-Reduce and similar frameworks, real-time performance is often limited to accessing (e.g., using Pig, Scalding, Dremel, Drill, etc.) a store of indexed results that were generated offline.

Complicating matters still further, streaming applications tend to be non-stop, almost by definition. And consequently, fault tolerance is an important issue for streaming applications and the platforms on which they run.

SUMMARY

In an example embodiment, a method is described. The method is executed by one or more processors in real time or near real time rather than offline. According to the method, software for a distributed streaming platform receives an application that runs on a streaming platform. The application is structured as a directed acyclic graph (DAG) with operators as nodes and streams as edges between nodes. The application includes an operator that receives a plurality of values, counts the values that are unique, and emits the unique values in a stream. The software partitions the operator into at least two partitioned instances. Then the software assigns a unique value emitting from a partitioned instance to one of a plurality of unifiers according to a pre-defined scheme. Each unifier creates a count of the unique values received by the unifier. Then the software transmits the counts from each of the unifiers to a downstream instance of an operator that aggregates the counts into a sum. And the software displays the sum in a graphical user interface (GUI).

In another example embodiment, an apparatus is described, namely, computer-readable storage media which persistently store a program. The program might be software for a distributed streaming platform. The program is executed by one or more processors in real time or near real time rather than offline. The program receives an application that runs on a streaming platform. The application is structured as a directed acyclic graph (DAG) with operators as nodes and streams as edges between nodes. The application includes an operator that receives a plurality of values, counts the values that are unique, and emits the unique values in a stream. The program partitions the operator into at least two partitioned instances. Then the program assigns a unique value emitting from a partitioned instance to one of a plurality of unifiers according to a pre-defined scheme. Each unifier creates a count of the unique values received by the unifier. Then the program transmits the counts from each of the unifiers to a downstream instance of an operator that aggregates the counts into a sum. And the program displays the sum in a GUI.

Another example embodiment involves a method. The method is executed by one or more processors in real time or near real time rather than offline. According to the method, software for a distributed streaming platform receives an application that runs on a streaming platform. The application is structured as a directed acyclic graph (DAG) with operators as nodes and streams as edges between nodes. The application includes an operator that receives a plurality of values, counts the values that are unique, and emits the unique values in a stream. The software then partitions the operator into at least two partitioned instances. The partitioning is static partitioning in a specification for the application and the partitioning results in a round-robin distribution of values to the partitioned instances. The software assigns a unique value emitting from a partitioned instance to one of a plurality of unifiers according to a pre-defined scheme. Each unifier creates a count of the unique values received by the unifier. Then the software transmits the counts from each of the unifiers to a downstream instance of an operator that aggregates the counts into a sum. And the software displays the sum in a GUI.

Other aspects and advantages of the inventions will become apparent from the following detailed description, taken in conjunction with the accompanying drawings, which illustrates by way of example the principles of the inventions.

BRIEF DESCRIPTION OF THE DRAWINGS

FIG. 14B is a sequence diagram showing the initiation of a streaming application, in accordance with an example embodiment.

DETAILED DESCRIPTION

In the following description, numerous specific details are set forth in order to provide a thorough understanding of the example embodiments. However, it will be apparent to one skilled in the art that the example embodiments may be practiced without some of these specific details. In other instances, process operations and implementation details have not been described in detail, if already well known.

Figure 1:
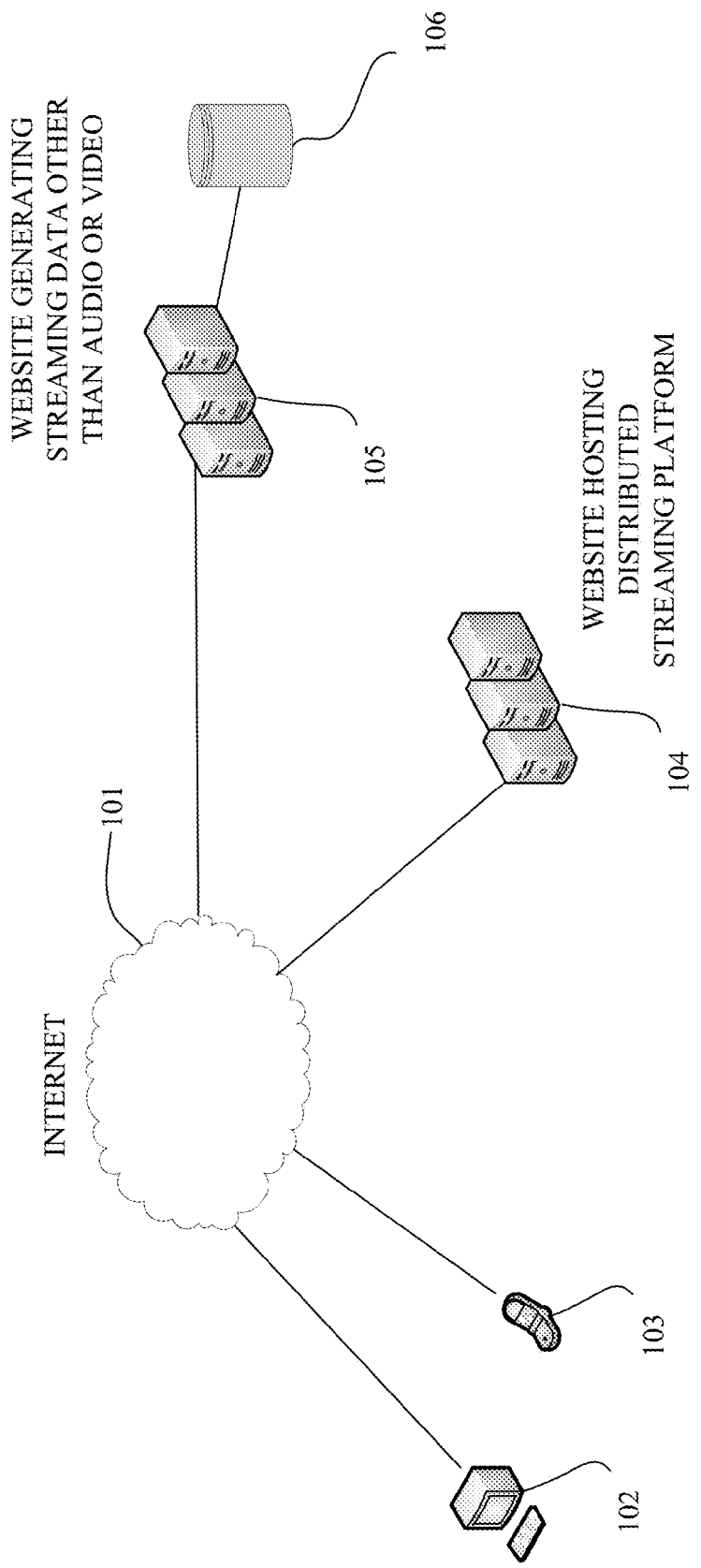
FIG. 1 is a diagram of a network with a website hosting a distributed streaming platform, in accordance with an example embodiment.

FIG. 1 is a diagram of a network with a website hosting a distributed streaming platform, in accordance with an example embodiment. As depicted in this figure, a personal computer 102 (e.g., a laptop or other mobile computer) and a mobile device 103 (e.g., a smartphone such as an iPhone, Android, Blackberry, etc.) are connected by a network 101 (e.g., a wide area network (WAN) including the Internet, which might be wireless in part or in whole) with a website 104 hosting a distributed streaming platform. In turn, website 104 is connected by the network 101 to a website generating streaming data in real-time (other than streaming audio or streaming video), such as Yahoo! Finance or Twitter. (In some of the examples described below, the stock ticker for Yahoo! Finance is used for illustrative purposes. However, other stock tickers such as CNBC, Bloomberg, and NASDAQ could easily have been substituted.) In an example embodiment, personal computer 102 and mobile device 103 might be used by end users who want to run and/or view a streaming application (e.g., a GUI dashboard) on website 104.

In an example embodiment, the website 104 might be composed of a number of servers connected by a network (e.g., a local area network (LAN) or a WAN) to each other in a cluster or other distributed system which might run website software (e.g., web server software, database software, etc.) and distributed-computing software. In an example embodiment, the website 105 might also be composed of a number of servers connected by a network to each other in a cluster or other distributed system which might run website software (e.g., web server software, database software, etc.) and distributed-computing and/or cloud software such as Hadoop, Hadoop Distributed File System (HDFS), Pig, CloudBase, etc. The servers at website 105 are also connected (e.g., by a storage area network (SAN)) to persistent storage 106. Persistent storage 106 might include a redundant array of independent disks (RAID) and/or flash memory. Persistent storage 106 might be used to store data related to the data streamed by website 105, e.g., financial data, content data for social/interest networks, etc.

In an alternative example embodiment, the servers in website 104 and website 105 and the persistent storage 106 might be hosted wholly or partially off-site in the cloud, e.g., as a platform-as-a-service (PaaS) or an infrastructure-as-a-service (IaaS).

Figure 2:
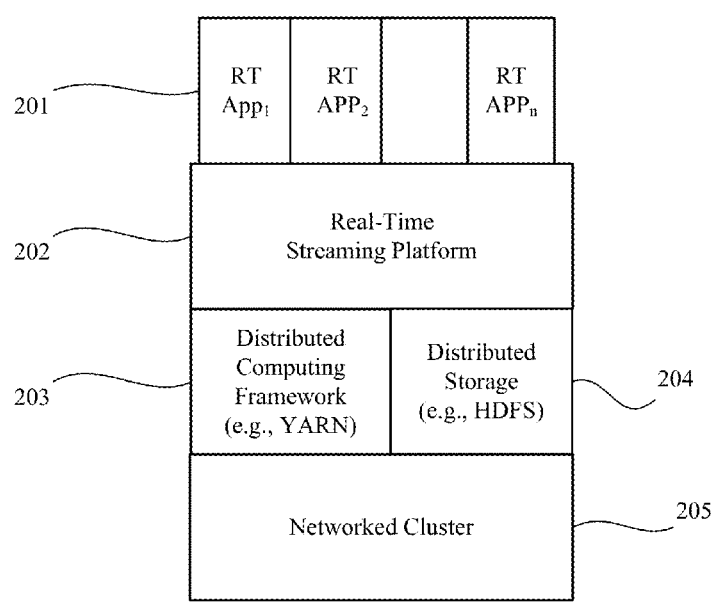
FIG. 2 is a diagram of a software stack for a distributed streaming platform, in accordance with an example embodiment.

FIG. 2 is a diagram of a software stack for a distributed streaming platform, in accordance with an example embodiment. As depicted in this figure, real-time applications 201 (RT App$_1$, RT App$_2$, etc.) might run on a distributed streaming platform 202, which, in turn, might be integrated with a distributed computing framework 203 such as YARN, in an example embodiment. YARN is in the Hadoop family of software but includes functionality for handling distributed computations that are not structured as batch jobs for Map-Reduce processing, including distributed computations that are streaming.

In turn, the distributed computing framework 203 might be supported by distributed storage 204, which might be Hadoop Distributed File System (HDFS), in an example embodiment. And the distributed computing framework 203 and distributed storage 204 might run on a networked cluster of servers (e.g., commodity servers) or other hardware computation units (e.g., the hardware computation units emanating from Facebook's Open Compute Project).

Figure 3:
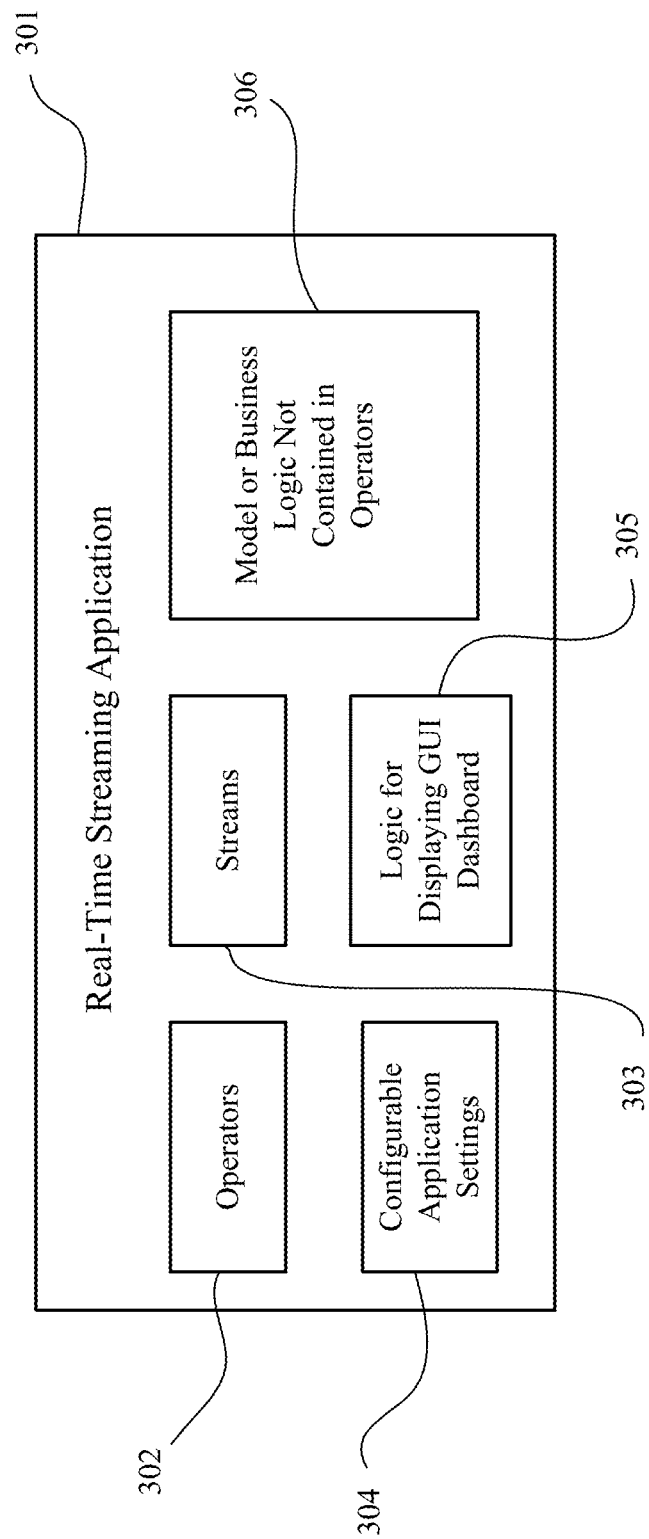
FIG. 3 is a diagram showing components of a real-time streaming application, in accordance with an example embodiment.

FIG. 3 is a diagram showing components of a real-time streaming application, in accordance with an example embodiment. As depicted in FIG. 3, such a streaming application might be included in a specification 301 which might be a Java source code program, in an example embodiment. Alternatively, specification 301 might be a Hadoop-style properties file. Specification 301 includes a logical plan that is a directed acyclic graph (DAG) whose nodes are operators 302 and whose edges are steams 303. As described in further detail below, an operator might be a sequence of program instructions, e.g., to compute a particular statistic. And a stream might be sequence of streaming windows that contain tuples that (a) are structured according to a schema and (b) originates in a source outside of the application program, e.g., a stock ticker or a content stream broadcast by a social/interest network. Specification 301 also includes configurable application settings 304 (e.g., with corresponding default values being specified by the distributed streaming platform), such as streaming window size (e.g., as measured in terms of units of time or number of tuples), heartbeat interval or period (e.g., as measured in terms of units of time or number of streaming windows), frequency of checkpointing (e.g., as measured in terms of units of time or number of streaming windows), frequency of purge determinations (e.g., as measured in terms of units of time or number of streaming windows), aggregate application window size (e.g., as measured in terms of units of time or number of streaming windows), sliding application window size and incrementation (e.g., as measured in terms of units of time or number of streaming windows), etc., in an example embodiment. Additionally, specification 301 might include logic 305 (GUI logic) and logic 306 (model or business logic not contained in the operators).

In an example embodiment, logic 305 and logic 306 might include model-view-controller (MVC logic) for displaying the results of some or all of the operators 302 in a dashboard that is part of a graphical user interface (GUI). In an example embodiment, if the origin of the streaming data is a stock ticker, the dashboard might display statistics related to stock prices and stock sales. Or if the origin of the streaming data is a content stream broadcast by a social/interest network, the dashboard might display statistics related to social signals (e.g., likes, favorites, shares, etc.) related to posts to the content stream.

Figure 4:
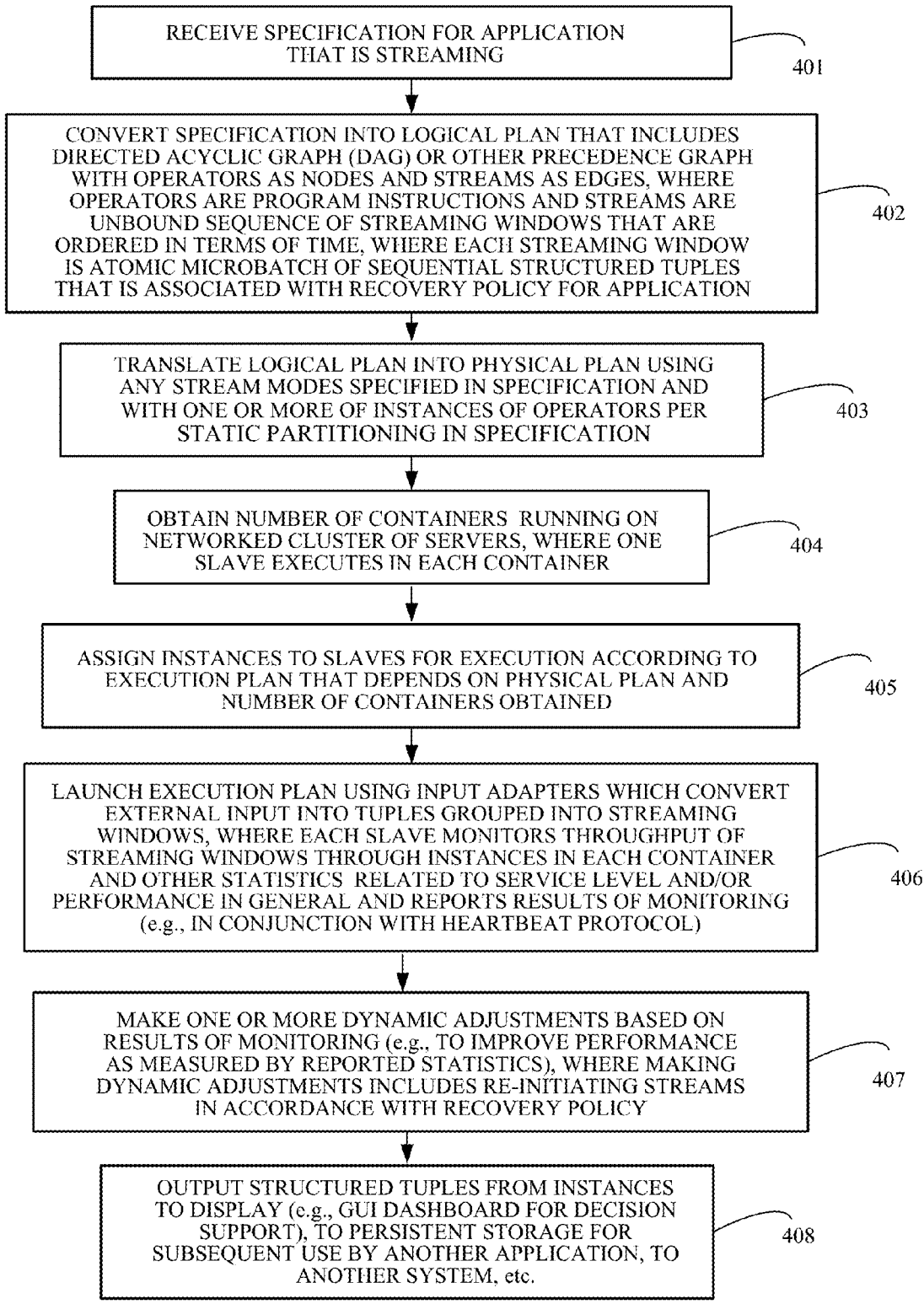
FIG. 4 is a flowchart diagram that illustrates a process for launching a streaming application and making dynamic adjustments based on monitored performance, in accordance with an example embodiment.

FIG. 4 is a flowchart diagram that illustrates a continuous or nonstop process for launching a streaming application and making dynamic adjustments based on monitored performance, in accordance with an example embodiment. In an example embodiment, this process might be performed by the Streaming Application Master (STRAM). In an alternative embodiment, some or all of the operations of this process might be performed by the STRAM Childs (e.g., slaves) or other software in the distributed streaming platform.

As depicted in FIG. 4, the software (e.g., the STRAM) receives a specification (e.g., whose location is identified in a user or script command on a command line interface (CLI)) for an application that is streaming, in operation 401. In an example embodiment, the specification might be a source program in Java created in an integrated development environment (IDE) such as Eclipse or NetBeans. In another example embodiment, the specification might be a Hadoop-style properties file. Or the application might be specified at the CLI, e.g., through user input such as macros, as described below. In operation 402, the software converts the specification into a logical plan that includes a directed acyclic graph (DAG) or other precedence graph with operators as nodes and streams as edges. One might think of the logical plan as special form of a data object model (DOM). The operators are program instructions and the streams are unbound sequences of streaming windows that are ordered in terms of time. In an example embodiment, the sequence might originate from web-services interface, e.g., a web API exposed by Yahoo! Finance or Twitter accessed by an input adapter for the distributed streaming platform. It will be appreciated that a Hadoop Map-Reduce application can be represented as a DAG, though such applications tend to operate on batches of data rather than streams of data.

In operation 403, the software translates the logical plan (e.g., the DAG) into a physical plan using any stream modes specified in the specification (e.g., in-line, in-node, in-rack, or other) and with one or more of instances of the operators per the static partitioning (e.g., as expressed in partition counts) in the specification. In operation 404, the software obtains a number of containers (or processes) running on a networked cluster of servers (or other physical computational units). In an example embodiment, the software might obtain these containers from the YARN Resource Manager. One might regard a container as a permission from YARN to run a process on a particular server (or other physical computation unit) in the networked cluster. And one might regard the YARN Resource Manager as a distributed operating system (OS) that manages processes, memory, and persistent storage for the networked cluster. One slave (e.g., a STRAM Child) might execute in each container, in an example embodiment. Then in operation 405, the software assigns the instances of the operators to the slaves for execution according to an execution plan that depends on the physical plan and the number of containers obtained. In operation 406, the software launches the execution plan using input adapters which convert external input into tuples grouped into streaming windows. And each slave monitors the throughput of streaming windows through the instances in its container (e.g., by monitoring the ordinal streaming window identifiers), along other statistics related to service level and/or performance in general (e.g., latency between servers (e.g., as reported by the container), network usage (e.g., as reported by the container), CPU usage (e.g., as reported by the container), memory usage (e.g., as reported by the container), uptime, errors including data loss (e.g., as reported by error tuples/ports/streams), size of message queues managed by buffer servers, throughput other than operator throughput (such as stream throughput or message-queue throughput), operator skew, time delay with respect to external system components, etc.) and reports the results (e.g., in conjunction with a heartbeat protocol), in an example embodiment. In an example embodiment, the software might also monitor service level and/or performance in general using statistics (e.g., latency between servers, network usage, CPU usage, memory usage, uptime, etc.) received from or reported by the Resource Manager or other components of the distributed streaming platform.

In operation 407, the software makes one or more dynamic adjustments based on the results of the monitoring (e.g., to reduce traffic of streaming windows through message queues in containers, through server NICs, and other bottlenecks or more generally to improve performance as measured by the reported statistics). In an example embodiment, the dynamic adjustments might include updating the physical plan by adding new instances of operators or deleting existing instances of operators. Or the dynamic adjustments might update the execution plan by returning a container to the YARN Resource Manager and/or obtaining a new container from the YARN Resource Manager for a rack and/or server (or other physical computational unit) and/or moving instances of operators from one container or server to another. As described in further detail below, the making of dynamic adjustments (e.g., failover and dynamic partitioning) includes re-initiating the streams in accordance with a recovery policy (e.g., at least once, at most once, exactly once) through commands (e.g., from the STRAM) to the slave (e.g., STRAM Child) which, in turn, controls the operators in the container and the buffer server in the container. Also, in an example embodiment, the dynamic adjustments might originate from commands entered by a user or the application at a CLI that supports runtime modifications to the logical plan (e.g., a macro, code, an interface or API, a GUI, text input, etc.), the physical plan, and/or the execution plan.

In an example embodiment, the distributed streaming platform might support a macro that is a set of CLI instructions that insert a sub-DAG (which might be reusable and therefore a candidate for a library), consisting of multiple operators and streams, into an application at runtime. The distributed streaming platform might also support hierarchical operators that are reusable sub-DAGs which are inserted into logical plans prior to runtime.

Then in operation 408, the software outputs structured tuples (e.g., using output adapters) from some or all of the instances to a display (e.g., a graphical user display or GUI dashboard for decision support), to persistent storage (e.g., using HDFS) for subsequent use by another application, to another system, etc. As noted on FIG. 4, each of the operations in this process might be executed in real time or near real time rather than offline, in an example embodiment. Moreover, some of the operations described in the process, e.g., the monitoring, making dynamic adjustments, and output operations, might be continuous or non-stop operations, in an example embodiment.

In an example embodiment, each container might be a multi-threaded process that includes one thread for each operator instance, one thread for the container's buffer server, and one thread for the slave (e.g., STRAM Child). In an example embodiment, each container has a single buffer server which manages, for the operator instances in the container, a message queue (FIFO not priority) of streaming windows, on a per port basis (e.g., the buffer server keeps track of which port has read which tuple). Each of these threads might perform its computations in memory, spilling over to persistent storage such as HDFS only in the event that memory is insufficient. It will be appreciated that by using a single thread for each operator, each operator can execute asynchronously without creating memory/storage incoherency.

In an example embodiment, each tuple might be a Plain Old Java Object (POJO), structured according to a schema or data type. In an example embodiment, each stream might have one upstream operator and one downstream operator. In that event, the schema for a tuple also defines a schema for a stream, e.g., by defining a schema for the output port of the stream's upstream operator that is the same as the schema for the input port of the stream's downstream operator. In an example embodiment, each operator might have one output port but one or more input ports which are mapped to the operator's one output port by the logic in the operator. For example, the input to an instance of an operator that computes an average price might be a streaming window that consists of a begin window (e.g., a control tuple with a field for an identifier, say 70), followed by data tuple with a field for a price, say 221.00, followed by an end window (e.g., a control tuple with a field for an identifier, also 70). The instance might re-compute an existing average using the new price to obtain a new average of, say 230.00, and then output (or emit to an output port) a begin window (e.g., with an identifier 70), a data tuple with a field for an average price set to 230.00, and an end window (e.g., with an identifier 70). It will be appreciated that the tuple input to the instance might already have a field for an average price which is set to 230.00 by the instance. Or alternatively, the instance might dynamically allocate the tuple with the field for an average price and set it to 230.00; the tuple might then be de-allocated by a downstream operator, e.g., a downstream operator that is an output adapter that displays the average price of 230.00 in a GUI dashboard. In an example embodiment, an instance of an operator might be used to change the schema of a tuple, without making changes to any values in the schema's fields. In operation 402, the DAG includes operators that are program instructions. In an example embodiment, these program instructions might relate to the business logic for the application, e.g., computing a financial statistic (e.g., such as the high or low price for a stock within a period of time) for display in a GUI dashboard for an application fed by a stock ticker (e.g., through a web API). Or the program instructions might be more generic, along the lines of the C-runtime library or the C++ template library. In that regard, a library of reusable common or standard operator templates (e.g., for use by developers of applications for the distributed streaming platform) might include operator templates with functionality for: (1) matching tuples and emitting results (where the output might be tuples that matched, tuples that did not match, a Boolean flag, etc.); (2) recording tuples; (3) counting items such as keys, frequency of keys, unique counts, etc.; (4) filtering such things as streams with input schema using keys or rates (e.g., sampling rates); (5) filtering log file lines from Apache and Tomcat servers; (6) joining and sorting items; (7) indexing (or mapping, including hash-mapping) for such operations as search indexing, word-counting, etc.; (8) consolidating schemas (e.g., to consolidate multiple streams into one schema); (9) inputting data into the application (e.g., an input adapter) and outputting data from the application (e.g., an output adapter), including adapters using Hadoop Distributed File System (HDFS), MemCache, MySQL, MongoDB, console, HTTP, Apache ActiveMQ, RabbitMQ, ZeroMQ, Kafka, Kestrel, Redisetc., Websocket, LocalFile, etc.; (9) performing mathematical operations such as compare, max, min, average, sum, quotient, range, except, margin, change, etc.; (10) managing streams without changing tuples or schema, e.g., stream duplicator, stream merger, array-list splitter, hash-map splitter, dev/null/counter, etc.; (11) generate load for testing, e.g., event generator, random generator, filter event generator, etc.: (12) computing over application windows that are sliding; (13) generating data for charts (e.g., in conjunction with CLI macros that are inserted dynamically at runtime through the CLI); (14) allow the usage of languages such as Python, JavaScript, Bash, etc.; (15) issue alerts using SMTP (Simple Mail Transfer Protocol); and (16) utility functions that are building blocks for other operator templates, including those listed above. In operation 402, the DAG includes edges that are streams made up of streaming windows. In an example embodiment, each streaming window is an atomic microbatch of sequential tuples that is associated with a recovery policy for an application. In an example embodiment, the length of the sequence of tuples in a streaming window is variable in length, e.g., configurable by the user directly or indirectly; a streaming window begins with a special "begin window" tuple (e.g., a control tuple) and ends with a special "end window" tuple (e.g., a control tuple). In an example embodiment, a streaming window might be specified in terms of time as approximately 0.5 seconds. An alternative example embodiment might use only a single control tuple (e.g., "begin window") or some other form of timestamp ordering for concurrency control (e.g., isolation within the meaning of the ACID or Atomicity, Consistency, Isolation, Durability properties for reliable data processing).

Other control tuples might include checkpoint tuples that are inserted into the streaming data periodically, per the checkpointing interval (or frequency) specified by the user or application (e.g., directly or indirectly through the recovery policy). In an example embodiment, checkpoint tuples might be inserted by an input adapter, triggering checkpoints as they work their way through all of the application's operators, and be removed by an output adapter. It will be appreciated that checkpoint tuples can be used to achieve checkpointing at the end of streaming windows (e.g., align checkpoints with boundaries of streaming windows).

In an example embodiment, an instance of an operator might report errors (e.g., counted per streaming window) using an error tuple that is emitted through an error port (e.g., an output port for an error stream) to a log file (e.g., in HDFS). Also, in an example embodiment, an input adapter might use a sample operator to perform bucket testing on new application logic on a relatively small subset of a stream, before deployment to the application.

In an example embodiment, an application window might be specified as in terms of streaming windows or using a period of time. In an example embodiment, an application window specified in terms of time might range from 5 to 15 minutes. Also, in an example embodiment, the default application window might be a single streaming window. An application window is associated with an operator; thus an application might have multiple application windows. Also, in an example embodiment, an application might be either an aggregate application window or a sliding application window.

An aggregate application window is constructed by combining a number of consecutive streaming windows without overlapping. That is to say, the next application window begins only after the current application window ends, in an example embodiment. Aggregate application windows are used for stateless application operators, e.g., application operators that operate solely on data in the streaming windows without resort to data read into memory from persistent storage. It does not follow that the operator instances in the physical plan are stateless; they are stateful, in an example embodiment. In an example embodiment, the distributed streaming platform might enhance performance of an aggregate application window by using one begin window tuple (e.g., aligned with the window boundary of the aggregate application window) and one end window tuple (e.g., also aligned with the window boundary of the aggregate application window) for all of the streaming windows in the aggregate application window; that is to say, the intervening control tuples (e.g., begin window tuples and end window tuples) might not be processed by the operator associated with the aggregate application window, though they might be used for monitoring purposes (e.g., by the STRAM child and/or buffer server). Also, in an example embodiment, the distributed streaming platform (e.g., STRAM) might use the last streaming window in an aggregate application window when making a purge determination as described in further detail below. An example of an operator that might be used with an aggregate application window in a financial application is an operator that charts stock ticker data on a per minute basis.

A sliding application window is constructed by combining a number of consecutive streaming windows with overlapping. That is to say, the current sliding application window is formed by dropping a streaming window from the previous sliding application window and adding a new streaming window, in an example embodiment (e.g., sliding by one streaming window). Sliding application windows are used for stateful application operators and the operator instances in the physical plan are also stateful, in an example embodiment. An example of an operator that might be used with a sliding application window in a financial application is an operator that counts the top 10 trades in terms of volume on a stock ticker over the past minute (e.g., starting from now).

Again, the use cases are many, and financial applications are mentioned because they are a type of process that benefits from real-time or near real-time processing. So therefore, the types of applications that can benefit from the processing described herein can be large, and without limitation and for purposes of example only, such applications can be for processing technical computing data, computing statistics, data processing statistics, advertising statistics, gaming statistics, hospital resource management, traffic statistics, application load managing, distributed processing, load balancing of servers and processes, inventory statistics, data distribution statistics, and other types technology driven processes.

Also, in an example embodiment, the recovery policy might be configurable by the user of the application or the application itself. Such configuration might occur prior to launch or during runtime, e.g., through the CLI. The recovery policy might be one of at least once, at most once, or exactly once, as described in further detail below. The recovery policy might impact performance of the distributed streaming platform because it can affect of the frequency of instance checkpointing, e.g., when the recovery policy is exactly once, instance checkpointing will occur at the end of every streaming window. In an example embodiment, instance checkpointing involves (a) pausing an instance of an operator at the end of a streaming window, (b) serializing the instance to persistent storage, e.g., using functionality such as Kryo to serialize the instance to a file in a file system such as Hadoop Distributed File System (HDFS), and (c) notifying the STRAM of the last window completed. Also, in an example embodiment, instance checkpointing might occur at a specified time period, e.g., every 30 seconds, which might be configurable by the user of the application, e.g., when the recovery policy is other than exactly once.

It will be appreciated that the statefulness of the instance might determine the amount of data to be serialized, in an example embodiment. For example, if an operator is stateless (e.g., it operates solely on the tuples in a streaming window without resort to data of its own read into memory from persistent storage), serialization of the operator might be skipped.

In an example embodiment, the recovery policy might be specified on a per-operator basis or a per instance basis. That is, there might be different recovery policies for different operators or for different instances of the same operator. So, for example, a stateful instance might have a recovery policy of at least once or exactly once, whereas a stateless instance might have a recovery policy of at most once.

Traditionally, the state of a streaming application is defined as the state of all operators and the state of all streams. In an example embodiment, the state of the streaming application might be defined as the state of all operator instances (e.g., one or more serializations of the instance obtained through checkpointing) and the set of all streaming windows in the message queues maintained by the buffer servers. It will be appreciated that in such an embodiment, the state of an operator instance is associated with an identifier for a streaming window. In an example embodiment, the checkpointing might be asynchronous insofar as the latest serialization (or checkpoint) for one instance of an operator might be at the end of a streaming window whose identifier differs from that of the latest serialization (or checkpoint) for another instance. Also in an example embodiment, if multiple serializations are stored for an operator instance, STRAM might purge earlier serializations on a FIFO basis consistent with the recovery policy.

In an example embodiment, the STRAM might dump the current state of all operator instances (including additions, deletions, movements to other containers, etc.) to a change file (e.g., in HDFS). It will be appreciated that the distributed streaming platform might then use this change file to create an updated logical plan, which might be used to re-launch the application, e.g., in the event of a grid outage in the networked cluster. Such a change file might be updated (a) at a recurring time period that is configurable by the user or the application, or (b) as a result of a command at the CLI, e.g., by the user or an application.

In operation 406, the slaves (e.g., STRAM Childs) might report the results of their monitoring (e.g., to the STRAM) in conjunction with a heartbeat protocol. Also, in an example embodiment, the heartbeat interval or period might be configurable by the user of the application, e.g., either in terms of units of time or number of streaming windows. In an example embodiment, the heartbeat protocol might use YARN RPC (remote procedure call). It will be appreciated that a heartbeat interval that is too short might add considerable network traffic and resultant computation to the distributed streaming platform.

In any event, the reporting of the results of the monitoring might be aligned with a streaming window boundary, e.g., through an end window. That is to say, the reporting of the results might take place during the period of time between an end window and the next begin window, in an example embodiment. This period of time might also be used for restarting operators (e.g., during server outages), checkpointing, checksumming, and other statistics generation, etc. In an example embodiment, class-method calls might be associated with begin window tuples and end window tuples. And in such an example embodiment, the class-method call for end window might perform some or all of the reporting of the results of the monitoring, restarting operators, checkpointing, checksumming, and other statistics generation.

It will be appreciated that each streaming window is identified by an ordinal identifier that increases as the application runs (e.g., 1, 2, 3, etc.). In an example embodiment, the results of the monitoring in operation 406 might include (a) the identifier for the last processed streaming window per operator in the container, (b) the identifier for the last checkpoint streaming window per operator in the container, and (c) the identifier for the committed streaming window. The committed streaming window is the streaming window that has been computed by all output adapters (e.g., operators which write to console or persistent storage). In an example embodiment, the STRAM uses (b) and (c) to determine which streaming windows can be purged from the buffer server's message queue in each container and which checkpoint serializations (or files) can be purged from persistent storage (e.g., HDFS). In an example embodiment, the user of the application might configure the period at which this purge determination is performed by the STRAM, e.g., every 30 seconds.

In another example embodiment, the results of the monitoring might also include some statistics related to streams, e.g., tuples consumed at each input port of an operator per second, tuples emitted to or by each output port of an operator per second, etc. Also, each buffer server might also report monitoring results related to the streaming windows in its message queue, the identifier of the last streaming window in the message queue, confirmation of the purge of a streaming window in the message queue, etc.

In operation 407, the software re-initiates the streams in accordance with a recovery policy when making dynamic adjustments. In an example embodiment, the recovery policy might be one of at least once, at most once, exactly once, by analogy to the delivery assurances in the WS-Reliable Messaging Protocol. These recovery policies are described in greater detail in FIG. 8, in a context where a dynamic adjustment results from failure of a container or its server (e.g., failover).

Figure 5:
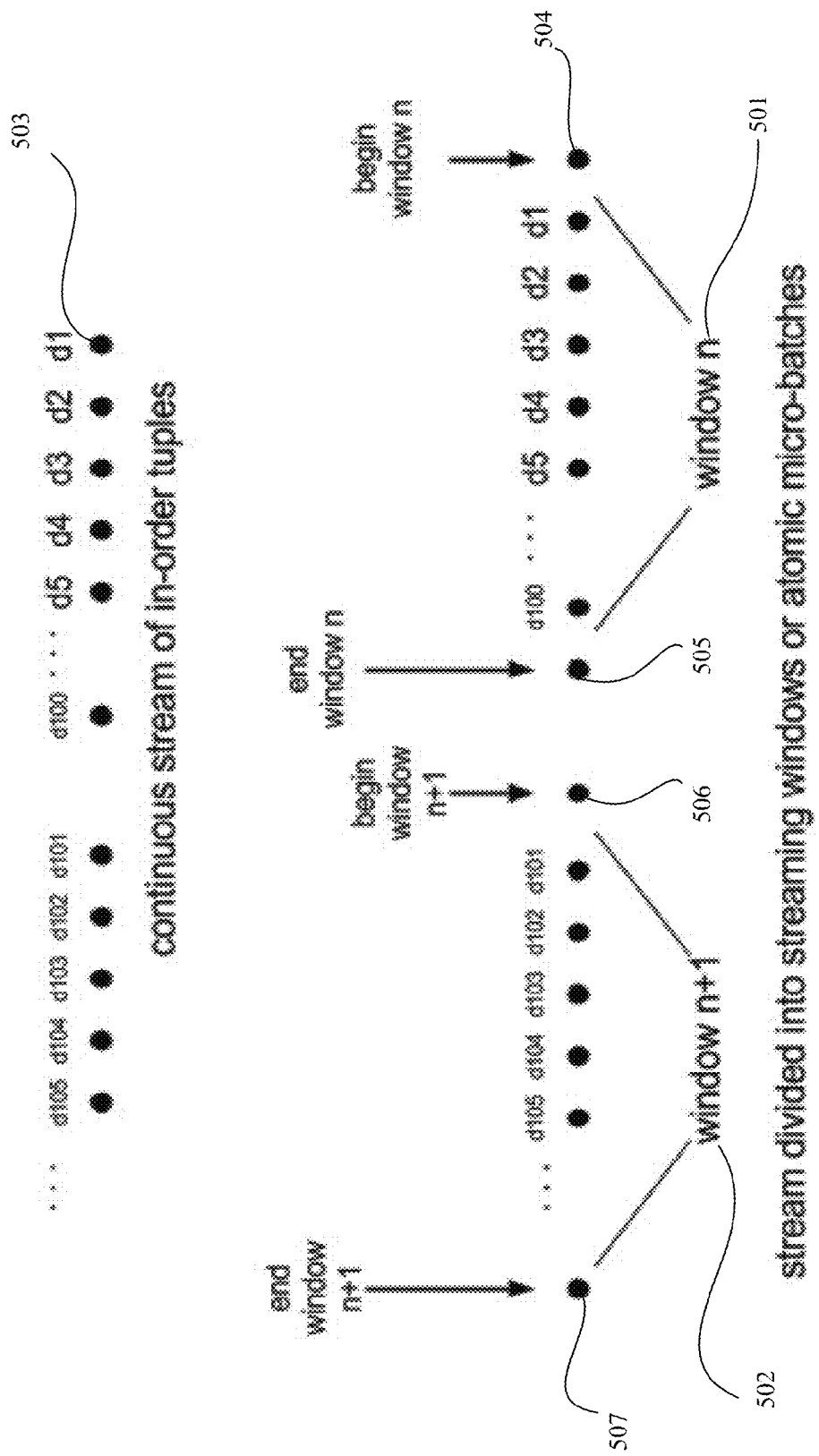
FIG. 5 is an illustration of the ordered tuples in a streaming window, in accordance with an example embodiment.

FIG. 5 is an illustration of the ordered tuples in a streaming window, in accordance with an example embodiment. In this figure, time moves along a horizontal axis to the left, so streaming window 501 (n) is earlier in time than streaming window 502 (n+1). As shown in this figure, a stream (e.g., an edge in the logical plan) might be a continuous stream of in-order streaming windows (e.g., 501 and 502), which, in turn, are a continuous stream of in-order tuples (e.g., tuple 503), which might be thought of as records, structs, or classes with only data members and no methods, structured according to a schema or data type. Also shown in this figure are control tuples 504 (begin window n), 505 (end window n), 506 (begin window n+1), and 507 (end window n+1), which might not contain data related to the application, in an example embodiment.

Figure 6:
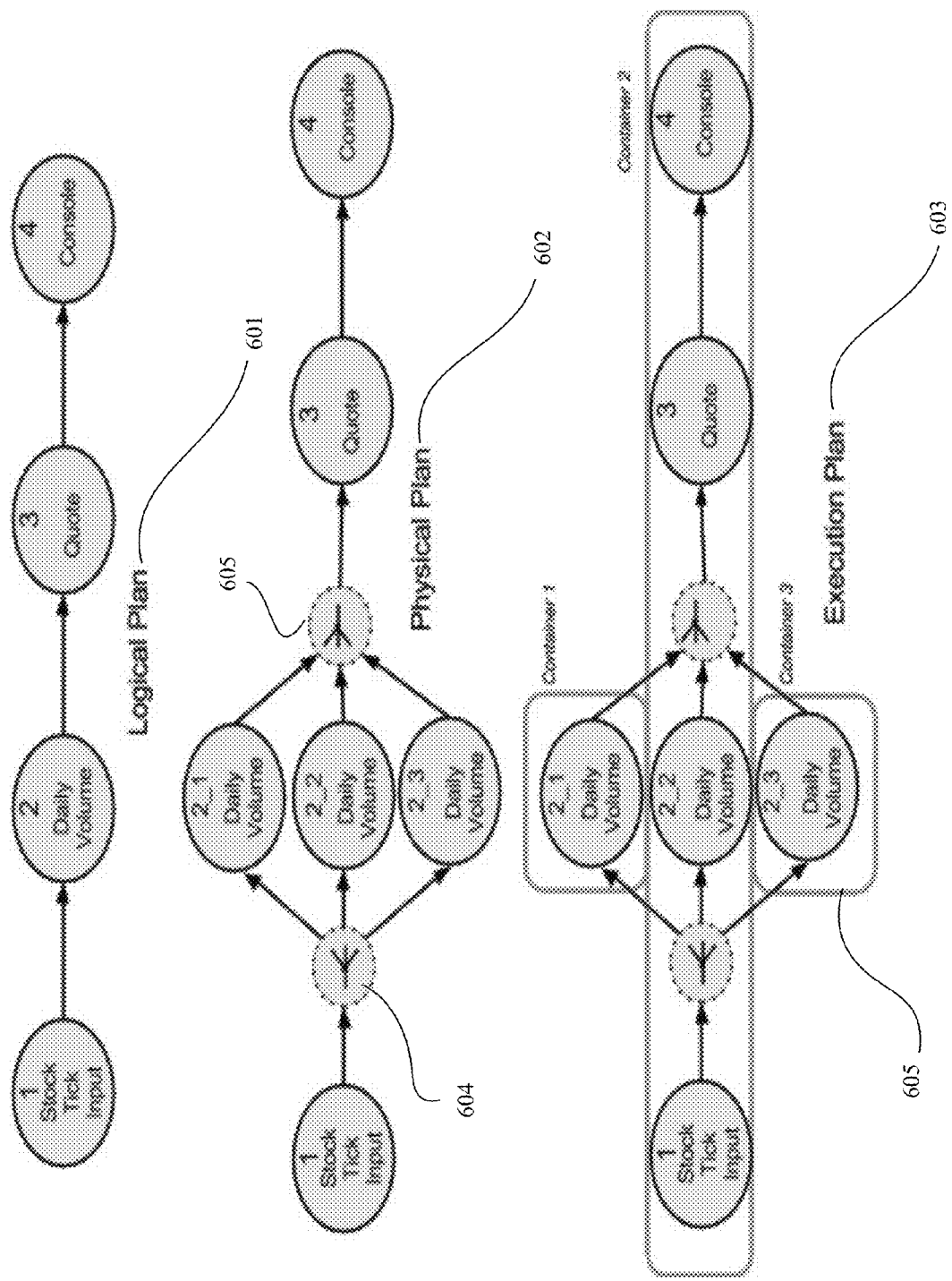
FIG. 6 is a diagram showing a logical plan, a physical plan, and an execution plan, in accordance with an example embodiment.

FIG. 6 is a diagram showing a logical plan, a physical plan, and an execution plan, in accordance with an example embodiment. This figure should be read from top to bottom; that is to say, a logical plan 601 precedes a physical plan 602, which precedes an execution plan 603, per the flowchart in FIG. 4. As indicated in FIG. 6, the application is a financial application whose streaming data originates in a stock ticker, e.g., Stock Tick Input 1 in each of the plans. In an example embodiment, a user of the distributed streaming platform might have input (e.g., provided the location of the application's files) logical plan 601 through a CLI. The logical plan includes four operators: (a) Stock Tick Input 1; (b) Daily Volume 2; (c) Quote 3, and (d) Console 4 (e.g., output to a display). The distributed streaming platform (e.g., the STRAM) converts the logical plan 601 into a physical plan 602 by statically partitioning the operator Daily Volume 2 into three instances (e.g., per a partition count in the specification): instance Daily Volume 2_1, instance Daily Volume 2_2, and instance Daily Volume 2_3, each of which might be a thread. Then the distributed streaming platform (e.g., the STRAM) connects the three instances to the upstream instance Stock Input 1 using a stream duplicator 604 and connects them to the downstream instance Quote 3 using a stream merger (or unifier) 605. The distributed streaming platform (e.g., the STRAM) then obtains 3 containers (e.g., processes) from a resource manager (e.g., a YARN Resource Manager) and, to complete the execution plan, assigns (a) instance Daily Volume 2_1 to container 1, (b) instance Stock Tick Input 1, instance Daily Volume 2_2, instance Quote 3, and instance Quote 4 to container 2, and (c) instance Daily Volume 2_3 to container 3. Such an execution plan might work well with a stream codec whose hash function results in a high throughput of tuples through instance Daily Volume 2_2, since that throughput could avoid passing through a buffer server's message queue.

Figure 7A:
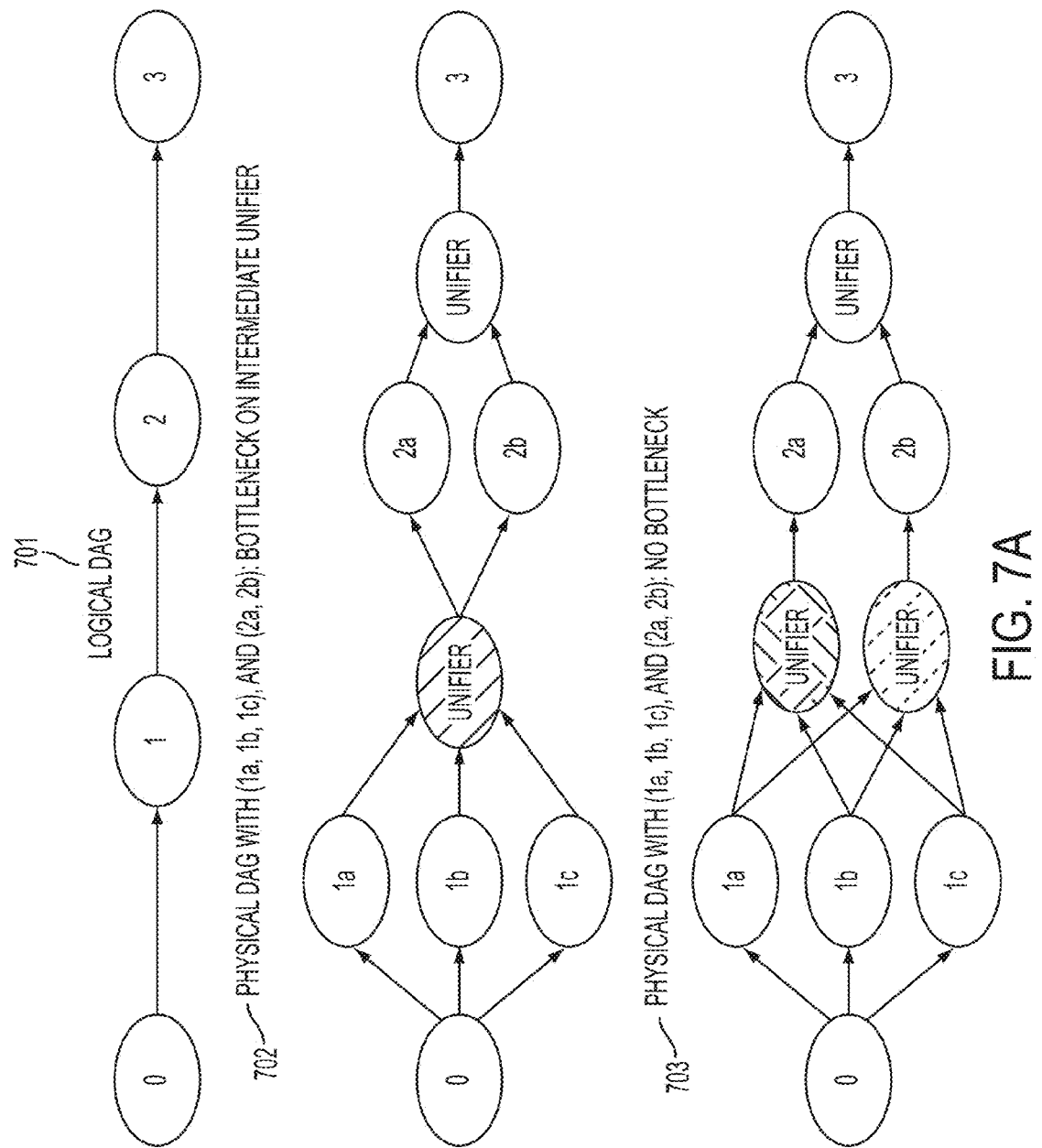
FIGS. 7A and 7B are diagrams showing examples of the static partitioning of operator instances in a physical plan, in accordance with an example embodiment.
Figure 7B:
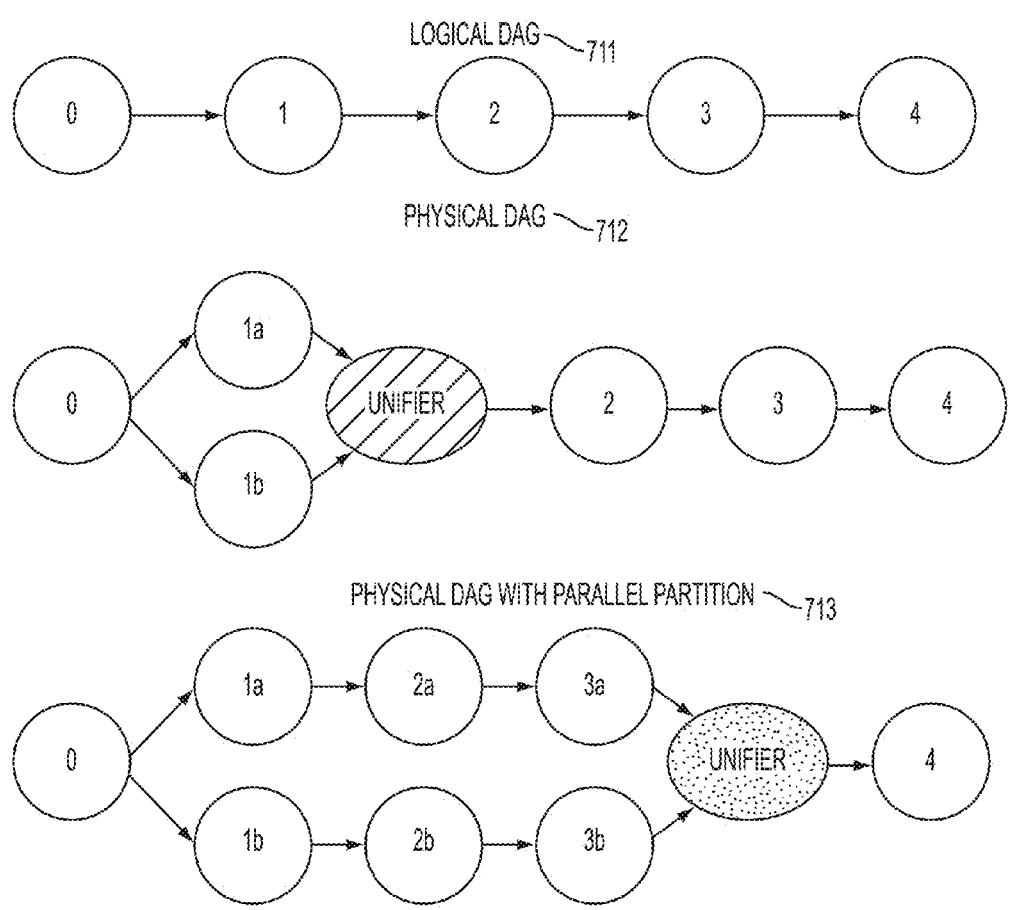

FIGS. 7A and 7B are diagrams showing examples of the static partitioning of operator instances in a physical plan, in accordance with an example embodiment. As depicted in FIG. 7A, a logical plan (or DAG) 701 includes four operators: operator 0, operator 1, operator 2, and operator 3. According to the static partitioning (e.g., partition counts) in the specification for the logical plan 701, the distributed streaming platform (e.g., the STRAM) could partition operator 1 into three instances, 1a, 1b, and 1c, and operator 2 into two instances, 2a and 2b, using one unifier for the three instances of operator 1 and one unifier for the two instances of operator 2, when creating the physical plan (or DAG) 702. However, this partition might create a bottleneck at the unifier for the three instances of operator 1. So the distributed streaming platform (e.g., the STRAM) instead creates a physical plan (or DAG) 703, in which there are two unifiers for the three instances of operator 1. It will be appreciated that such an approach might also be used for dynamic partitioning based on the results of the instance monitoring described above.

FIG. 7B also depicts a logical plan (or DAG) 711. This logical plan includes five operators: operator 0, operator 1, operator 2, operator 3, and operator 4. Note that the throughput is expected to be large on the stream connecting operator 0 to operator 1 and the stream connecting operator 1 to operator 2, as indicated by the thickness of the streams. These expected throughputs might be communicated by the user in the specification, in an example embodiment. According to the static partitioning (e.g., partition counts) in the specification for the logical plan 711, the distributed streaming platform (e.g., the STRAM) could partition operator 1 into two instances, 1a and 1b, using one unifier for the two instances of operator 1, when creating the physical plan (or DAG) 712. However, this partition might create a bottleneck with large throughput from the unifier to operator 2. So the distributed streaming platform (e.g., the STRAM) instead creates a physical plan (or DAG) 713 with a parallel partition that avoids large throughput and bottlenecks. In the parallel partition, the large throughput out of operator 0 is split between two branches; one with instances 1a of operator 1, 2a of operator 2, and 3a of operator 3, and another with instances 1b of operator 1, 2b of operator 2, and 3b of operator 3. The two branches are then merged through a unifier that outputs a single stream to operator 4. It will be appreciated that such splitting and merging (which is also referred to as fan-out and fan-in, respectively) might be used to process a Map-Reduce application that is ultimately written to a file (e.g., an HDFS file), in an example embodiment. It will also be appreciated that such an approach might also be used for dynamic partitioning based on the results of the instance monitoring described above.

In an example embodiment, the distributed streaming platform (e.g., the STRAM) might ignore all or part of the static partition, treating it as a hint rather than a command. In that event, the software might issue a diagnostic message (e.g., through the CLI or to a log file) to the user who submitted the application.

Figure 8:
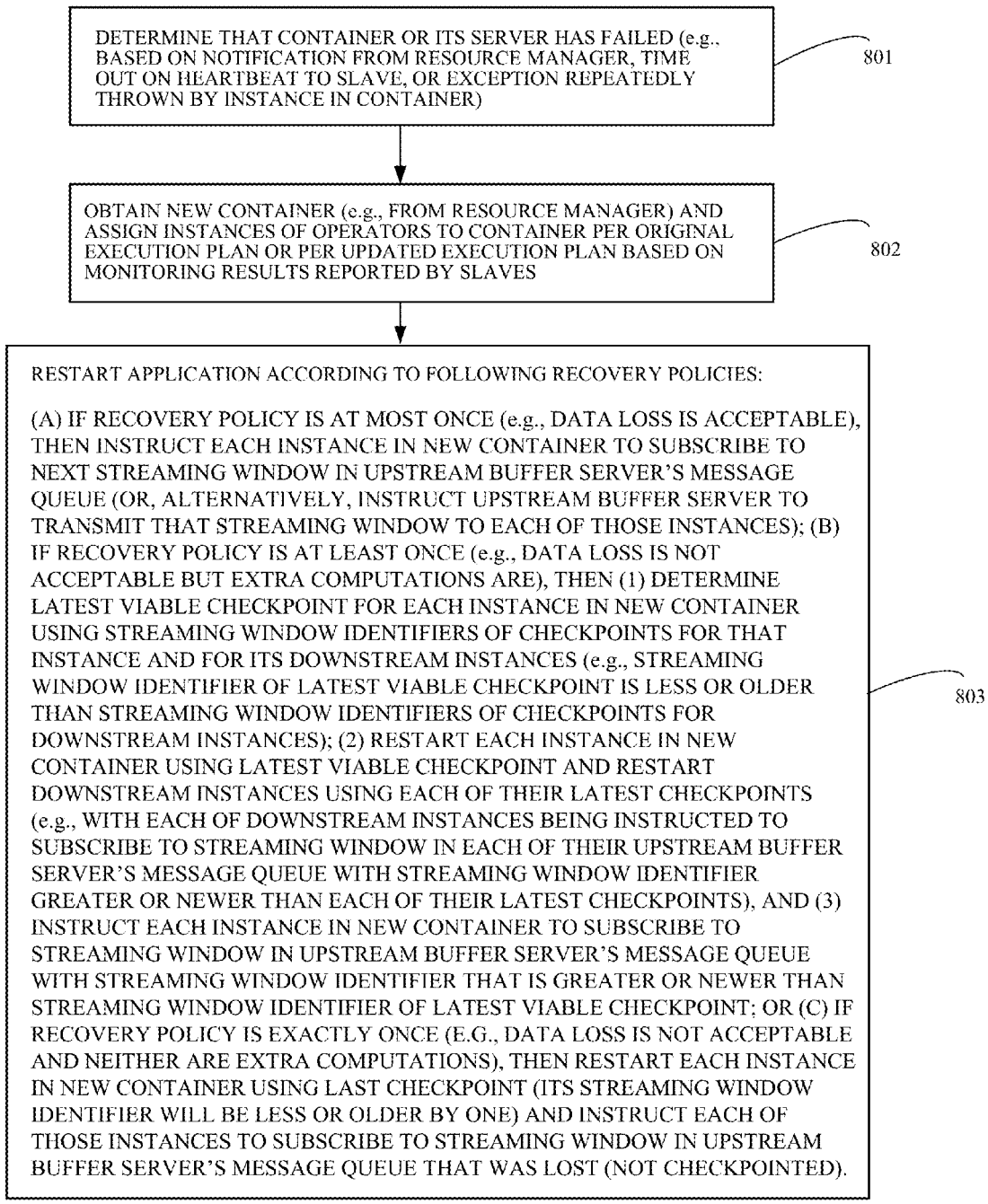
FIG. 8 is a flowchart diagram that illustrates a process for recovering from a failed container or server, in accordance with an example embodiment.

FIG. 8 is a flowchart diagram that illustrates a process for recovering from a failed container or server, in accordance with an example embodiment. It will be appreciated that such recovery (e.g., failover) is a form as dynamic adjustment based on monitoring results, as described above. In an example embodiment, this process might be performed by the STRAM. In an alternative embodiment, some or all of the operations of this process might be performed by the STRAM Childs or other software in the distributed streaming platform.

As depicted in FIG. 8, the software (e.g., the STRAM) determines that a container or its server has failed (e.g., based on notification from YARN Resource Manager, a time out on heartbeat to slave, an exception repeatedly thrown by an instance in the container, etc.), in operation 801. In operation 802, the software obtains a new container (e.g., from the YARN Resource Manager) and assigns instances of operators to the container per the original execution plan or per an updated execution plan based on the monitoring results reported by slaves (e.g., STRAM Childs). Then in operation 803, the software restarts the application according to the following recovery policies: (A) if the recovery policy is at most once (e.g., data loss is acceptable), then the software instructs (e.g., through the STRAM Child) each instance in the new container to subscribe to the next streaming window in the upstream buffer server's message queue (or, alternatively, instructs the upstream buffer server through a STRAM Child to transmit that streaming window to each of those instances); (B) if the recovery policy is at least once (e.g., data loss is not acceptable but extra computations are), then (1) the software determines the latest viable checkpoint for each instance in the new container using streaming window identifiers of checkpoints for that instance and for downstream instances (e.g., the streaming window identifier of the latest viable checkpoint is less or older than the streaming window identifiers of the checkpoints for the downstream instances); (2) restarts (e.g., through the STRAM Child) each instance in the new container using the latest viable checkpoint and restarts (e.g., through the STRAM Childs) the downstream instances using each of their latest checkpoints (e.g., with each of the downstream instances being instructed to subscribe to the streaming window in each of their upstream buffer server's message queues with a streaming window identifier greater or newer than each of their latest checkpoints), and (3) instructs (e.g., through the STRAM Child) each instance in the new container to subscribe to the streaming window in the upstream buffer server's message queue with a streaming window identifier that is greater or newer than the streaming window identifier of the latest viable checkpoint; or (C) if the recovery policy is exactly once (e.g., data loss is not acceptable and neither are extra computations), then the software restarts (e.g., through the STRAM Child) each instance in the new container using the last checkpoint (its streaming window identifier will be less or older by one) and instructs (e.g., through the STRAM Child) each of those instances to subscribe to the streaming window in the upstream buffer server's message queue that was lost (not checkpointed).

It will be appreciated that the recovery policy of at most once can be processed faster than a recovery policy of at least once and exactly once, at the cost of data loss. And while a recovery policy of exactly once might be processed faster than a recovery policy of at least once, the former recovery policy might significantly impact performance of the distributed streaming platform since it requires the checkpointing of an instance at the end of every streaming window.

It will also be appreciated that operations 802 and 803 might also be used during other dynamic adjustments as described above, e.g., adding new containers to an updated execution plan, based on monitoring results from the slaves or a command (e.g., a macro) entered by a user or script at the CLI while the application is continuously executing.

Figure 9:
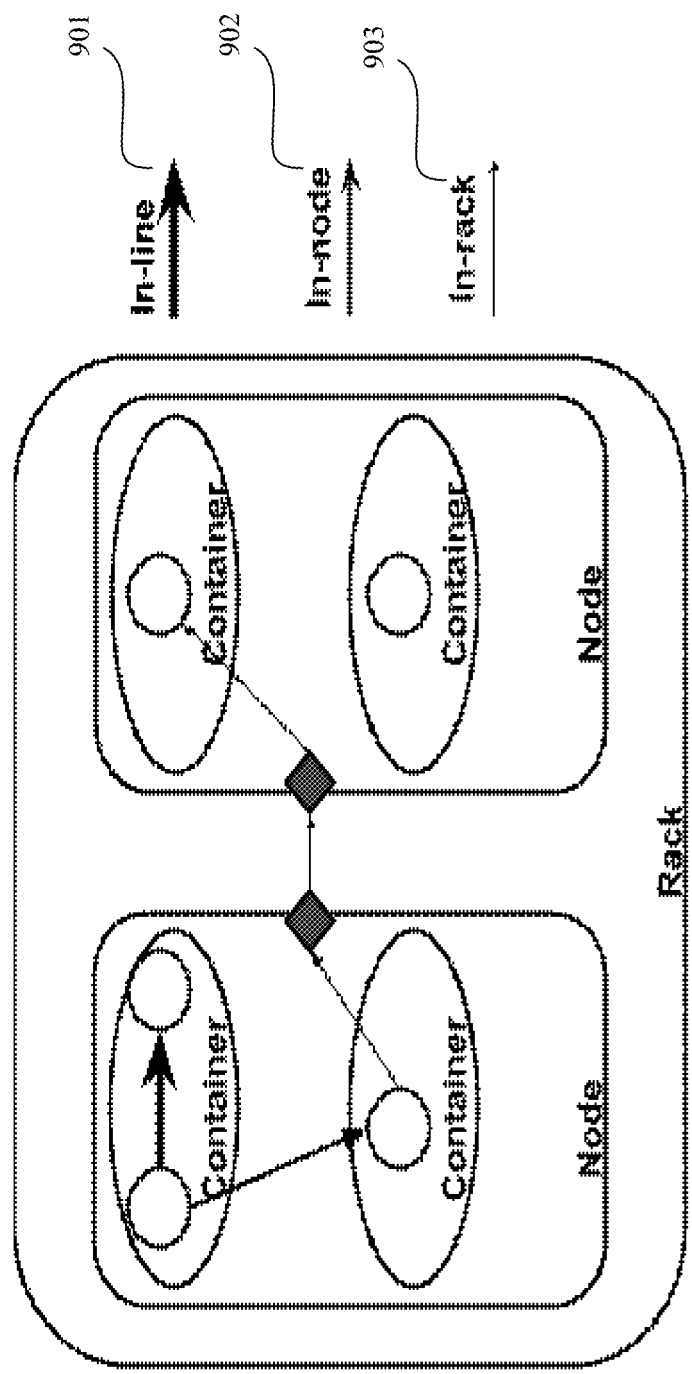
FIG. 9 is a diagram showing several stream modes, in accordance with an example embodiment.

FIG. 9 is a diagram showing several stream modes, in accordance with an example embodiment. Recall that in an example embodiment, each stream might be connected to one output port for an upstream operator and one input port for a downstream operator. When the stream mode is in-line 901 (shown in FIG. 9 as the thick arrow), the operator instances (each of which might be a single thread) connected by the stream are in the same container (or process). And consequently, the streaming windows going between the output port (of the upstream operator on the stream) and the input port (if the downstream operator on the stream) need not pass through the message queue managed by the container's buffer server. It will be appreciated that such a mode facilitates high throughput of streaming windows.

When the stream mode is in-node 902 (shown in FIG. 9 as the arrow with medium thickness), the streaming windows going between the output port (of an upstream operator on the stream) and the input port (of the downstream operator on the stream) pass through the message queue managed by the container's buffer server. Passing through the message queue might entail serialization of tuples into bytes at the output port (of the upstream operator on the stream) and de-serialization of bytes into tuples at the input port (of the downstream operator on the stream), according to a stream codec (e.g., for stream sockets or other network sockets) such as Kryo. Consequently, the throughput of streaming windows when the stream-mode is in-node will be lower than the throughput of streaming windows when the stream-mode is in-line.

When the stream mode is in-rack 903 (shown in FIG. 9 as the thin arrow), the streaming windows going between the output port (for an upstream operator on the stream) and the input port (for the downstream operator on the stream) pass through both the message queue managed by the container's buffer server and a network interface controller (NIC) or other hardware component that connects one server (or other physical computation unit) with another. Consequently, the throughput of streaming windows when the stream-mode is in-rack will be significantly lower than the throughput of streaming windows when the stream-mode is in-line or in-node. And when the steam mode is "other" (not shown in FIG. 9), the throughput of streaming windows might be significantly lower than the throughput of streaming windows when the stream-mode is in-line, in-node, and in-rack, in an example embodiment.

In an example embodiment, the software might ignore some or all of the stream modes, treating them as a hints rather than commands. For example, a user or code might submit a specification in which all streams are specified as in-line in order to obtain fast throughput of streaming windows, though such an approach would result in a process that exceeded the capacity of a container. In that event, the software might issue a diagnostic message (e.g., through the CLI or to a log file) to the user who submitted the application.

Figure 10:
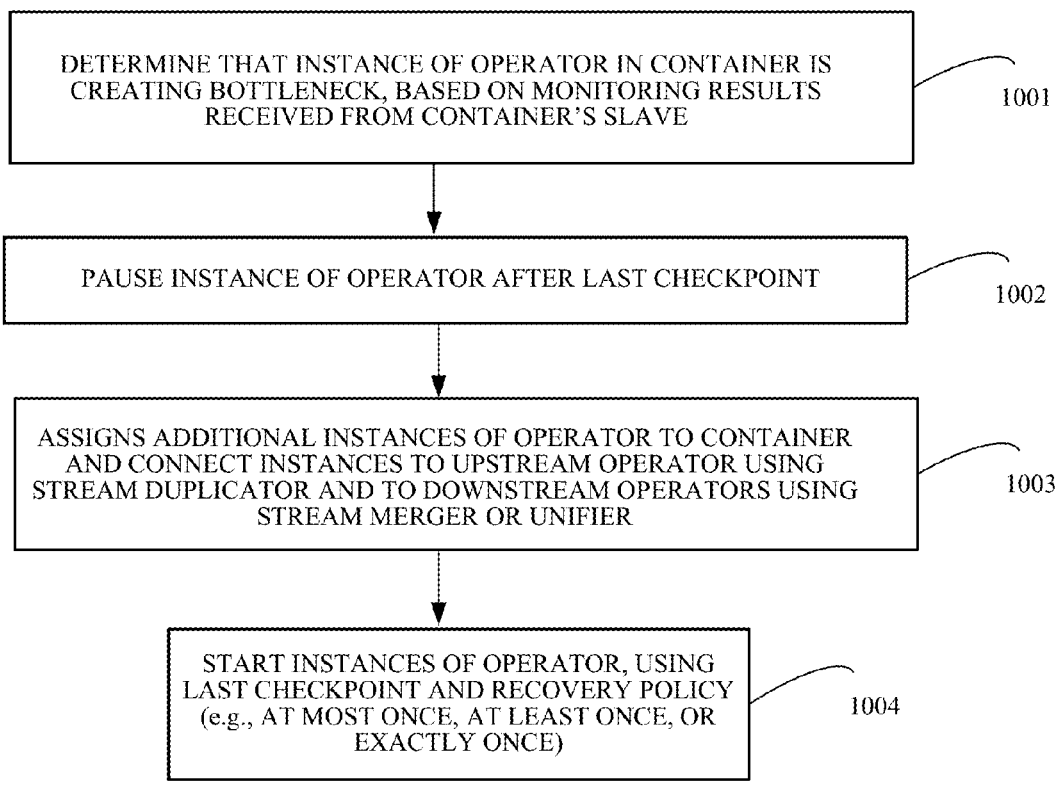
FIG. 10 is flowchart diagram that illustrates a process for dynamically partitioning operator instances, in accordance with an example embodiment.

FIG. 10 is flowchart diagram that illustrates a process for dynamically partitioning operator instances, in accordance with an example embodiment. In an example embodiment, this process might be performed by the STRAM. In an alternative embodiment, some or all of the operations of this process might be performed by the STRAM Childs or other software in the distributed streaming platform.

As depicted in FIG. 10, the software (e.g., the STRAM) determines that an instance of an operator in a container is creating a bottleneck, based on monitoring results received from container's slave, in operation 1001. For example, the instance might be an upstream instance to a downstream instance with two input ports. And the input port connected to the upstream instance might have significantly lower throughput than the other input port. In operation 1002, the software pauses the instance of the operator, e.g., after its last checkpointing (e.g., serialization to HDFS). The software then assigns multiple instances of the operator to the container and connects the instances to the upstream operators, e.g., using a stream duplicator, and to the downstream operator, e.g., using a stream merger or a unifier, in operation 1003. In operation 1004, the software starts the instances of the operator (e.g., through the slave), using the last checkpoint and a recovery policy (e.g., at most once, at least once, or exactly once), as explained in detail above with respect to operation 803 in FIG. 8.

In an example embodiment, a stream codec might be used to split the tuples in a streaming window between multiple instances of the same operator that result from static partitioning in the specification or dynamic partitioning at runtime. For example, a hash function might be applied to a tuple to obtain a hash code and the lower bits of the hash code might determine which instance of the operator receives the tuple (e.g., if there are two instances the lower bit of the hash code would be sufficient to split the tuples between the instances). It will be appreciated that such an approach (which might be referred to as "sticky key") differs from a round-robin approach, where the first tuple would go to the first instance, the second tuple would go to the second instance, the third tuple would go to the first instance, the fourth tuple would go to the second instance, etc.

In such an example embodiment, the "sticky key" approach might result in a skewed distribution, where one instance of the same operator receives many more tuples than the other instances, e.g., 4 tuples received by the one instance to every 1 tuple received by each of the other instances. In that event, the STRAM might lessen the skew by applying at runtime a ratio (e.g., 2:1) of maximum load to minimum load, as configured by the user of the application or the application itself (e.g., through the CLI). In that event, the one instance receiving more tuples would receive at most 2 tuples for every 1 instance received by each of the other instances.

Figure 11A:
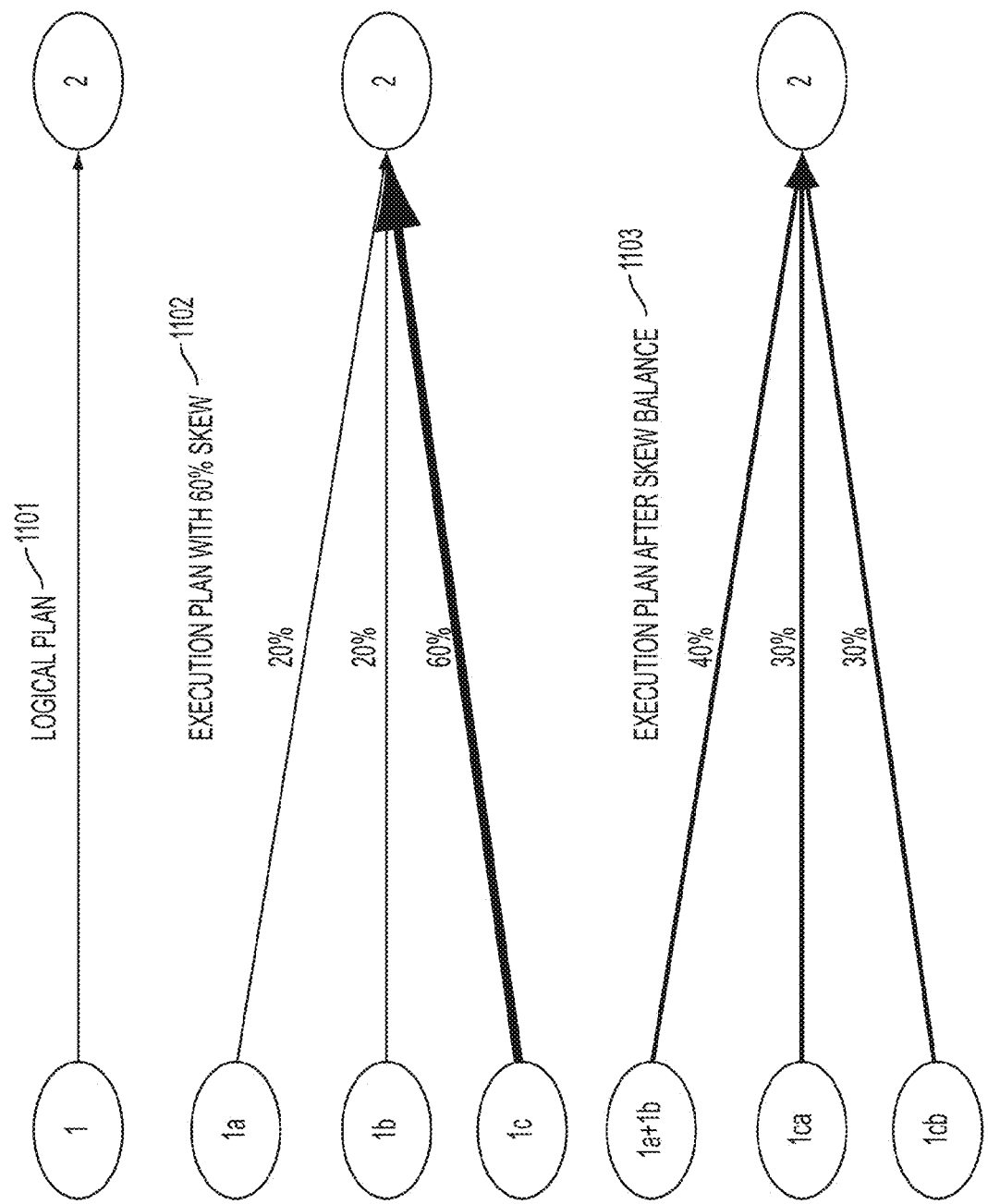
FIG. 11A is a diagram showing the use of dynamic partitioning of instances to lessen skew resulting from "sticky key" assignment of tuples, in accordance with an example embodiment.

FIG. 11A is a diagram showing the use of dynamic partitioning of instances to lessen skew resulting from "sticky key" assignment of tuples, in accordance with an example embodiment. In this example embodiment, the logical plan 1101 is translated into an execution plan 1102, in which there are three instances of operator 1, namely, 1a, 1b, and 1c. Because of the "sticky key" assignment of tuples, instance 1c is emitting 60% of the tuples received by the lone instance of operator 2 and instances 1a and 1b are each emitting 20% of the total number of tuples received by the lone instance of operator 2. Such a skew might be the result of spiking caused by a hash function tied to directly or indirectly to a geographic location (e.g., the IP address of users) in another time zone; e.g., a spike that results from Internet users waking up in the morning in Russia. If the skew rule (e.g., as configured by the user) is that no instance shall emit more than 50% of the total number of tuples received by another instance, the STRAM might enforce the skew rule through an execution plan 1103 that merges instance 1a and 1b into a single instance (1a+1b) and splits instance 1c into two instances, 1ca and 1cb. It will be appreciated that this execution plan preserves the partition count (e.g., three instances of operator 1) in the original execution plan 1102.

Figure 11B:
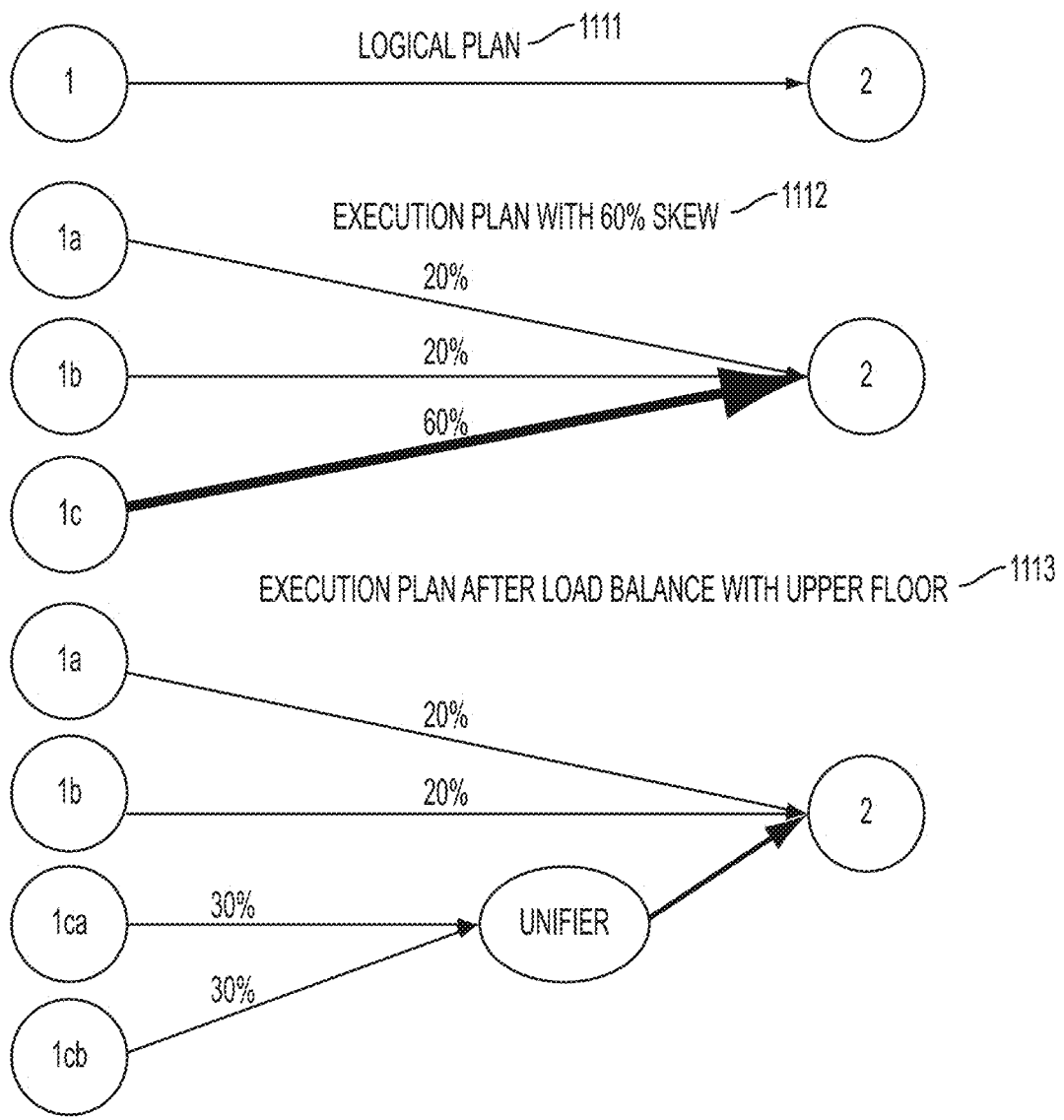
FIG. 11B is a diagram showing the use of a unifier instance to lessen skew resulting from "sticky key" assignment of tuples, in accordance with an example embodiment.

FIG. 11B is a diagram showing the use of a unifier instance to lessen skew resulting from "sticky key" assignment of tuples, in accordance with an example embodiment. Here again, the logical plan 1111 is translated into an execution plan 1112, in which there are three instances of operator 1, namely, 1a, 1b, and 1c. Because of the "sticky key" assignment of tuples, instance 1c is emitting 60% of the tuples received by the lone instance of operator 2 and instances 1a and 1b are each emitting 20% of the total number of tuples received by the lone instance of operator 2. If the skew rule is again that no instance shall emit more than 50% of the total number of tuples received by another instance, the STRAM might enforce the skew rule through an execution plan 1113 that splits instance 1c into two instances, 1ca and 1cb, and later merges the streams from those instances using a unifier that might include special code for handling spikes (e.g., a leaky bucket algorithm). It will be appreciated that this execution plan does not preserve the partition count (e.g., three instances of operator 1) in the original execution plan 1112.

Figure 11C:
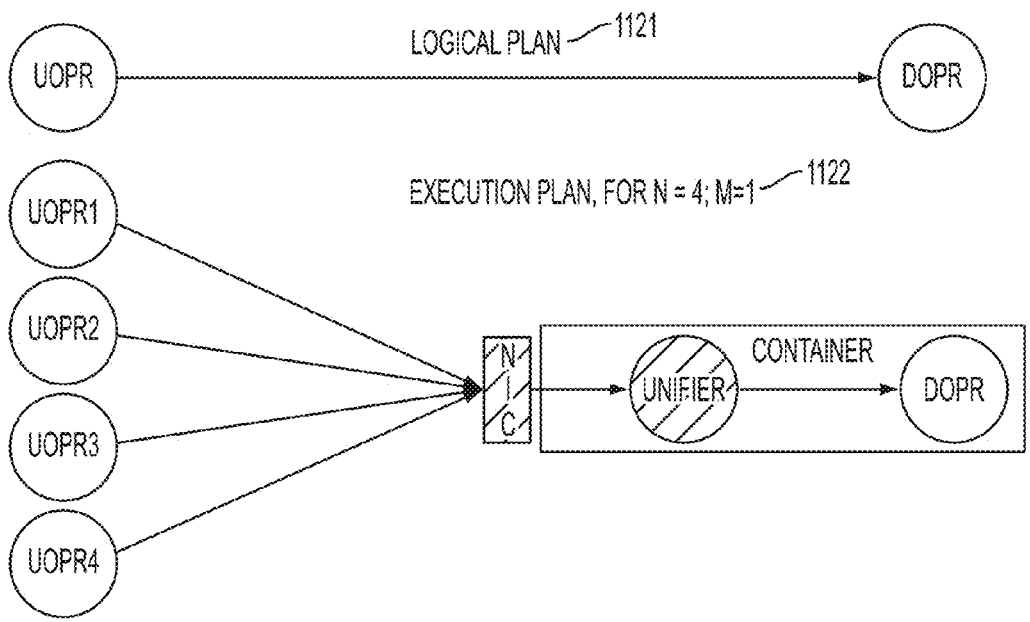
FIG. 11C is a diagram showing the use of cascading unifiers for more linear scaling, in accordance with an example embodiment.
Figure 11C:
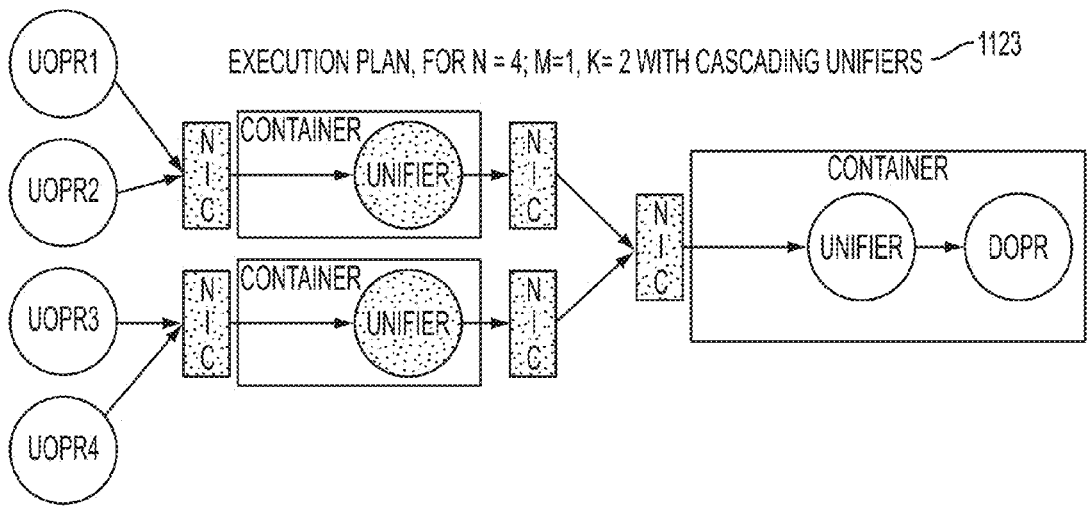

FIG. 11C is a diagram showing the use of cascading unifiers for more linear scaling, in accordance with an example embodiment. In an example, the logical plan 1121 is translated into an execution plan 1122, in which there are four instances of the upstream operator (uopr1, uopr2, uopr3, and uopr4) and one instance of the downstream operator (dopr), where N is the number of instances of the upstream operator and M is the number of instances of the downstream operator. However, in execution plan 1122, all four of the upstream operators emit streams that pass through a NIC to another container, where a unifier with special code merges the streams for the downstream operator. Such an execution plan might result in a bottleneck forming at the NIC and/or at the container in which the unifier runs. To prevent such a bottleneck, the STRAM might use cascading unifiers consisting of two or more levels of unifiers. In execution plan 1123, there are two levels (K equals 2); the first level contains two containers, each with its own unifier, and the second level contains one container with one unifier.

Figure 12:
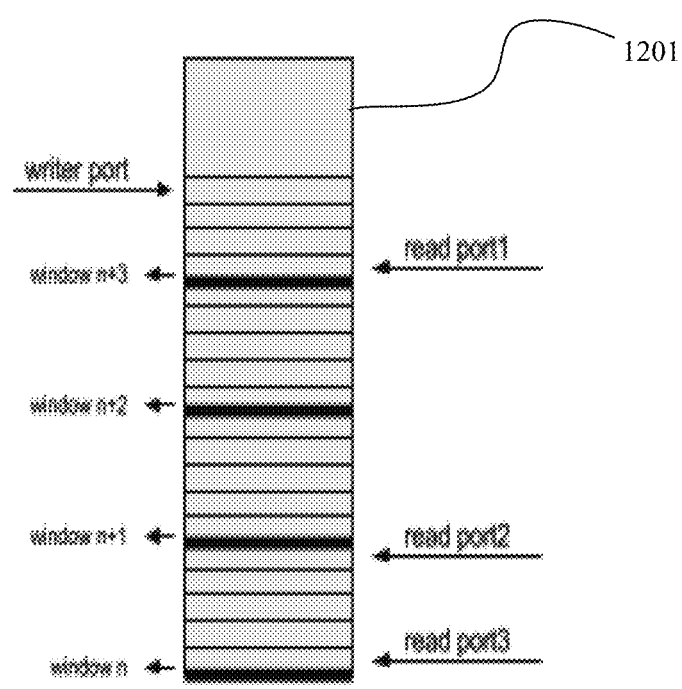
FIG. 12 is a diagram illustrating a stream in a message queue managed by a container's buffer server, in accordance with an example embodiment.

FIG. 12 is a diagram illustrating a stream in a message queue managed by a container's buffer server, in accordance with an example embodiment. In an example embodiment, each container might be a multi-threaded process with one thread for the slave, one thread for each instance of an operator, and one thread for each buffer server. As depicted in FIG. 12, the message queue 1201 is a FIFO (not priority) queue, where the oldest complete streaming window in the stream is window n at the bottom of the queue and the newest complete streaming window in the stream is window n+2 towards the top. In an example embodiment, message queue 1201 might be based on a publisher-subscriber model, where one output port (writer port) writes streaming windows for a stream into the message queue and multiple input ports (read port1, read port2, and read port3) read from the message queue by subscribing to the stream from a particular streaming window "onwards" (e.g., in term of n incrementing). Thus, in message queue 1201, read port3 might be subscribing to the stream from streaming window n onwards (e.g., n, n+1, n+2, n+3, etc.), read port2 might be subscribing to the stream from streaming window n+1 onwards (e.g., n+1, n+2, n+3, etc.), and read port1 might be subscribing to the stream from streaming window n+3 onwards.

In an example embodiment, security for the distributed streaming platform might be provided by Kerberos, where the access points are the STRAM and each of the buffer servers. In that embodiment, the STRAM might obtain a security token and pass it to the STRAM Child (e.g., a thread), which, in turn, passes it to the buffer server (e.g., also a thread) that it monitors and controls in their shared container (or process). The buffer server could then use the security token to verify the security of any new connection to the container. Also, in an example embodiment, security for the distributed streaming platform's graphical user interfaces (GUIs) might be provided by Simple and Protected GSSAPI Negotiation Mechanism (SPNEGO).

In an example embodiment, a reservoir buffer (e.g., a thread) associated with an instance of an operator might be used to synchronize streaming windows for operator instances with multiple input ports. In an example embodiment, the reservoir buffer might monitor the input ports to determine when a begin window tuple (e.g., a control tuple) with a new window identifier has been received by one of the input ports. The reservoir buffer might then emit a begin window tuple with that window identifier on the output port for the instance (e.g., using the container's message queue or another FIFO queue), in an example embodiment. But the reservoir buffer might emit an end window tuple with that window identifier on the output port for the instance (e.g., using the container's message queue or another FIFO queue) only after the reservoir buffer determines that an end window tuple with that identifier has been received by all of the input ports for the instance. It will be appreciated that in such an example embodiment, the instance's propagation of a begin window tuple (and the processing of the data tuples that follow the begin window tuple) is non-blocking with respect to the instance, whereas the instance's propagation of an end window tuple is blocking with respect to the instance (except, in an example embodiment, when performing the operations in a recovery policy as described below). Further, the completion of a streaming window in an instance of an operator (e.g., propagation of an end window through an instance, in an example embodiment) only occurs after all upstream instances have finished processing the streaming window. That is, the window identifier of the streaming window in an upstream instance is greater than or equal to the window identifier of the streaming window in the instance and the window identifier of the streaming window in a downstream instance is less than or equal to the window identifier of the streaming window in the instance. Also, in an example embodiment, the reservoir buffer might merge data tuples received on multiple input ports from different instances of the same upstream operator into a single queue (e.g., using the container's message queue or another FIFO queue), through a "first come-first served" approach to aggregation. This is illustrated in the following figure.

Figure 13:
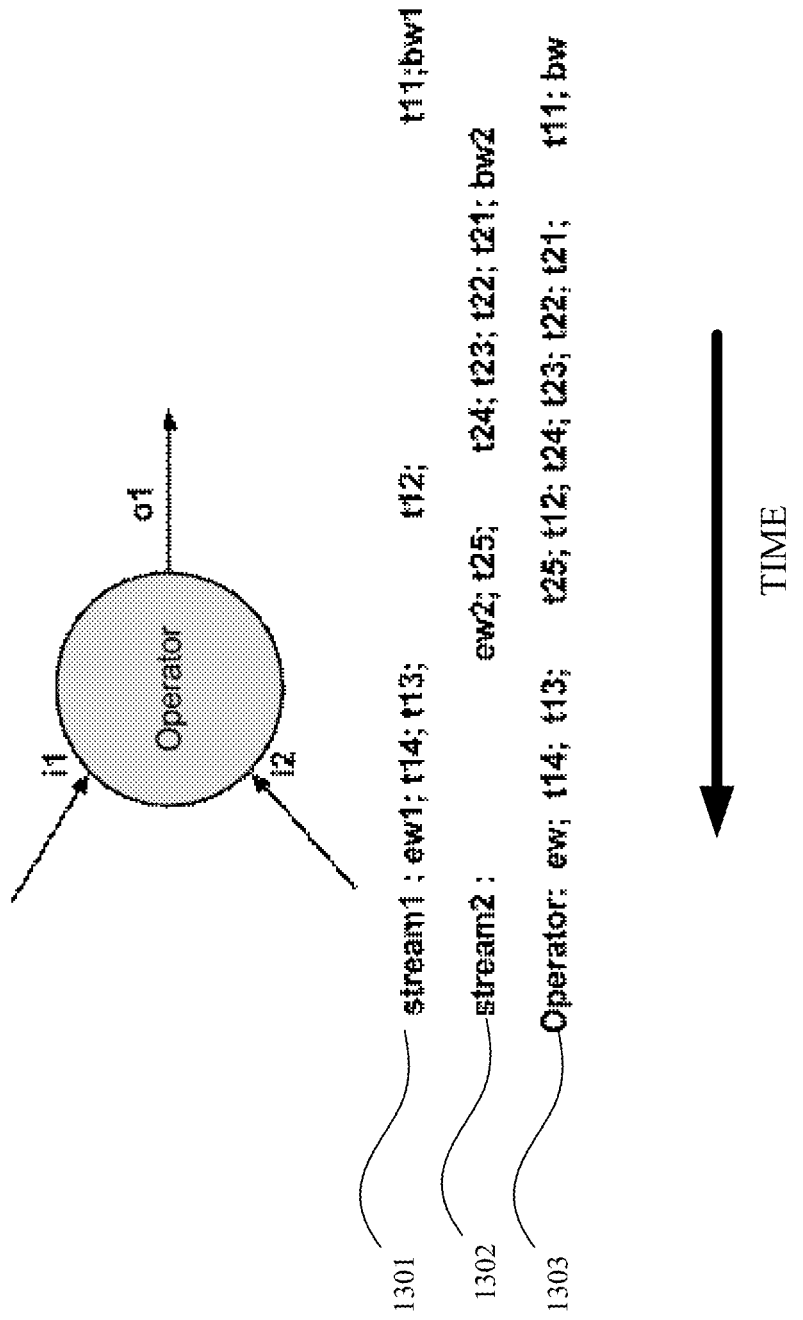
FIG. 13 is a diagram illustrating the flow of tuples in the streams of an operator instance with two input ports and one output port, in accordance with an example embodiment.

FIG. 13 is a diagram illustrating the flow of tuples in the streams of an operator instance with two input ports and one output port, in accordance with an example embodiment. As shown in this figure, the first input port (i1) receives a stream1 (1301) whose earliest tuples are bw1 (begin window 1) and t11 and whose latest tuple is ew1 (e.g., end window 1). The tuples bw1 and t11 arrive before any tuples from stream2 (1302), which is received by the second input port (i2). The earliest tuples in stream2 (1302) are bw2 (begin window 2) and t21 and the latest tuple in this stream is ew2 (end word 2). In an example embodiment, the operator processes tuples using a "first come-first served" approach resulting in a FIFO message queue 1303 for the output port (o1) where all of the tuples from the second stream are enqueued (e.g., processed) before the last three tuples of the first stream, even though it arrived first. Note that during the processing, the operator removed control tuples bw1, bw2, ew1, and ew2 and inserted in their stead control tuples bw and ew. In an example embodiment, the operator in this figure might be used for aggregating (or merging) streams from two instances of the same operator.

Figure 14A:
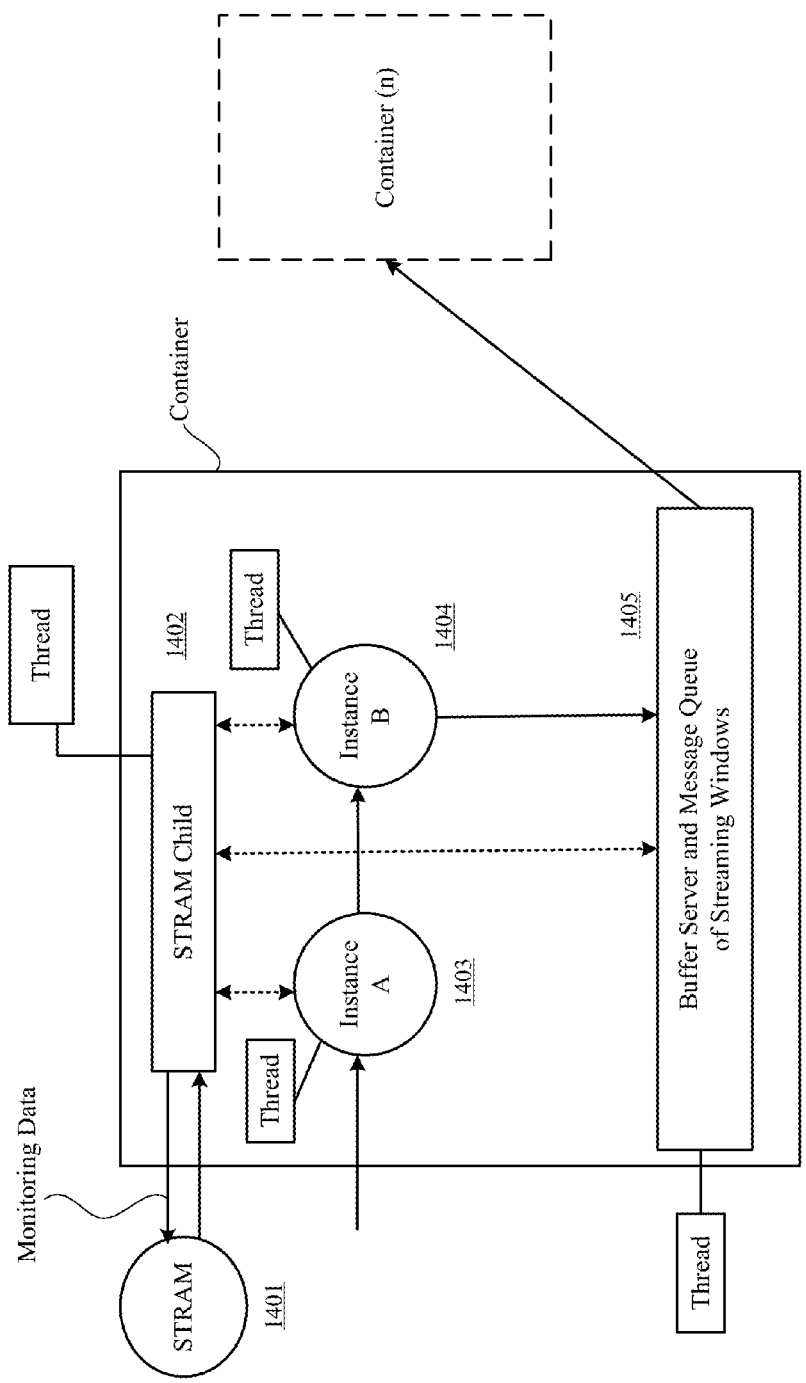
FIG. 14A is diagram showing the interactions between a STRAM and a STRAM Child, in an example embodiment.

FIG. 14A is diagram showing the interactions between a STRAM and a STRAM Child, in an example embodiment. As shown in this figure, the STRAM 1401 is the master of the STRAM Child 1402, its slave. In turn, the STRAM Child 1402 is the master of the instances, namely, instance 1403 (Instance A) and instance 1404 (Instance B). Additionally, the STRAM Child 1402 is the master of the Buffer Server 1405, which manages a message queue (FIFO, not priority) of streaming windows. Each slave (e.g., STRAM Child 1402 or instance 1404, respectively) reports monitoring data to its master (e.g., STRAM 1401 or STRAM Child 1402, respectively), which then makes dynamic adjustments which might be effected by the slave (e.g., STRAM Child 1402 or instance 1404, respectively). Also, as shown in this figure, STRAM Child 1402, instance 1403 (Instance A) and instance 1404 (Instance B), and Buffer Server 1405 might each be a single thread executing in a multithreaded process (or container), in an example embodiment.

FIG. 14B is a sequence diagram showing the initiation of a streaming application, in accordance with an example embodiment. As depicted in this figure, a streaming application is initiated by a command (e.g., from a user or a script identifying the location of the application's files in a file system such as HDFS) received at a command line interface (CLI), which might be a wrapper for a web service, in an example embodiment. The CLI communicates the command to a resource manager (RM), which might be a YARN Resource Manager, in operation 1. The RM then launches a streaming application manager (STRAM) in a container in operation 2, to start the application. The STRAM compiles the application (which includes a logical plan), produces a physical plan (from the logical plan) that partitions the operators into instances, obtains the containers for the physical plan from the RM, and determines an execution plan based on the physical plan and containers obtained. The STRAM then executes the execution plan, which creates one Stram Child in each container and which assigns the instances of the operators to the containers, in operation 3. Two input adapters then start the streams that feed the instances in the containers. Some of the streams are inline streams between instances in the same container. These streams avoid the overhead of a message queue managed by a buffer server. Some of the streams are node-local streams between instances in different containers on the same server. These streams pass though a message queue managed by a buffer server, but avoid the overhead of server NICs. And some of the streams are between instances on different servers, which incur the overhead of both the message queue managed by buffer server and a server NIC. The computations performed by the instances culminate in a stream that is output by a single output adapter, e.g., to a GUI displayed by a console or a file in a file system (e.g., HDFS).

Figure 14C:
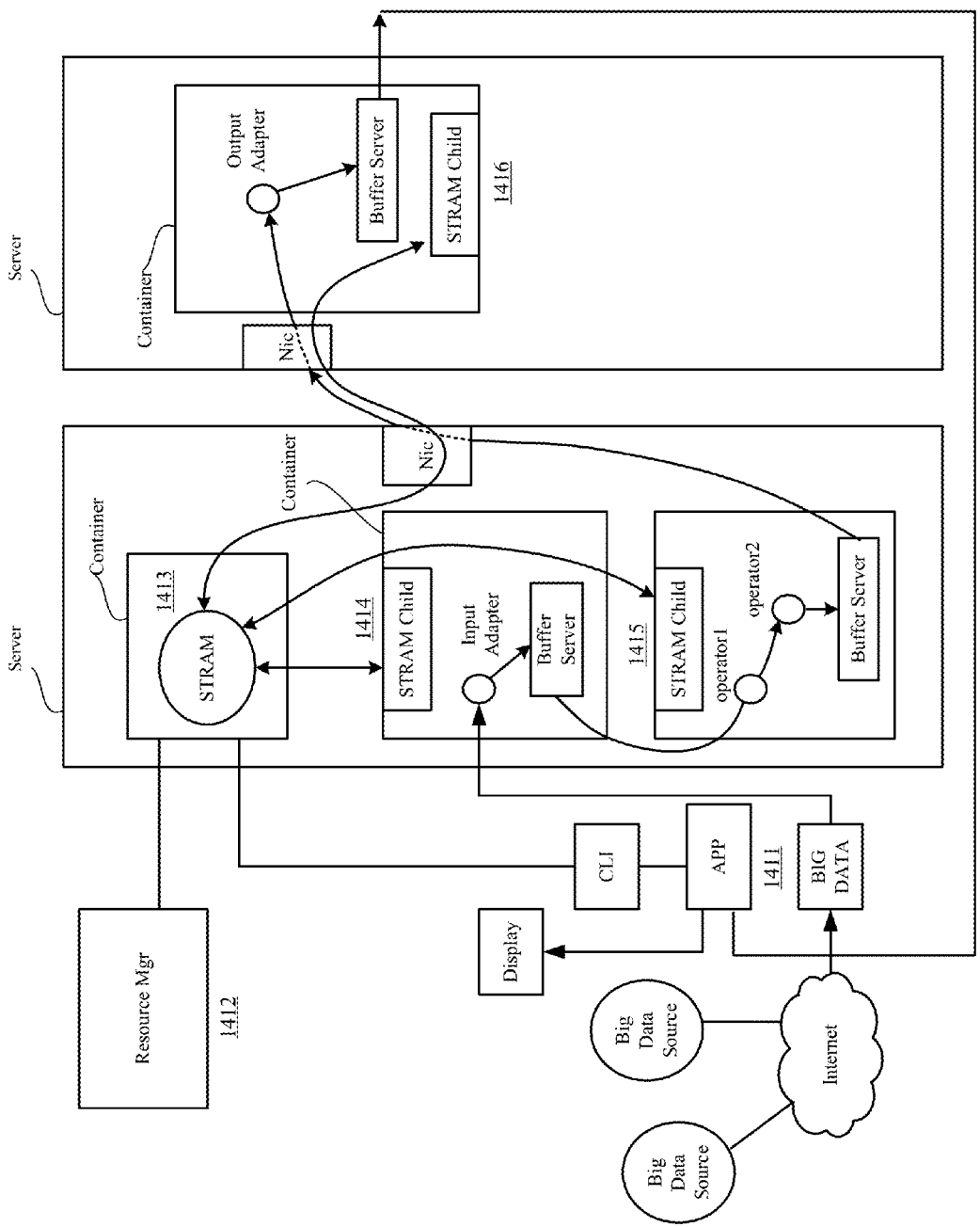
FIG. 14C is a diagram showing the ongoing execution of a streaming application, in accordance with an example embodiment.

FIG. 14C is a diagram showing the ongoing execution of a streaming application, in accordance with an example embodiment. As shown in this figure, an application 1411 communicates through a CLI with a STRAM 1413, that monitors and controls threes slaves (e.g., STRAM Child 1414, STRAM Child 1415, and STRAM Child 1416). In an example embodiment, each of the slaves executes in its container. As shown in the figure, a server in a networked cluster might have multiple containers. In order to make dynamic adjustments to the application through the slaves, the STRAM 1413 obtains resources (e.g., containers) from Resource Manager 1412. STRAM Child 1414 monitors and controls an input adapter, which receives a stream of streaming data from a source over the Internet and inserts control tuples into the streaming data, in an example embodiment. STRAM Child 1415 monitors and controls instances that perform computations on the streaming data. And STRAM Child 1416 monitors and controls an output adapter that removes the inserted control tuples and outputs the resultant streaming data to the application's display, in an example embodiment.

Figure 15A:
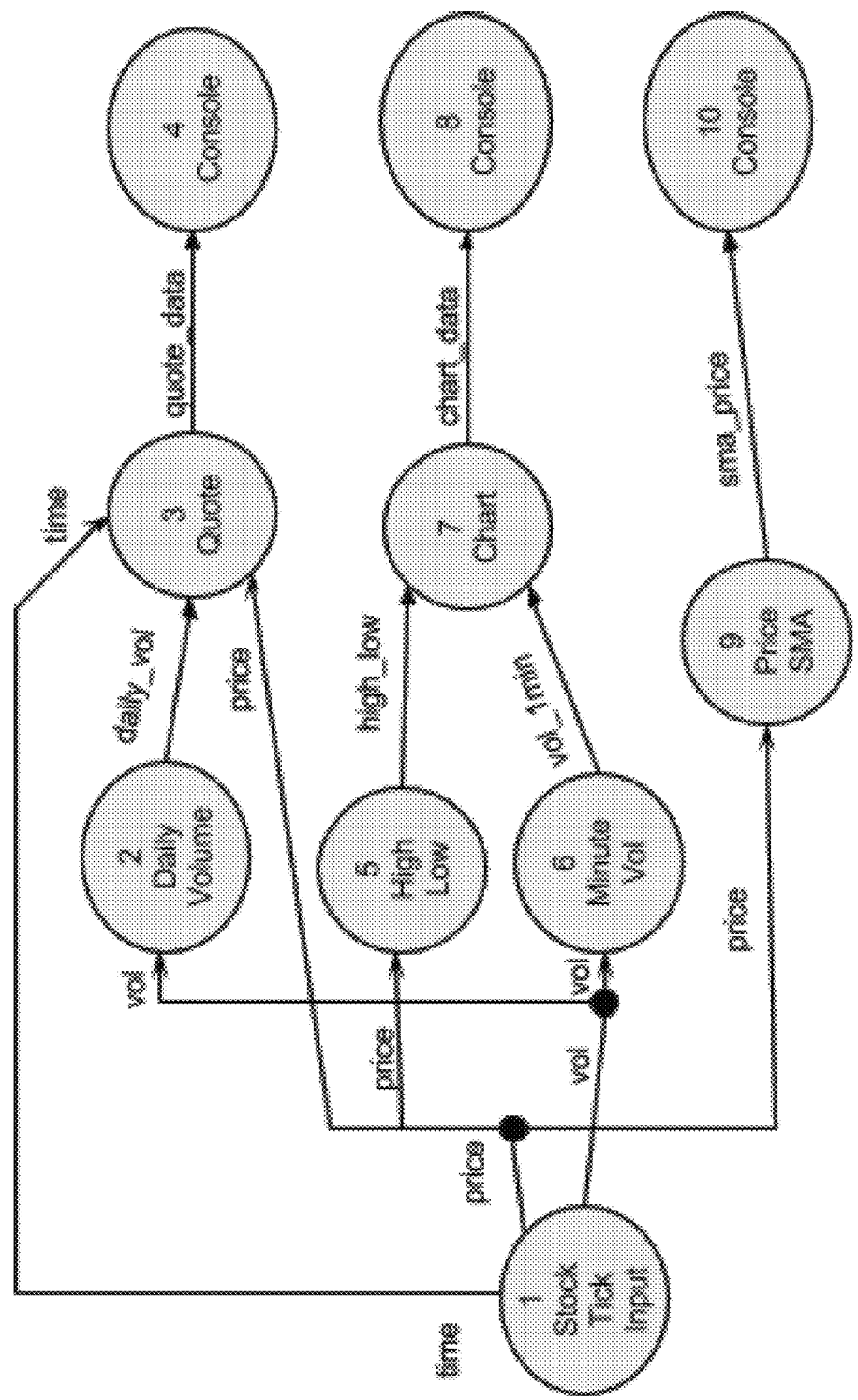
FIG. 15A is a logical plan for a streaming application that originates in a stock ticker, in accordance with an example embodiment.

FIG. 15A is a logical plan for a streaming application that originates in a stock ticker, in accordance with an example embodiment. Noted again for clarity, stock ticker data is only one example and other type of data that is not financial in nature can also be analyzed. Now, as shown in this figure, the logical plan includes operator 1 (Stock Tick Input) that inputs streams of data that include time, price, and volume into the application from an external source, e.g., a website such as Yahoo! Finance. Operator 1 (Stock Tick Input) transmits the volume stream to operator 2 (Daily Volume), which computes a stream of daily-volume data and transmits it to operator 3 (Quote), which also receives the time stream and the price stream from operator 1 (Stock Tick Input). Operator 3 (Quote) computes a stream of quote data and transmits it to operator 4 (Console), e.g., for display in a GUI. The GUI can be of any type of device, such as a desktop computer, a laptop computer, a portable device, a smartphone, a tablet computer, or any device that can present, display or render the data for the GUI.

Operator 1 (Stock Tick Input) also transmits the price stream to operator 5 (High Low), which computes a stream of high-low price data and transmits it to operator 7 (Chart). Operator 1 (Stock Tick Input) also transmits the volume stream to operator 6 (Minute Vol), which computes a stream of volume-per-minute data and transmits it to operator 7 (Chart). Operator 7 (Chart) computes a stream of chart data and transmits it to operator 8 (Console), e.g., for display in a GUI. Operator 1 (Stock Tick Input) also transmits the price stream to operator 9 (SMA or simple moving average), which computes a stream of sma-price data and transmits it to operator 10 (Console), e.g., for display in a GUI.

Figure 15B:
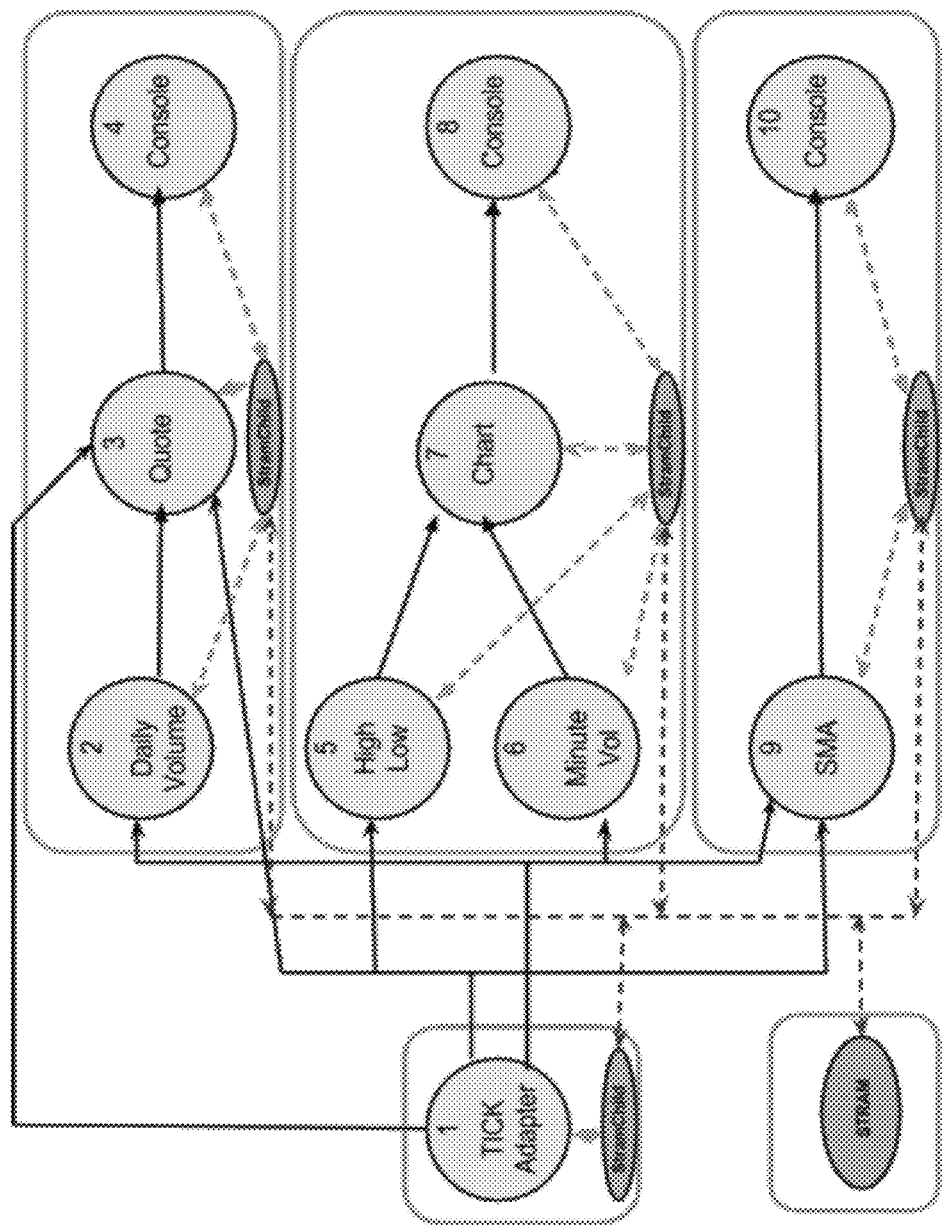
FIG. 15B is an execution plan for a streaming application that originates in a stock ticker, in accordance with an example embodiment.

FIG. 15B is an execution plan for a streaming application that originates in a stock ticker, in accordance with an example embodiment. This figure shows an execution plan for the logical plan described in FIG. 15A. As depicted in FIG. 15B, the STRAM is operating in its own container at the bottom left of the figure. Pursuant to the execution plan, the STRAM has assigned instance 1 (Stock Tick Input) to its own container, where it is monitored by a STRAM Child, which reports its results to the STRAM for dynamic adjustment (e.g., through the STRAM Child, which, in turn, controls the instances and the buffer server). Also pursuant to the execution plan, the STRAM has assigned instance 2 (Daily Volume), instance 3 (Quote), and instance 4 (Console) to one container, where they are jointly monitored by a STRAM Child, which reports its results to the STRAM for dynamic adjustment. The STRAM has assigned instance 5 (High Low), instance 6 (Minute Vol), instance 7 (Chart), and instance 8 (Console), where they are jointly monitored by a STRAM Child, which reports its results to the STRAM for dynamic adjustment. And the STRAM has instance 9 (SMA), and instance 10 (Console) to one container, where they are jointly monitored by a STRAM Child, which reports its results to the STRAM for dynamic adjustment. It will be appreciated that the execution plan shown in FIG. 15B makes use of few inter-container streams, since such streams incur overhead associated with the transmission of the stream through the upstream container's message queue managed (e.g., managed by a buffer server). Inter-server streams incur an even greater overhead associated with the transmission of the stream through NICs.

In an example embodiment, operator instances in physical plans and execution plans might be identified as integers, rather than strings, chars, etc., for purposes of performance efficiency.

Figure 16A:
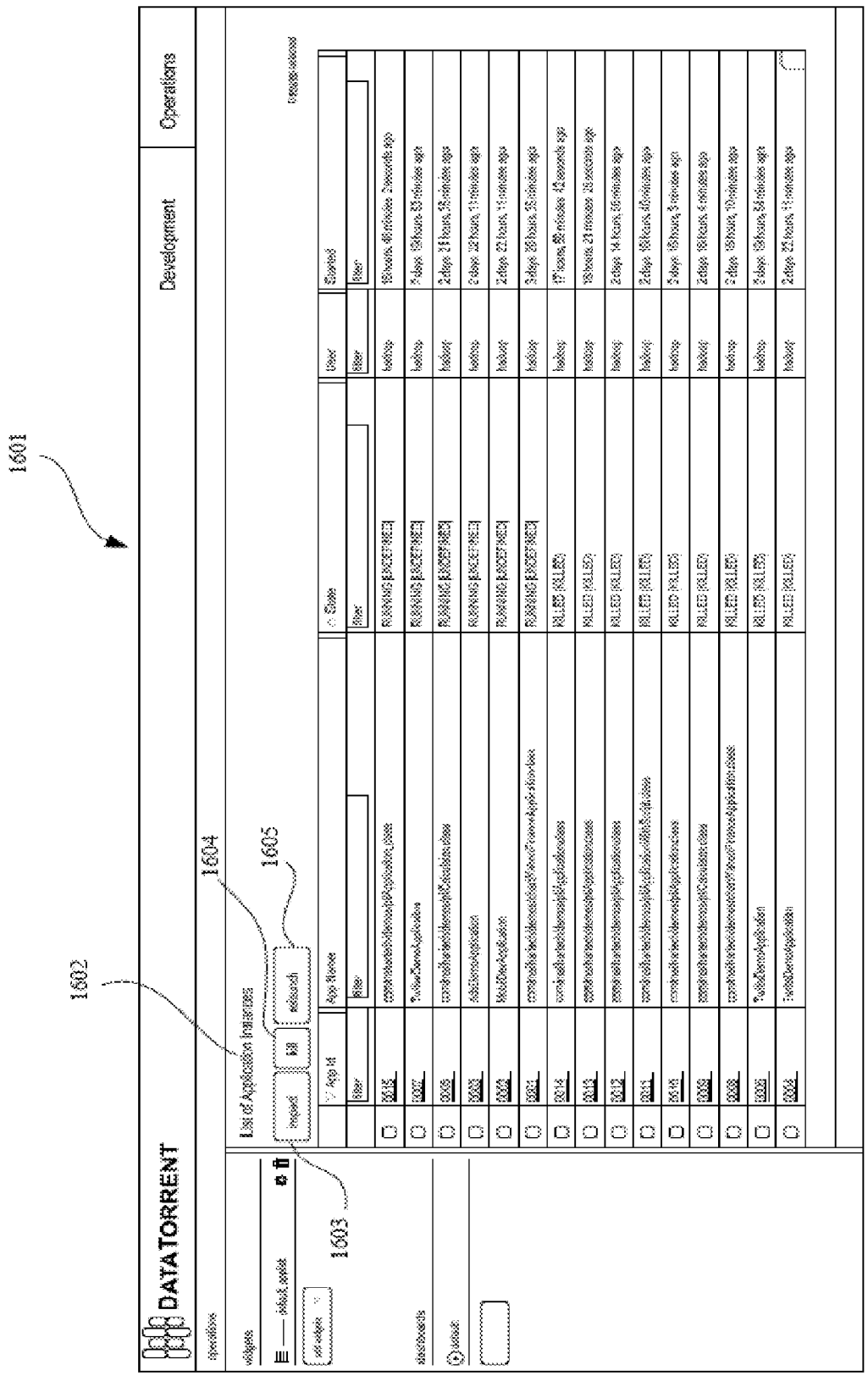
FIGS. 16A to 16E illustrate an application dashboard in a graphical user interface (GUI) for a distributed streaming platform, in accordance with an example embodiment.

FIGS. 16A to 16E illustrate an application dashboard in a graphical user interface (GUI) for a distributed streaming platform, in accordance with an example embodiment. As depicted in FIG. 16A, a dashboard displayed by the distributed streaming platform might include a GUI view 1601 that includes a list 1602 of the application instances being run by the distributed streaming platform. It will be appreciated that the distributed streaming platform might support multiple tenants (e.g., application instances), in an example embodiment. GUI view 1601 also includes GUI controls 1603, 1604, and 1605. If a user checks the checkbox next to one of the application instances in list 1602 and clicks control 1603 (labeled "inspect"), the application dashboard might display a view that shows data for that application instance, such as the view shown in following figure. If a user checks the checkbox next to one of the application instances in list 1602 and clicks control 1604 (labeled "kill"), the application dashboard might stop the application instance, if it is running And if a user checks the checkbox next to one of the application instances in list 1602 and clicks control 1605 (labeled "relaunch"), the application dashboard might re-launch the application instance, if it has been killed.

Figure 16B:
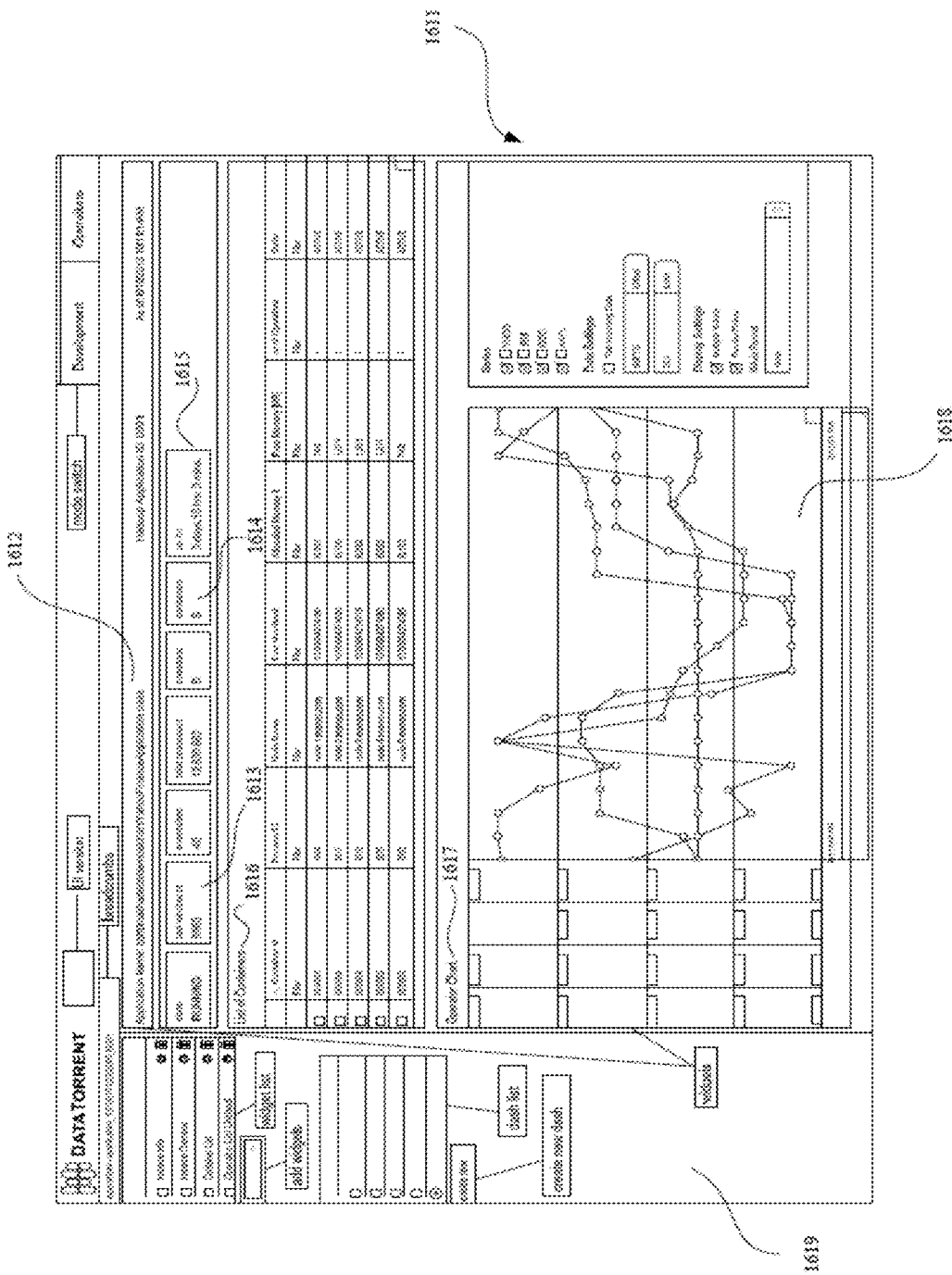
Figure 16C:
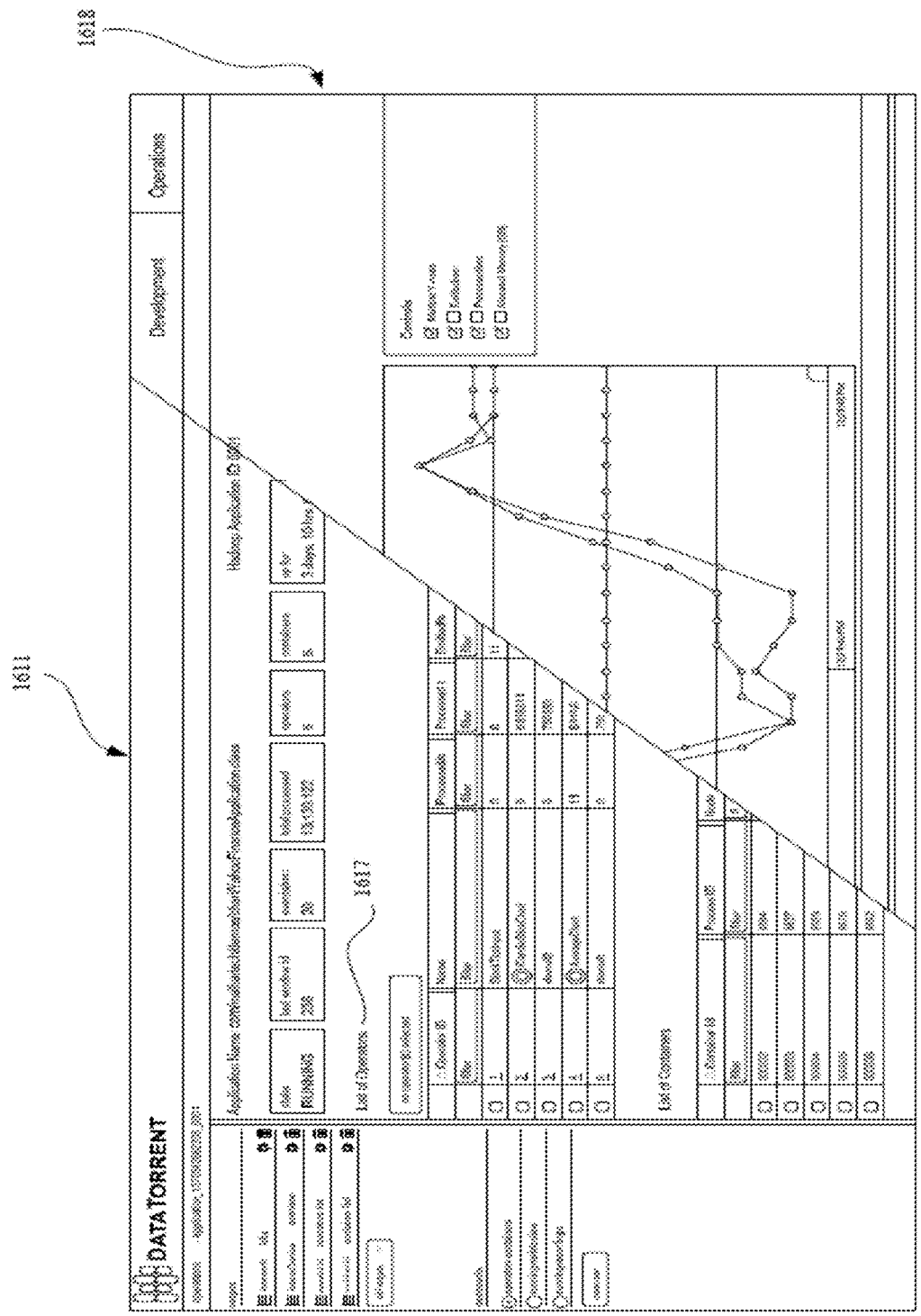

FIG. 16B shows a GUI view 1611 that might be displayed when a user enters a command to inspect an application instance, e.g., using control 1603 in FIG. 16A. The GUI view 1611 displays data for an application instance identified by application name 1612 (whose value is "com/mailhartech/demos/chart/YahooFinanceApplication.class"). The data displayed for the application includes the last window identifier 1613 (whose value is 8860), the number 1614 of containers (whose value is 5) and the period 1615 of time that the application has been running (3 days, 10 hours, 3 minutes). GUI view 1611 also displays a list 1616 of the 5 containers used by the application, a chart 1617 of the operators used by the application, and graph 1618 of metrics related to the application. As indicated by the GUI controls in the toolbar 1619 in GUI view 1611, the application dashboard can be customized by the user through the addition of new widgets to an existing dashboard or the creation of a new dashboard. FIG. 16C shows a close-up diagram of the chart 1617 and the graph 1618 in FIG. 16B.

Figure 16D:
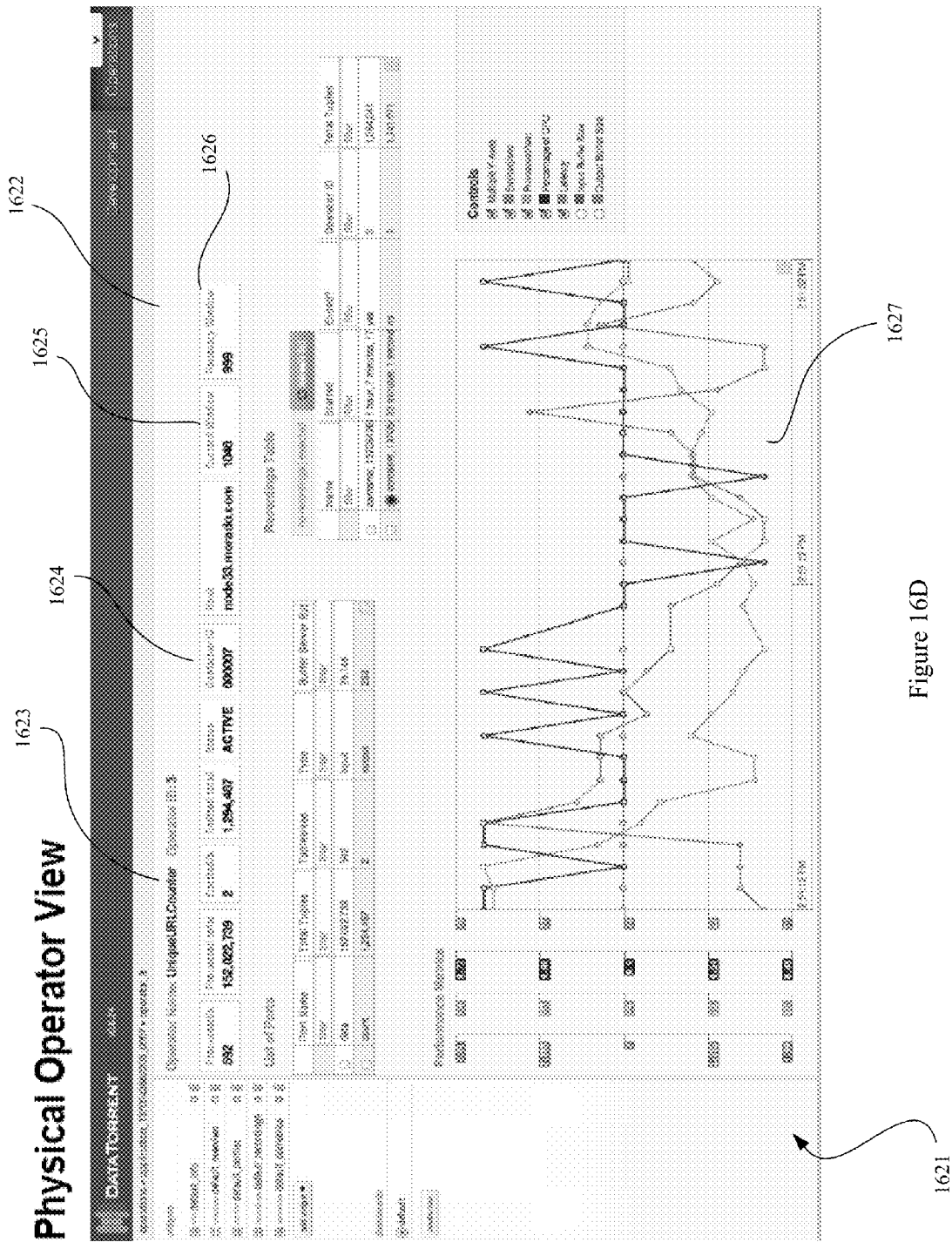
Figure 16E:
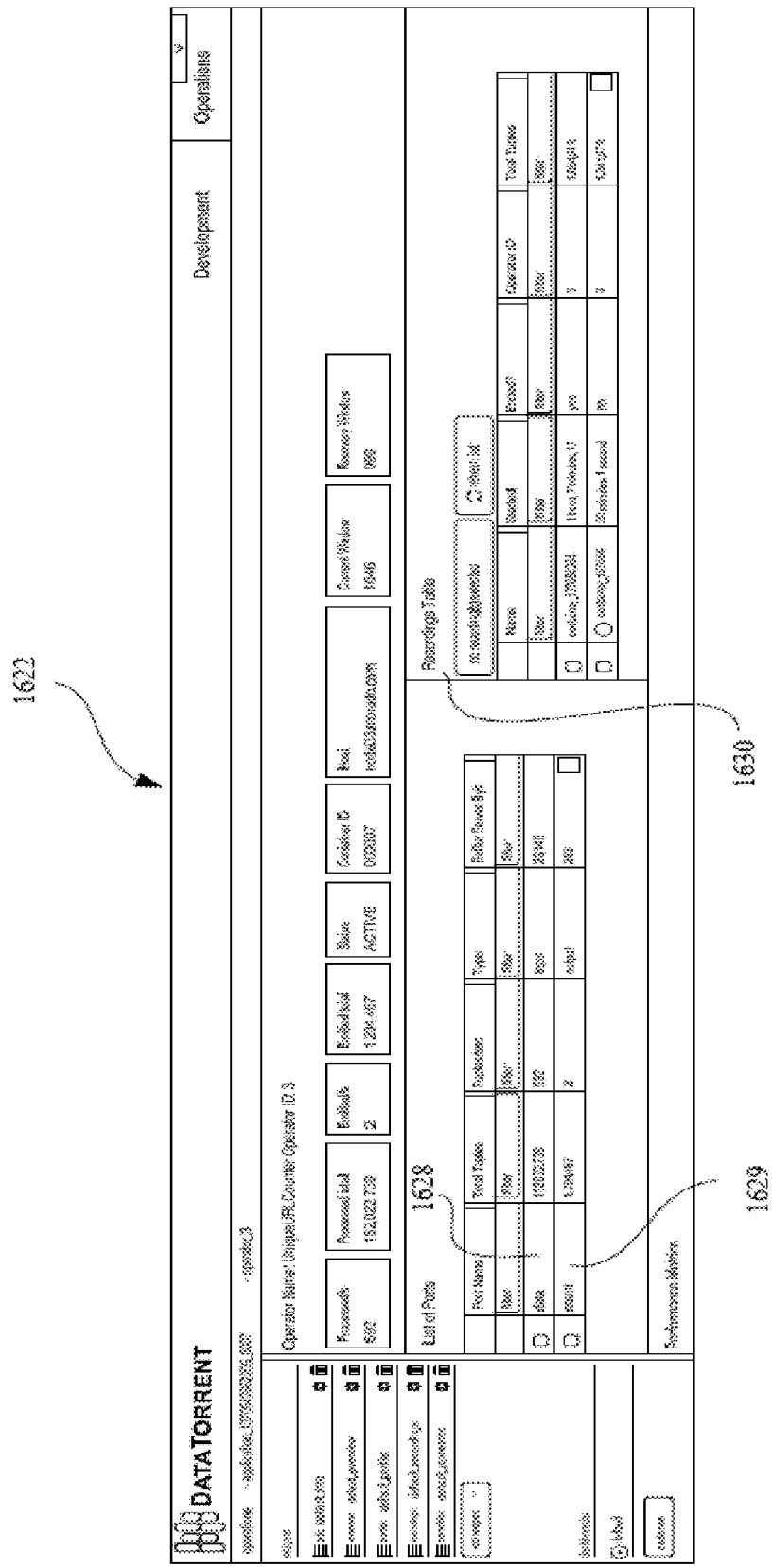

FIG. 16D shows a GUI view 1621 that might be displayed when a user enters a command to inspect an operator instance, e.g., by clicking on an operator instance in FIG. 16B. GUI view 1621 includes table 1622 and a graph 1627. The table 1622 might include a name 1623 for the operator instance (whose value is "UniqueURLCounter"), a container identifier 1624 (whose value is 7), a current window 1625 (whose value is 1046), and a recovery window 1626 (whose value is 999). The graph 1627 displays performance metrics for the operator instance, e.g., Emitted/sec, Processed/sec, Percentage of CPU, and Latency. FIG. 16E is a close-up diagram of table 1622. The table 1622 includes a list of ports which shows an input port 1628 with tuples named "data" and an output port 1629 with tuples named "count". The table 1622 also includes a recording table 1630, which facilitates debugging as explained further below.

Figure 17A:
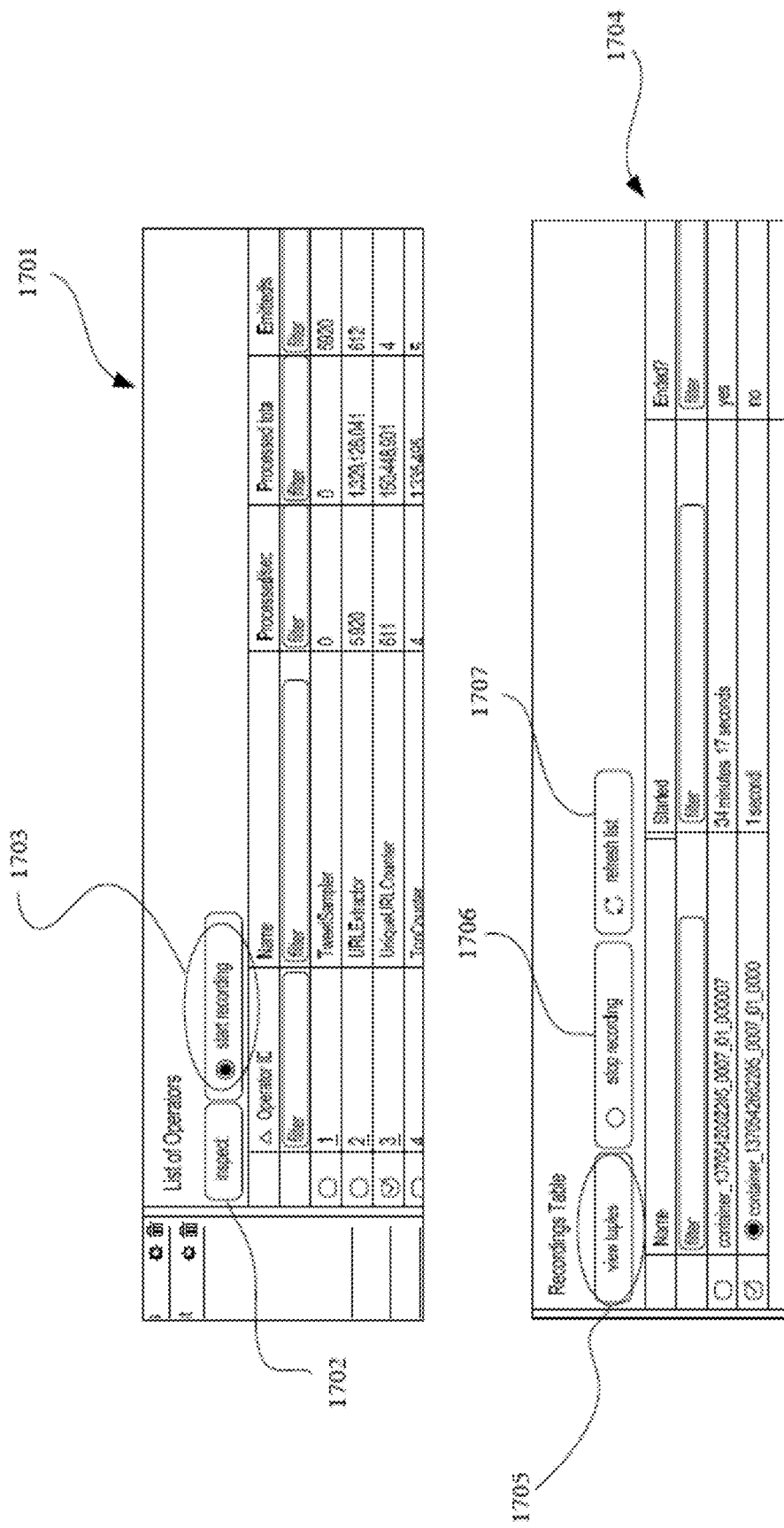
FIGS. 17A to 17C illustrate GUI views for debugging an application running on a distributed streaming platform, in accordance with an example embodiment.
Figure 17B:
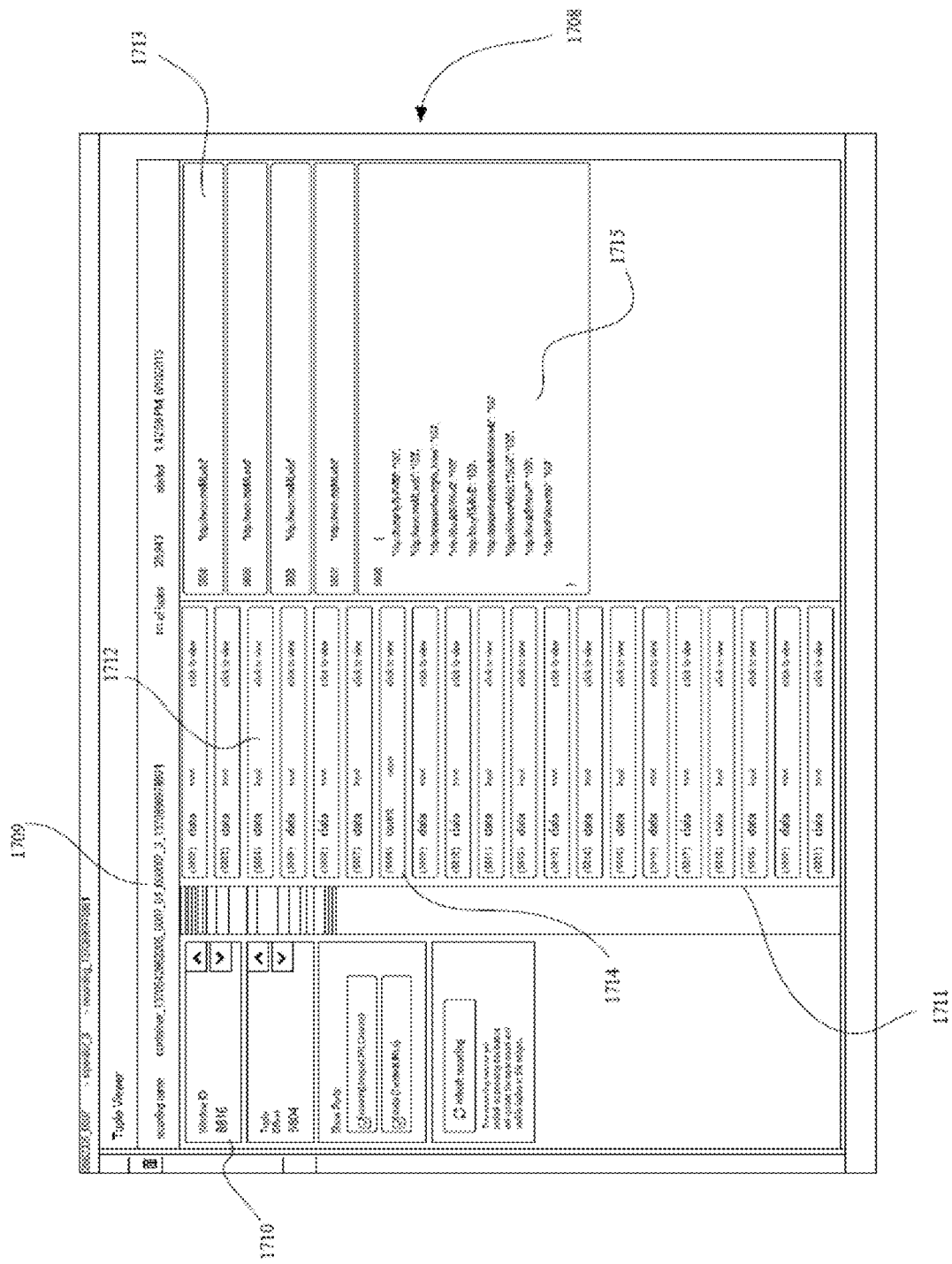
Figure 17C:
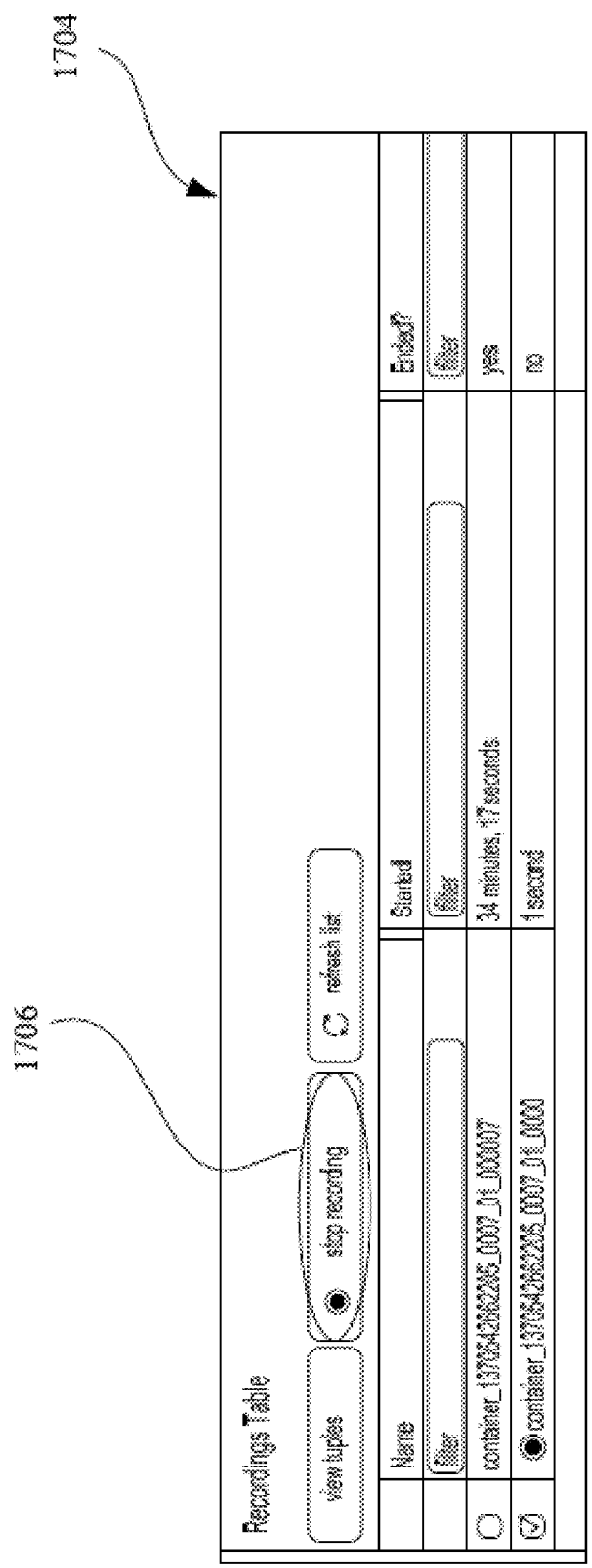

FIGS. 17A to 17C illustrate GUI views for debugging an application running on a distributed streaming platform, in accordance with an example embodiment. FIG. 17A includes a GUI view 1701 that might be displayed when a user selects an operator from the list 1617 of operators shown in FIG. 16C. As shown in FIG. 17A, the selection of an operator instance results in the display of two GUI controls, a control 1702 labeled "inspect" that allows a user to see further data regarding the selected instance and a control 1703 labeled "start recording" that allows a user to record the data related to the processing of tuples by the selected instance.

FIG. 17A also includes a GUI view 1704 which might be displayed (e.g., as part of table 22 in FIG. 16E) when a user clicks control 1703 in GUI view 1701. GUI view 104 includes three controls: (a) a control 1705 labeled "view tuples"; (b) a control 1706 labeled "stop recording"; and (c) a control 1707 labeled "refresh list". If a user clicks on the control labeled 1705, the distributing steaming platform might display the GUI view 1708 shown in FIG. 17B.

GUI view 1708 is a tuple viewer associated with a recording whose name 1709 is "container_1370542662205_0007_01_000007_3_13708969788911". GUI view 1708 also includes a window identifier 1710 (whose value is 8816) that shows the streaming window that is the source of the tuples shown in the GUI view and processed by the selected instance (e.g., "operator 3" as shown at the top left of the view). The tuples themselves are shown as a scrollable stream 1711, with the earliest tuple at the top of the stream and the latest tuple at the bottom of the stream. Tuple 1712 is an input tuple ("data" in terms of table 1622) whose identifying number is 5804 and whose value 1713 is a URL, namely, "http://twcm.me/MLwbd". Tuple 1714 is an output tuple ("count" in terms of table 1622) whose identifying number is 5808 and whose value 1715 includes "http://twcm.me/MLwdb": "100", which is a count of the number of times that the URL "http://twcm.me/MLwbd" has been seen. FIG. 17C shows GUI view 1704 after a user has clicked control 1706 to stop the recording of data related to tuples processed by the selected instance.

Figure 18:
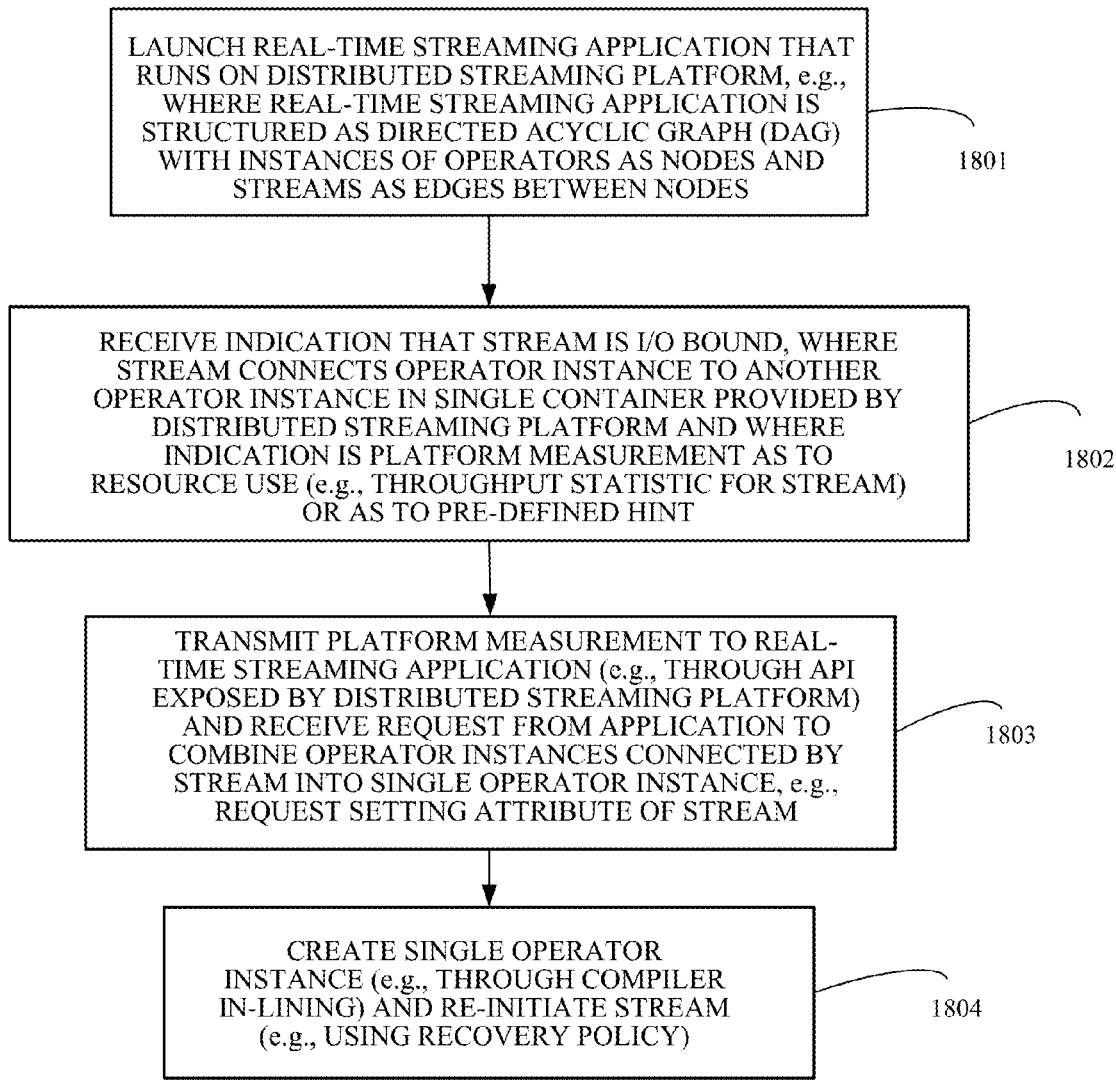
FIG. 18 is a flowchart diagram that illustrates a process for combining two operator instances connected by a stream in a container, in accordance with an example embodiment.

FIG. 18 is a flowchart diagram that illustrates a process for combining two operator instances connected by a stream in a container, in accordance with an example embodiment. In an example embodiment, this process might be performed by the Streaming Application Master (STRAM). In the same or an alternative embodiment, some or all of the operations of this process might be performed by a STRAM child (e.g., a slave) or other software in the distributed streaming platform.

As depicted in FIG. 18, the software (e.g., the STRAM) launches a real-time streaming application that runs on a distributed streaming platform, in operation 1801. In an example embodiment, the real-time streaming application might be structured as a directed acyclic graph (DAG) with instances of operators as nodes and streams as edges between nodes, as described earlier. In operation 1802, the software receives an indication that a stream is I/O bound, where a stream connects one operator instance to another operator instance in a single container provided by the distributed streaming platform. In an example embodiment, the indication is a platform measurement as to resource use, e.g., throughput of streaming windows or tuples for the stream. Or the indication might be a platform measurement as to a pre-defined hint, as described in further detail below. Then in operation 1803, the software transmits the platform measurement to the real-time streaming application (e.g., through an API exposed by the distributed streaming platform) and receives a request (e.g., a request setting an attribute of a stream) from the real-time streaming application to combine the operator instances connected by the stream into a single operator instance. And in operation 1804, the software creates a single operator instance (e.g., through compiler in-lining) and re-initiates the stream (e.g., using a recovery policy such as at least once, at most once, exactly once, etc.).

In an example embodiment, each of the operations in this process might be executed in real time or near real time rather than offline. Moreover, some of the operations described in the process (e.g., the operations following the original launch of the real-time streaming application) might be continuous or non-stop operations, in an example embodiment.

In operation 1802, the software receives an indication that a stream is I/O bound. Recall that in an example embodiment, an operator instance might be a thread and a server buffer managing a message queue for stream might be a thread. It will be appreciated that the term "I/O bound" is a term of art in the field of computer science and refers to a condition where the time period to complete a computation (e.g., the operations performed by a thread) is primarily determined by time spent waiting for read/write operations to be completed, e.g., reading/writing to storage (e.g., to volatile storage such as main memory or to persistent storage such as a hard disk or flash memory). By contrast, the term "CPU bound" refers to a condition where the time period to complete a computation (e.g., the operations performed by a thread) is primarily determined by time spent processing data. It will be appreciated that a stream might become I/O bound, for example, if the streaming windows of tuples processed by a thread involved in the stream (e.g., an operator instance or a server buffer) spill over from main memory to persistent storage. In an example embodiment, the software might determine that a stream is I/O bound if throughput increases as a result of a partition of one or both of the stream's operator instances, e.g., when the software performs automated sensitivity analysis with respect to partitioning and throughput. It will be appreciated that such partitioning might be avoided by combining the operator instances connected by a stream into a single operator instance, which, in turn, might free up resources such as containers.

In operation 1803, the software from the real-time streaming application receives a request to combine the operator instances connected by the stream into a single operator instance. In an example embodiment, the request might involve the setting of an attribute on the stream, e.g., STREAM_LOCALITY=ThreadLocal. In the same or other embodiments, the request might take the form of a change to the stream mode as described earlier, e.g., from in-node to in-line or from in-rack to in-line. In FIG. 18, the request occurs at run-time, e.g., after the launch of the real-time streaming application. Alternatively, the request might occur prior to launch, in the logical plan (e.g., the specification) for the real-time streaming application.

Figure 19:
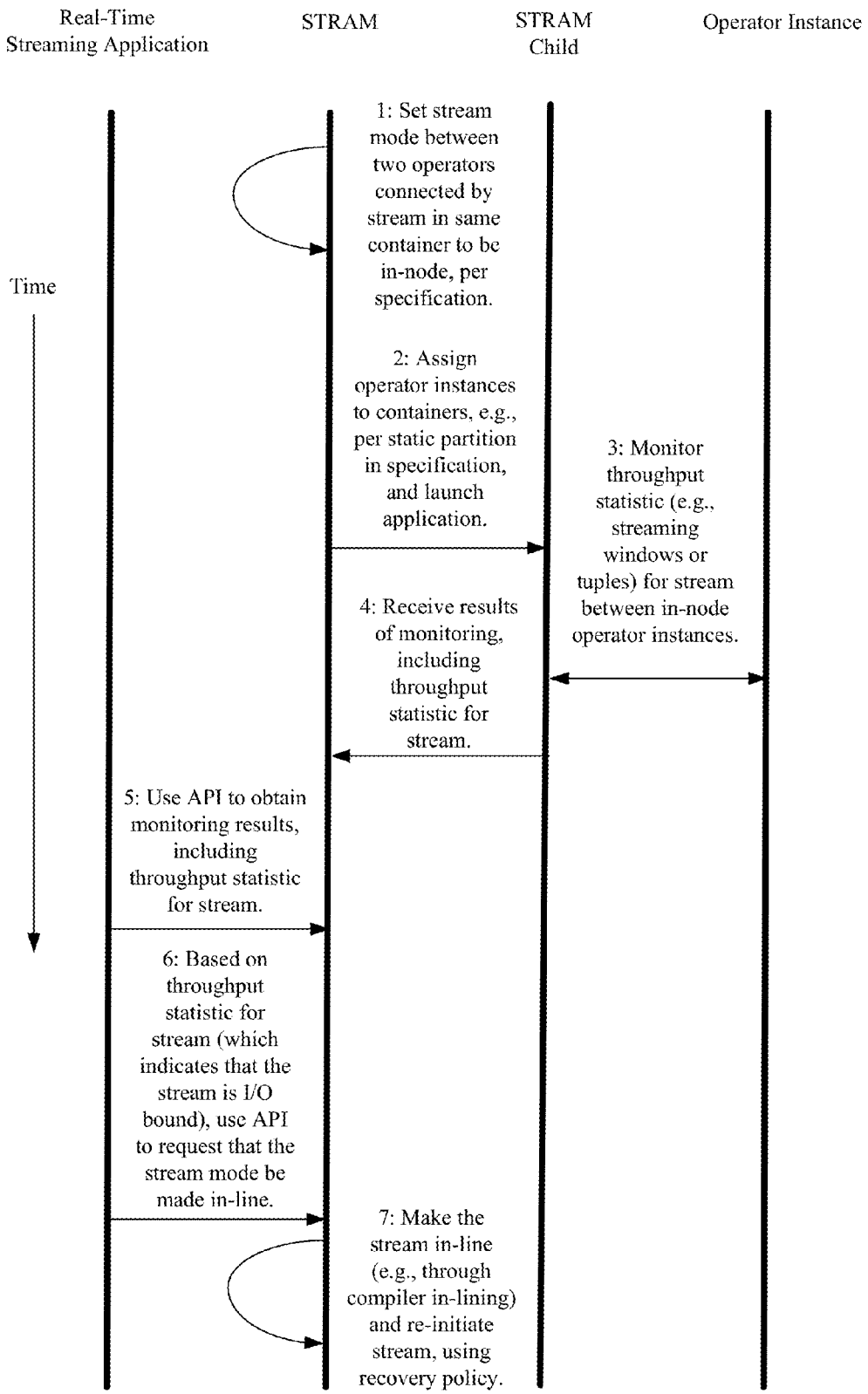
FIG. 19 is a sequence diagram that shows the components involved in combining two operator instances connected by a stream in a container, in accordance with an example embodiment.

FIG. 19 is a sequence diagram that shows the components involved in combining two operator instances connected by a stream in a container, in accordance with an example embodiment. It will be appreciated that this figure involves operations similar to those depicted in FIG. 18. As shown in FIG. 19, there might be four components involved in combining two operator instances connected by a stream in a container: (a) a real-time streaming application; (b) a STRAM; (c) a STRAM child; and (d) the operator instances. In operation 1, which is earliest in time, the STRAM sets the stream mode between two operator instances connected by a stream in a container to be in-node, e.g., per the specification for the real-time streaming application. In operation 2, the STRAM assigns the operator instances to the containers, e.g., per a partition in the specification, and launches the application. In operations 3, a STRAM child monitors a throughput statistic (e.g., throughput of streaming windows or tuples) for a stream between two in-node operator instances in a single container. In operation 4, the STRAM receives the results of the monitoring (including the throughput statistic) from the STRAM child and, in operation 5, the real-time streaming application obtains the results using an API exposed by the distributed streaming platform. Based on the throughput statistic for the stream (e.g., which indicates that the stream is I/O bound), the real-time streaming application uses the API to request that the stream mode be made in-line (e.g., that the stream's locality be made "ThreadLocal"), in operation 6. In an example embodiment, such a stream mode will result in the two operator instances connected by the stream being combined into a single operator instance. Then in operation 7, the STRAM makes the stream in-line (e.g., through compiler in-lining) and re-initiates the stream, e.g., using a recovery policy.

It will be appreciated that in FIG. 19, a throughput statistic provides the indication that a stream is I/O bound. However, in the same or an alternative embodiment, the indication might involve (s) a platform measurement of another statistic or (b) a platform measurement as to a pre-defined hint, e.g., number of hash table/map keys.

Figure 20:
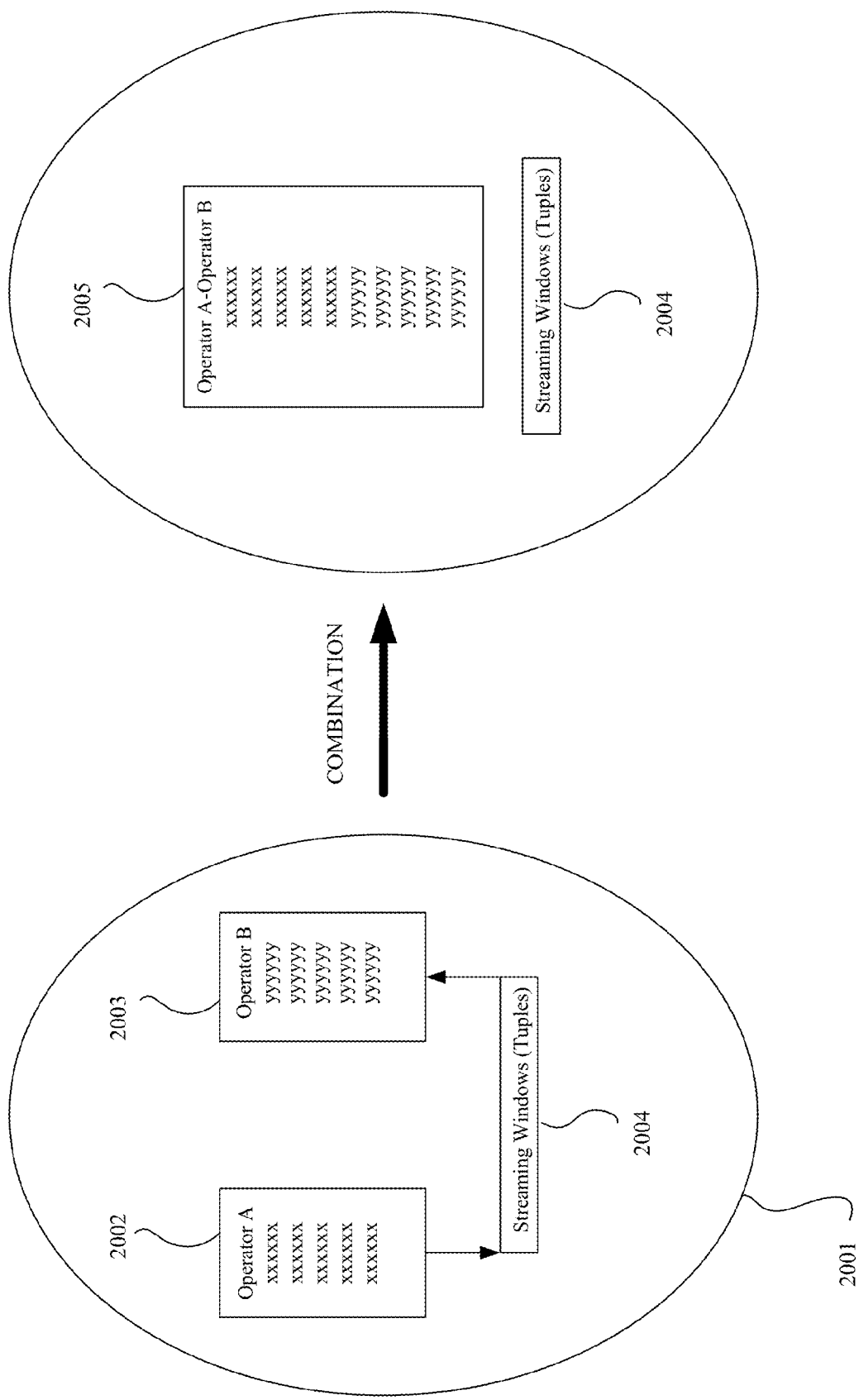
FIG. 20 is a diagram showing the combination of two operator instances connected by a stream in a container, in accordance with an example embodiment.

FIG. 20 is a diagram showing the combination of two operator instances connected by a stream in a container, in accordance with an example embodiment. As depicted in this figure, operator instance 2002 (labeled Operator A) and operator instance 2003 (labeled Operator B) are connected by a stream in a single container 2001 on the left side of the arrow before combination. The stream is associated with a message queue 2004 (a main-memory buffer backed by persistent storage) managed by a buffer server (which might be a thread in an example embodiment) that receives streaming windows of tuples from Operator A and transmits them in order to Operator B. Following combination, single container 2001, on the right side of the arrow, contains only one operator instance 2005 (labeled Operator A-Operator B), which does not use the message queue 2004. In an example embodiment, the combination of the two operator instances into a single operator instance might be done by pausing the stream between the two operator instances, in-lining the program instructions for the two operator instances, recompiling, and re-initiating the stream using a recovery policy.

Figure 21:
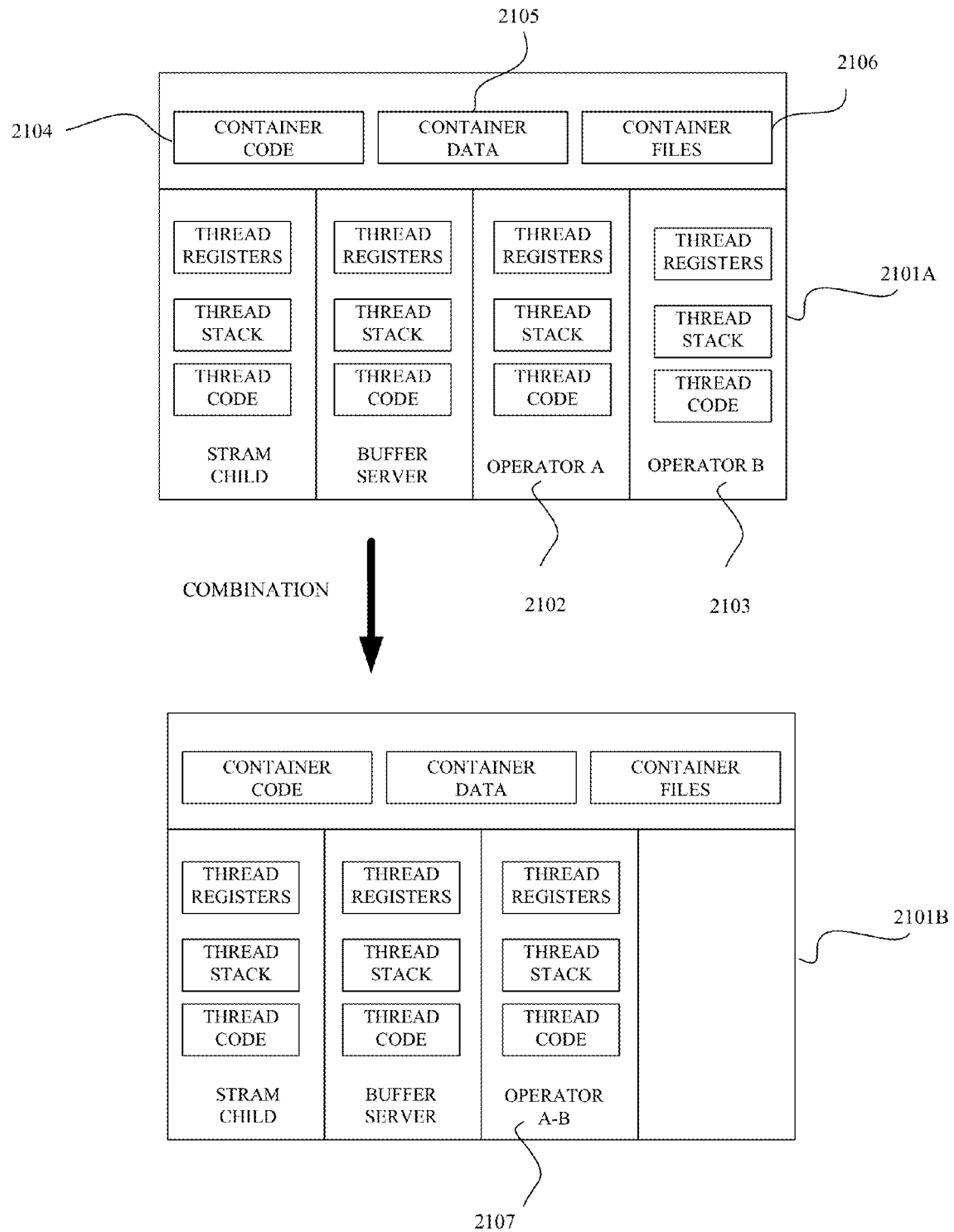
FIG. 21 is a diagram showing the call stacks for a combined operator instance resulting from the combination of two operator instances connected by a stream in a container, in accordance with an example embodiment.

FIG. 21 is a diagram showing the call stacks for a combined operator instance resulting from the combination of two operator instances connected by a stream in a container, in accordance with an example embodiment. As depicted in this figure, call stack 2101A is a call stack for a container with a STRAM child, a buffer server, an operator instance 2102 (labeled Operator A), and an operator instance 2103 (labeled Operator B) before combination of the operator instances. In an example embodiment, the container might be a process, the STRAM child might be a thread, the buffer server might be a thread, and each operator instance might be a thread. In an example embodiment, call stack 2101A might include container code 2104, container data 2105, and container files 2106. Additionally, call stack 2101A might also include thread registers, a thread stack, and thread code for each of the four threads: the STRAM child, the buffer server, operator instance 2102, and operator instance 2103. Following combination of operator instance 2102 and operator instance 2103, call stack 2101B includes thread registers, a thread stack, and thread code for a single operator instance, operator instance 2107 (labeled Operator A-B). It will be appreciated that the overhead (e.g., call and/or return time for each execution of a thread) associated with call stack 2101B is less than the overhead associated with call stack 2101A, since there is one less operator instance in the former call stack.

Figure 22:
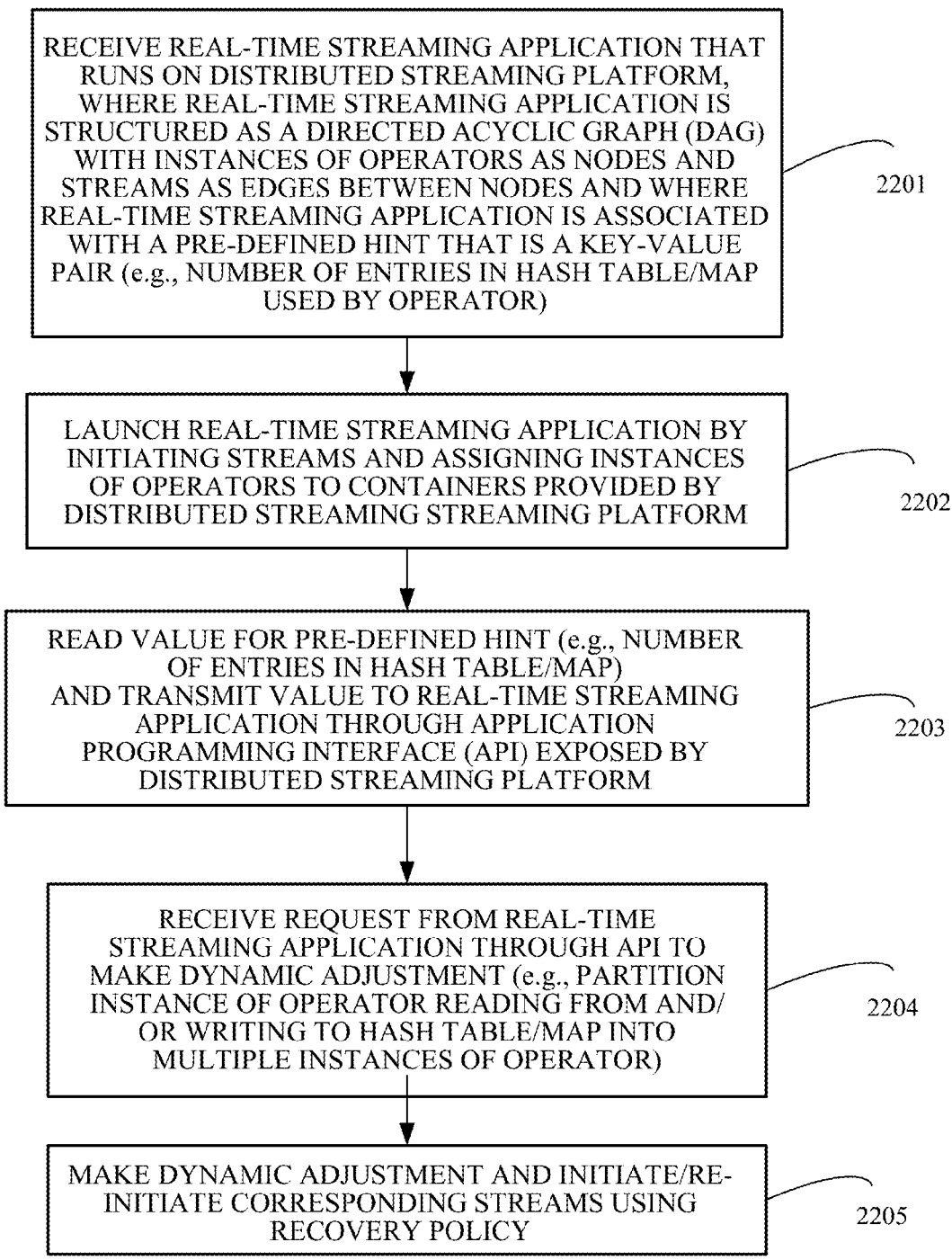
FIG. 22 is a flowchart diagram that illustrates a process for creating a dynamic partition using a pre-defined hint, in accordance with an example embodiment.

FIG. 22 is a flowchart diagram that illustrates a process for creating a dynamic partition using a pre-defined hint, in accordance with an example embodiment. In an example embodiment, this process might be performed by the Streaming Application Master (STRAM). In the same or an alternative embodiment, some or all of the operations of this process might be performed by a STRAM child (e.g., a slave) or other software in the distributed streaming platform.

As depicted in FIG. 22, the software (e.g., the STRAM) receives a real-time streaming application that runs on a distributed streaming platform, in operation 2201. In an example embodiment, the real-time streaming application is structured as a directed acyclic graph (DAG) with instances of operators as nodes and streams as edges between nodes. The real-time streaming application is associated with a pre-defined hint that is a key-value pair (e.g., the number of entries in a hash table/map). In operation 2202, the software launches the real-time streaming application by initiating streams and assigning instances of operators to containers provided by the distributed streaming platform. In operation 2203, the software reads the value for a pre-defined hint (e.g., the number of entries in hash table/map) and transmits the value to the real-time streaming application through an application programming interface (API) exposed by the distributed streaming platform. Then in operation 2204, the software receives a request from the real-time streaming application through the API to make a dynamic adjustment (e.g., partition an instance of an operator reading from and/or writing to a hash table/map into multiple instances of the operator). And in operation 2205, the software makes the dynamic adjustment and initiates/re-initiates the corresponding streams using a recovery policy, as described above.

Here again, each of the operations in this process might be executed in real time or near real time rather than offline, in an example embodiment. Moreover, some of the operations described in the process (e.g., the operations following the original launch of the real-time streaming application) might be continuous or non-stop operations, in an example embodiment.

The process described above uses as an example a key-value pair that is number of entries in a hash table/map. This example is not meant to be limiting. For example, in the same or other embodiments, the key-value pair might be a count associated with another data structure, e.g., the number of entries in a linked list.

In operation 2205, the software makes a dynamic adjustment, e.g., partitioning an instance of an operator reading from and/or writing to a hash table/map into multiple instances (e.g., 3 instances) of the operator. In an example embodiment, this dynamic partitioning might result in the creation of multiple instances (e.g., 3 instances) of the hash table/map, for example, if the hash table/map is local variable (e.g., on the thread stack) for the operator instance. Or the dynamic partitioning might result in no new additional instances of the hash table/map, for example, if the hash table/map is a global variable (e.g., container data) for the operator instance. In an example embodiment, the dynamic adjustment might not involve partitioning an operator instance. Rather, the dynamic adjustment might involve setting/unsetting an operator attribute (e.g., a customization of the operational behavior of an operator). Or the dynamic adjustment might involve setting or unsetting an operator property (e.g., a customization of the formal definition of an operator). Also, in an example embodiment, the dynamic adjustment might involve setting the locality attribute of a stream to ThreadLocal to combine two operators into one. Or the dynamic adjustment might involve flushing a hash table/map to disk.

Figure 23:
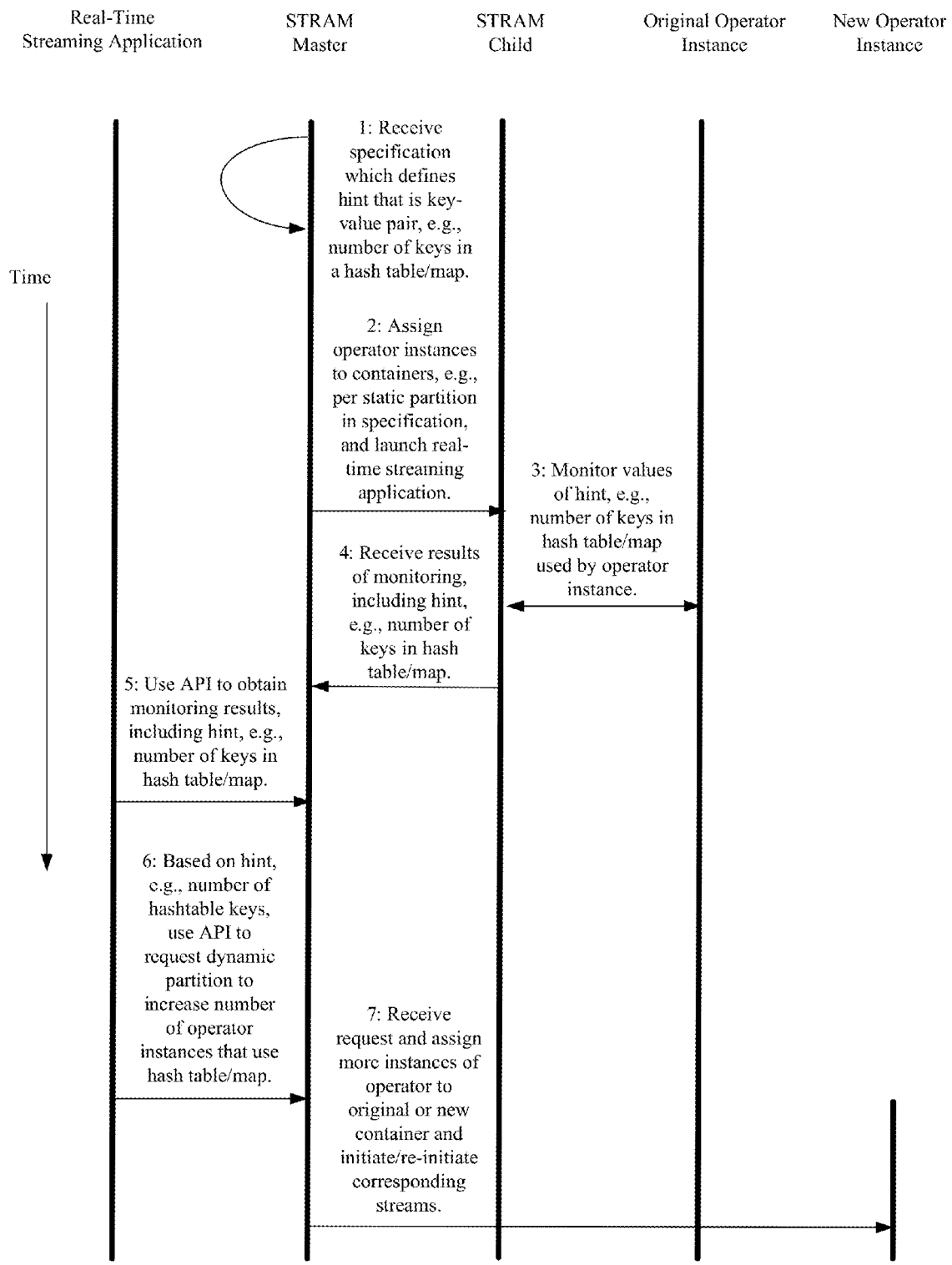
FIG. 23 is a sequence diagram that shows the components involved in creating a dynamic partition using a pre-defined hint, in accordance with an example embodiment.

FIG. 23 is a sequence diagram that shows the components involved in creating a dynamic partition using a pre-defined hint, in accordance with an example embodiment. It will be appreciated that this figure involves operations similar to those depicted in FIG. 22. As shown in FIG. 23, there might be four components involved in creating a dynamic partition using a pre-defined hint: (a) a real-time streaming application; (b) a STRAM; (c) a STRAM child; and (d) the operator instances. In operation 1, which is earliest in time, the STRAM receives a specification for a real-time streaming application which defines a hint that is key-value pair, e.g., the number of keys in a hash table/map used by an operator. In operation 2, the STRAM assigns operator instances to containers, e.g., per a static partition in the specification, and launches the real-time streaming application. In operation 3, a STRAM child monitors values of the hint, e.g., the number of keys in hash table/map used by operator instance. In operation 4, the STRAM receives the results of the monitoring (including the hint, e.g., the number of keys in hash table/map) from the STRAM child and, in operation 5, the real-time streaming application obtains the results using an API exposed by the distributed streaming platform. Based on the hint (e.g., the number of keys in hash table/map), the real-time streaming application uses the API to request that a dynamic partition to increase the number of operator instances (and the number of hash tables/maps, in an example embodiment), in operation 6. For example, the real-time streaming application might include logic (e.g., code) that requests a dynamic partition to increase the number of instances of an operator if the number of keys exceeds one million. Then in operation 7, the STRAM receives the request and assigns more instances of the operator to the original or a new container and initiates/re-initiates the corresponding streams as discussed above.

Here again, in an example embodiment, the dynamic partitioning in operation 7 might result in the creation of multiple instances (e.g., 3 instances) of the hash table/map, for example, if the hash table/map is local variable (e.g., on the thread stack) for the operator instance. Or the dynamic partitioning might result in no new additional instances of the hash table/map, for example, if the hash table/map is a global variable (e.g., container data) for the operator instance.

Figure 24:
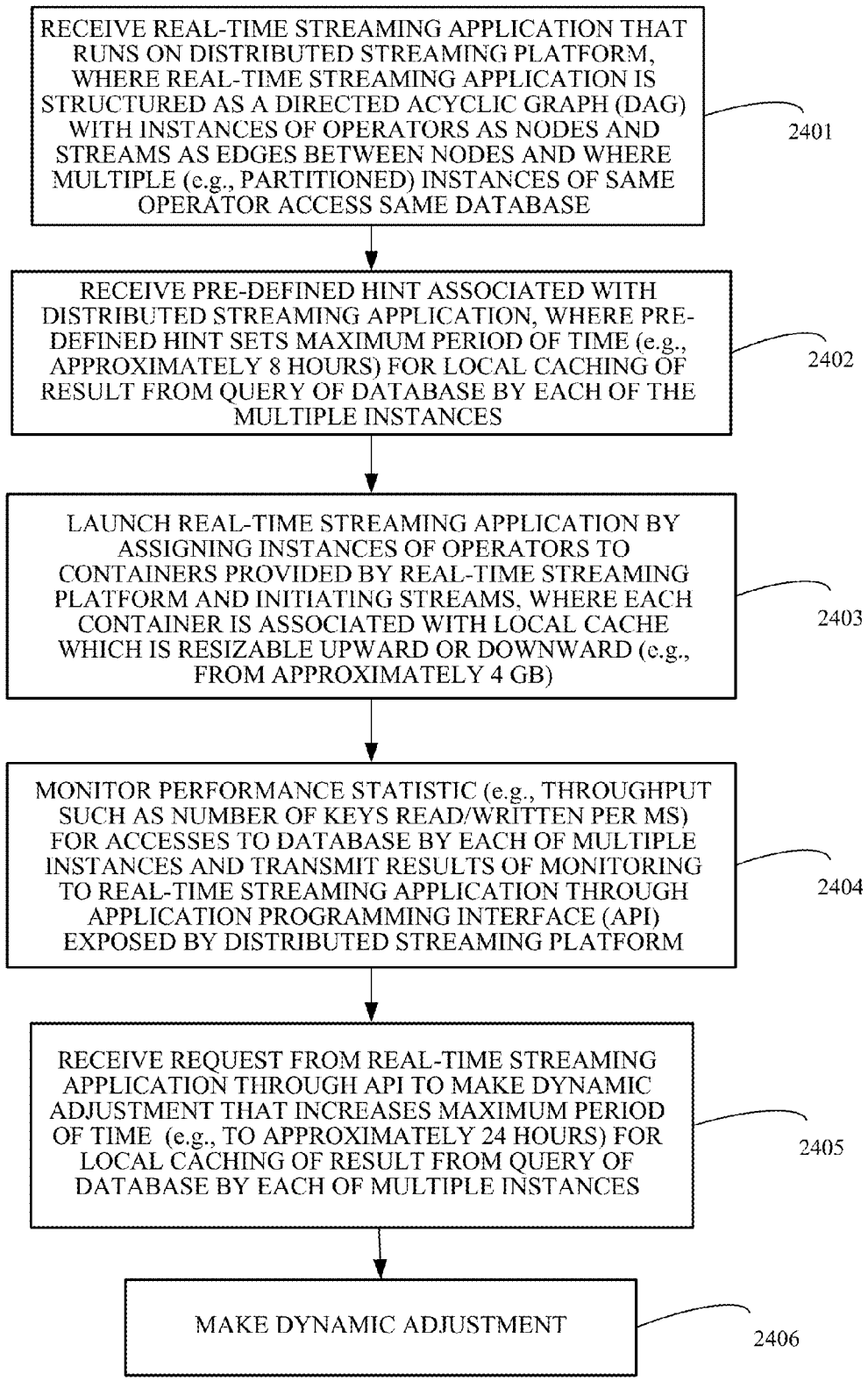
FIG. 24 is a flowchart diagram that illustrates a process using a scalable local cache in a container and a pre-defined hint, in accordance with an example embodiment.

FIG. 24 is a flowchart diagram that illustrates a process using a scalable local cache in a container and a pre-defined hint, in accordance with an example embodiment. In an example embodiment, this process might be performed by the Streaming Application Master (STRAM). In the same or an alternative embodiment, some or all of the operations of this process might be performed by a STRAM child (e.g., a slave) or other software in the distributed streaming platform.

As depicted in FIG. 24, the software (e.g., the STRAM) receives a real-time streaming application that runs on a distributed streaming platform, in operation 2401. The real-time streaming application is structured as a directed acyclic graph (DAG) with instances of operators as nodes and streams as edges between nodes. In an example embodiment, multiple (e.g., partitioned) instances of the same operator access the same database. In operation 2402, the software receives a pre-defined hint associated with the real-time steaming application, where the pre-defined hint sets a maximum period of time (e.g., approximately 8 hours) for local caching of a result from a query of the database by each of the multiple instances. Alternatively, the maximum period of time for local caching might be a default setting for the real-time streaming application. In operation 2403, the software launches the real-time streaming application by assigning instances of operators to containers provided by the distributed streaming platform and initiating streams. In an example embodiment, each container is associated with a local cache which is resizable upward or downward (e.g., from approximately 4 GB). Then in operation 2404, the software monitors a performance statistic (e.g., throughput such as number of bytes read per ms, number of bytes written per ms, number of keys read per ms, number of keys written per ms, etc.) for accesses to the database by each of the multiple instances and transmits the results of the monitoring to the real-time streaming application through an application programming interface (API) exposed by the distributed streaming platform. In an example embodiment, the number of keys read/written per ms might pertain to the keys in a key-value table/map (e.g., a social security number or SSN used as a key for a person's address). In operation 2405, the software receives a request from the real-time streaming application through the API to make a dynamic adjustment that increases the maximum period of time (e.g., to approximately 24 hours or more) for local caching of a result from a query of the database by each of multiple instances. And in operation 2406, the software makes the dynamic adjustment.

Here again, each of the operations in this process might be executed in real time or near real time rather than offline, in an example embodiment. Moreover, some of the operations described in the process (e.g., the operations following the original launch of the real-time streaming application) might be continuous or non-stop operations, in an example embodiment.

In an example embodiment, YARN might be used to create the local cache in each container, on an as-needed basis. It will be appreciated that such a local cache (e.g., a compute-local memory cache) differs from the traditional implementation of Memcached, which employs a client-server relationship with a relatively small number of servers providing memory caching services to a relatively large number of clients.

Figure 25:
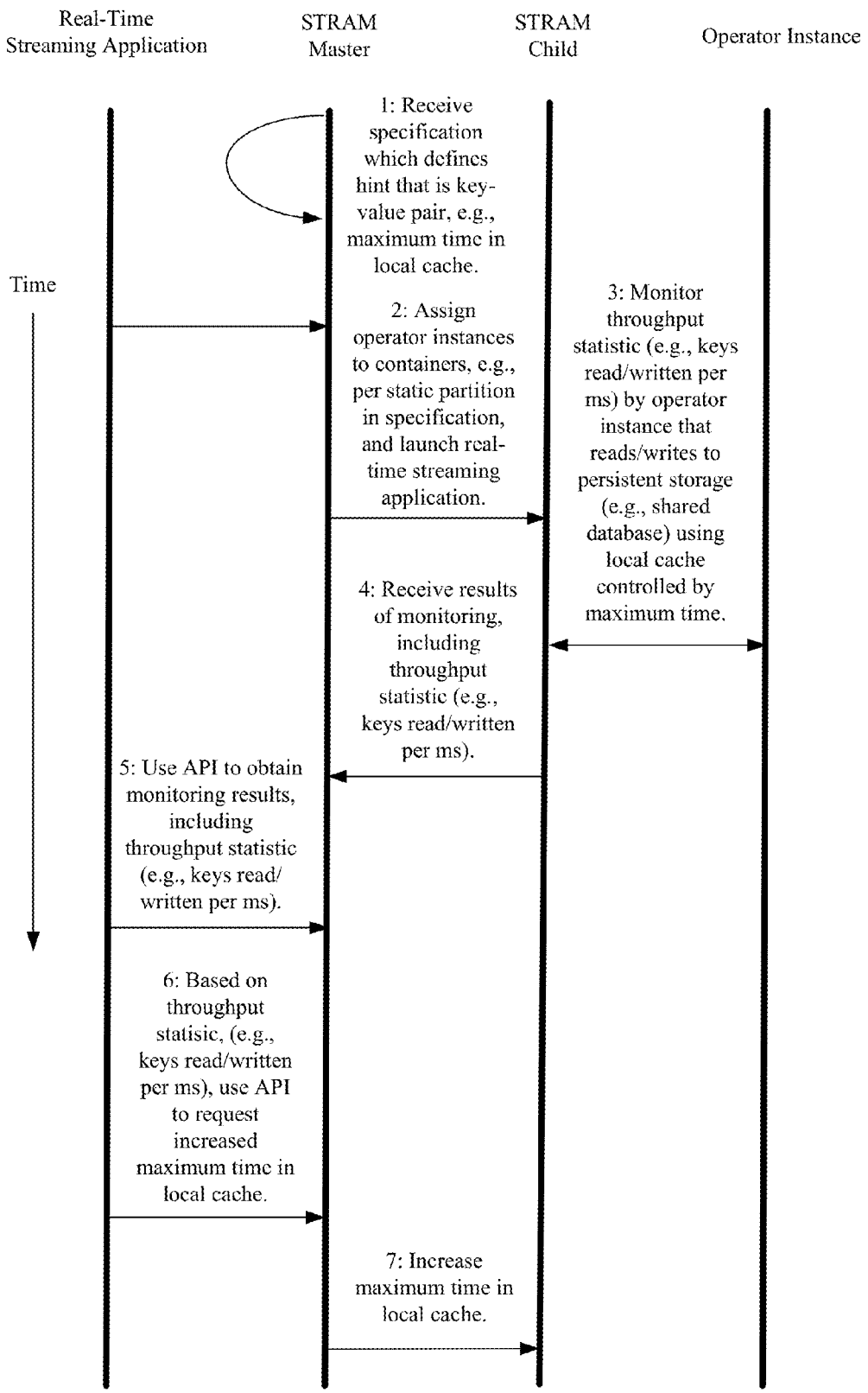
FIG. 25 is a sequence diagram that shows the components involved in a process using a scalable local cache in a container and a pre-defined hint, in accordance with an example embodiment.

FIG. 25 is a sequence diagram that shows the components involved in a process using a scalable local cache in a container and a pre-defined hint, in accordance with an example embodiment. It will be appreciated that this figure involves operations similar to those depicted in FIG. 24. As shown in FIG. 25, there might be four components involved in a process using a scalable local cache in a container and a pre-defined hint: (a) a real-time streaming application; (b) a STRAM; (c) a STRAM child; and (d) the operator instances. In operation 1, which is earliest in time, the STRAM receives a specification which defines a hint, e.g., maximum time in local cache. In operation 2, the STRAM assigns operator instances to containers, e.g., per a static partition in the specification, and launches the real-time streaming application. In operation 3, a STRAM child monitors a throughput statistic (e.g., number of keys read/written per ms) by an operator instance that reads/writes data to persistent storage (e.g., a database shared with other partitioned instances of the operator) using a local cache controlled by the maximum time. In operation 4, the STRAM receives the results of the monitoring (including a throughput statistic, e.g., number of keys read/written per ms) from the STRAM child and, in operation 5, the real-time streaming application obtains the results using an API exposed by the distributed streaming platform. Based on the hint (including the throughput statistic, e.g., number of keys read/written per ms), the real-time streaming application uses the API to request an increased maximum time in local cache, in operation 6. For example, the real-time streaming application might include logic (e.g., code) that requests an increased time in local cache if the number of keys read/written per ms (e.g., from the database) is greater than ten thousand keys per ms. Then in operation 7, the STRAM receives the request and increases the maximum time in local cache.

Figure 26:
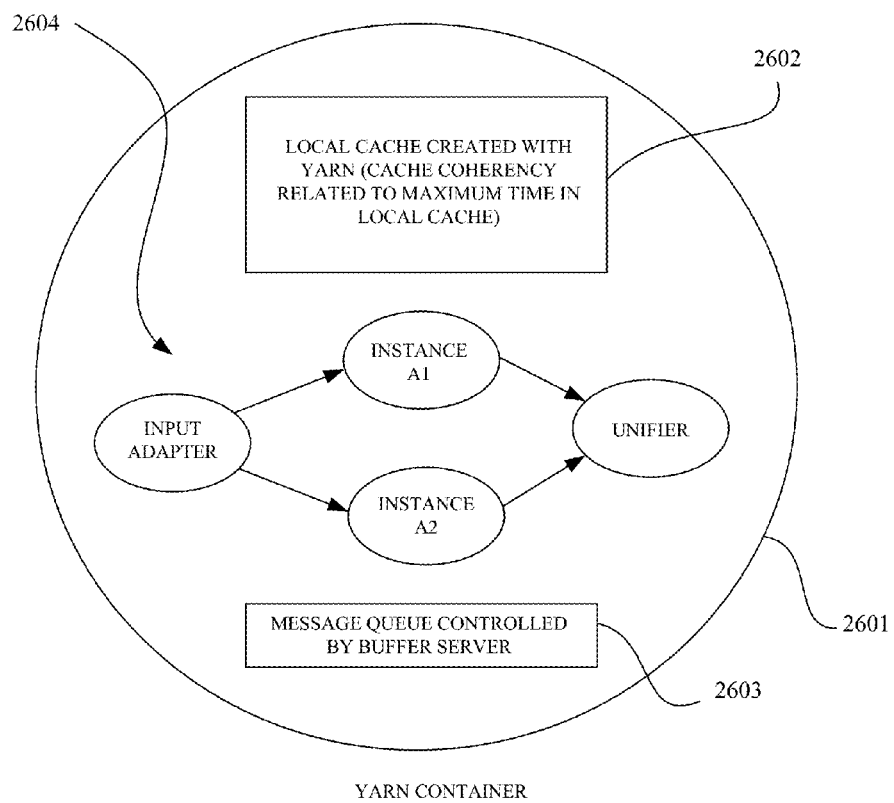
FIG. 26 is a diagram showing a scalable local cache in a container, in accordance with an example embodiment.

FIG. 26 is a diagram showing a scalable local cache in a container, in accordance with an example embodiment. As depicted in this figure, a YARN container 2601 includes two allocations of volatile memory (e.g., main memory): a local cache 2602 created with YARN and a message queue 2602 controlled by a buffer server (e.g., a thread). The container also includes a stream with two partitioned instances of an operator, Instance A1 and A2, which receive streaming windows from an input adapter and which transmit streaming windows to a unifier. In an example embodiment, each of the operator instances might read/write data to a shared persistent database (not shown) using local cache 2602. It will be appreciated that the cache coherency for the local cache is related to the maximum time in local cache. That is to say, as the maximum time in local cache increases, so does the probability of a stale value being in the local cache.

Figure 27:
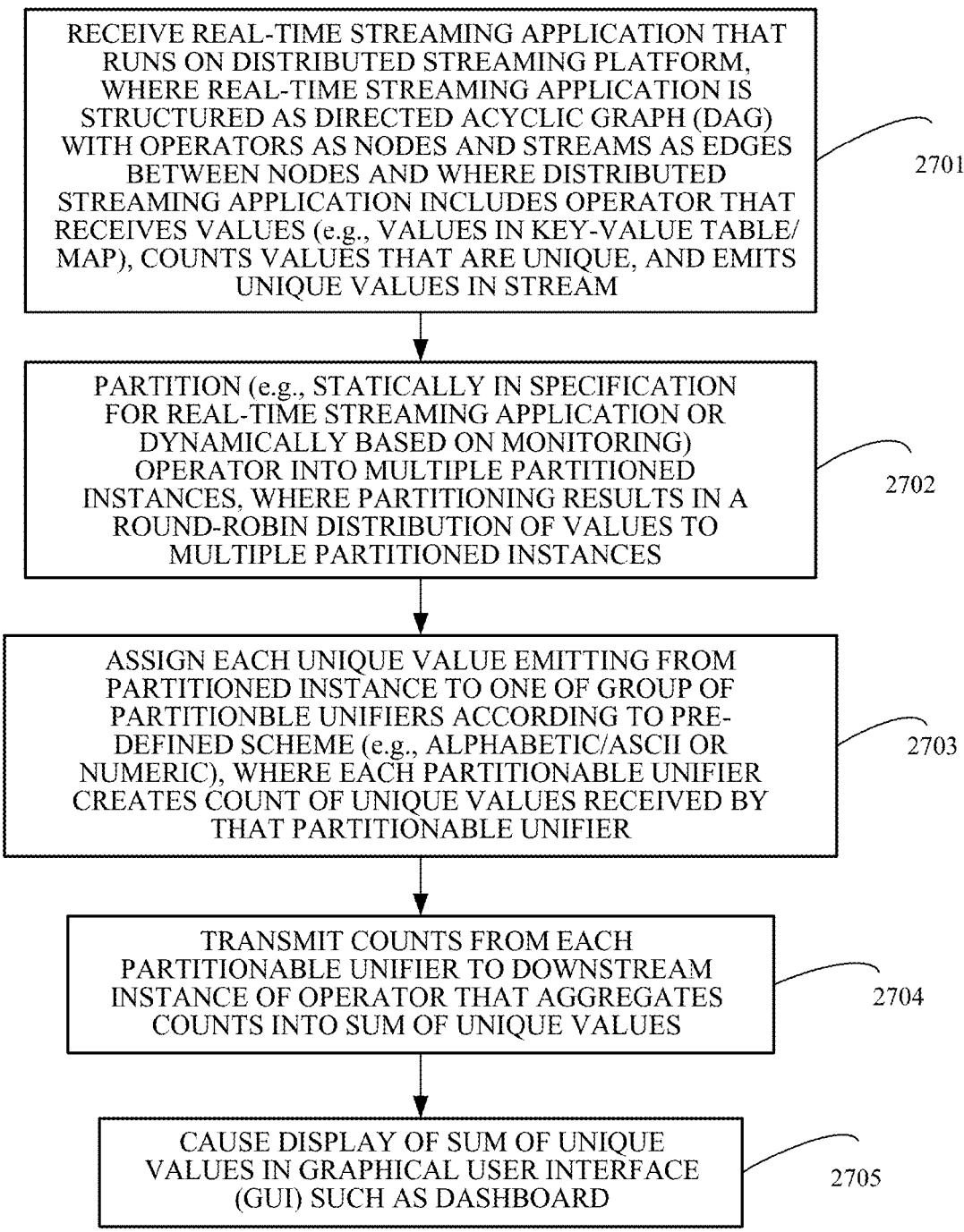
FIG. 27 is a flowchart diagram that illustrates a process using partitionable unifiers, in accordance with an example embodiment.

FIG. 27 is a flowchart diagram that illustrates a process using partitionable unifiers, in accordance with an example embodiment. In an example embodiment, this process might be performed by the Streaming Application Master (STRAM). In the same or an alternative embodiment, some or all of the operations of this process might be performed by a STRAM child (e.g., a slave) or other software in the distributed streaming platform.

As depicted in FIG. 27, the software (e.g., the STRAM) receives a real-time streaming application that runs on distributed streaming platform, in operation 2701. The real-time streaming application is structured as directed acyclic graph (DAG) with operators as nodes and streams as edges between nodes. In an example embodiment, the real-time streaming application includes an operator that receives values (e.g., values in key-value table/map), counts values that are unique (or distinct), and emits the unique values in a stream. In operation 2702, the software partitions (e.g., statically in a specification for the real-time streaming application or dynamically based on monitoring) the operator into multiple partitioned instances. In an example embodiment, the partitioning results in a round-robin distribution of values to the multiple partitioned instances. In operation 2703, the software assigns each unique value emitting from a partitioned instance to one of a group of unifiers according to a pre-defined scheme (e.g., alphabetic/ASCII or numeric). In an example embodiment, each partitionable unifier creates a count of the unique values received by that partitionable unifier. Then in operation 2704, the software transmits the counts from each of the partitionable unifiers to a downstream instance of an operator that aggregates the counts into a sum of unique values. And in operation 2705, the software causes the sum of unique values to be displayed in a graphical user interface (GUI) such as a dashboard.

Here again, each of the operations in this process might be executed in real time or near real time rather than offline, in an example embodiment. Moreover, some of the operations described in the process (e.g., the operations following the original launch of the real-time streaming application) might be continuous or non-stop operations, in an example embodiment.

Figure 28A:
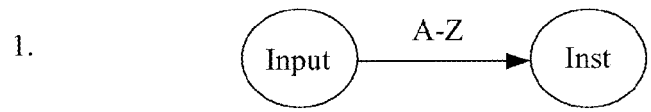
FIG. 28A is a diagram showing three use cases that do not use partitionable unifiers, in accordance with example embodiments.
Figure 28A:
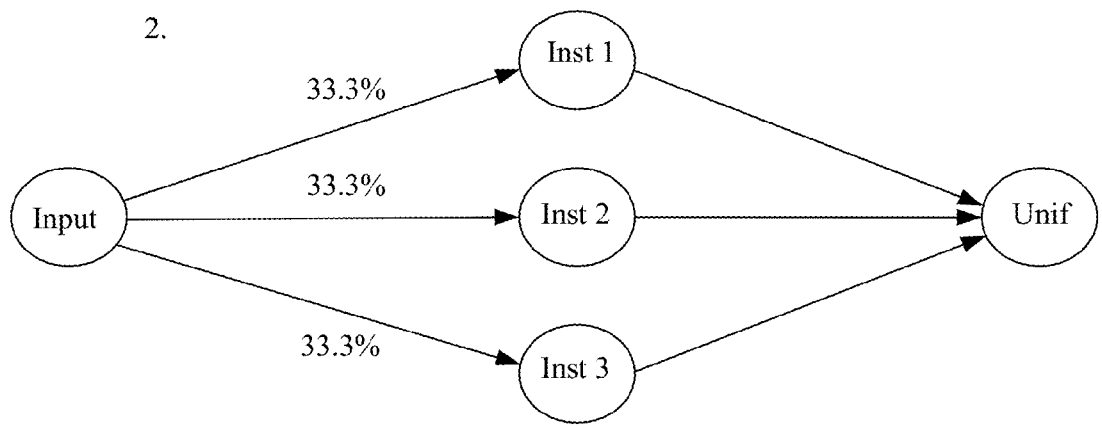
Figure 28A:
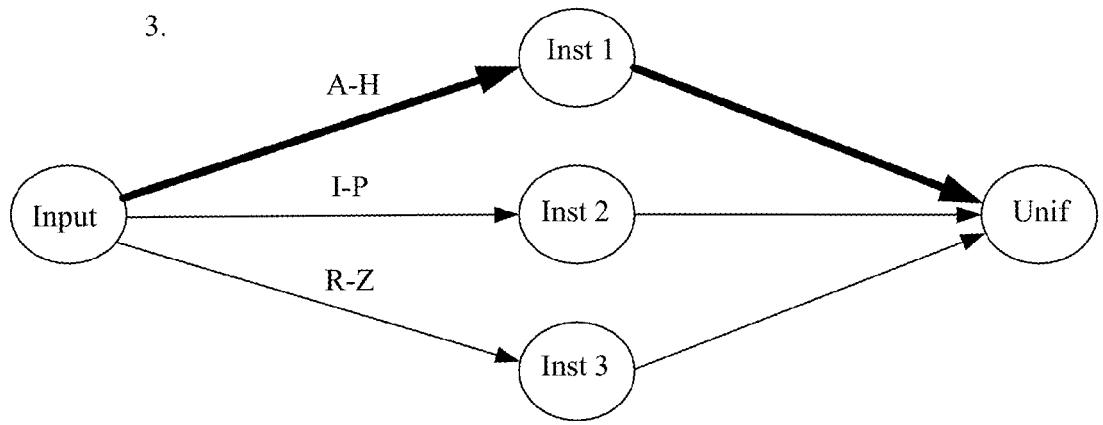

FIG. 28A is a diagram showing three use cases that do not use partitionable unifiers, in accordance with example embodiments. In use case 1 shown in this figure, no static or dynamic partition is used. So all of the values (e.g., alphabetic identifiers labeled "A-Z" in the figure, such as a series of surnames: Adams, Smith, Jones, Smith, Williams, Jones, . . . , Smith) stream from an input (e.g., an input adapter labeled "Input") to a single operator instance, labeled Inst. It will be appreciated that an accurate count of unique (or distinct) values can be obtained by a single operator instance. However, there is no parallelism (e.g., multiple instances of the same operator executing in parallel). And consequently, use case 1 does not scale to handle large series of values.

Use case 2 shown in FIG. 28A solves the scalability problem by using multiple instances (labeled "Inst 1", "Inst 2", and "Inst 3") of the same operator executing in parallel which transmit counts of unique values to a downstream operator (e.g., a unifier labeled "Unif") that sums the counts. In an example embodiment, the values are distributed between the three operator instances using a round-robin scheme that results in each operator instance receiving approximately 33.3% of the values. It will be appreciated that an accurate sum of unique values might not be obtained in this use case. For example, if the values include three values of the surname Smith and each of these values is distributed by the round-robin scheme to a different operator instance, this value will be reported as unique (or distinct) even though it is not.

Use case 3 shown in FIG. 28A also solves the scalability problem by using multiple instances (Inst 1, Inst 2, and Inst 3) of the same operator executing in parallel. In an example embodiment, the values are distributed between the three operator instances using a sticky-key partition based on the first letter (e.g., an ASCII char value or char) in a surname (e.g., a string/array of ASCII char values or chars). So surnames whose first letter is between A-H inclusive go to operator instance Inst 1, surnames whose first letter is between I-P inclusive go to operator instance Inst 2, and surnames whose first letter is between R-Z inclusive go to operator instance Inst 3. It will be appreciated that an accurate sum of unique values can be obtained in this use case. However, skewing might occur in this use case, as shown by the bold arrows going from the input to Inst 1 and from Inst 1 to the unifier, if the values being input show a skewed distribution (e.g., most of the input surnames have first letters between A-H inclusive).

Figure 28B:
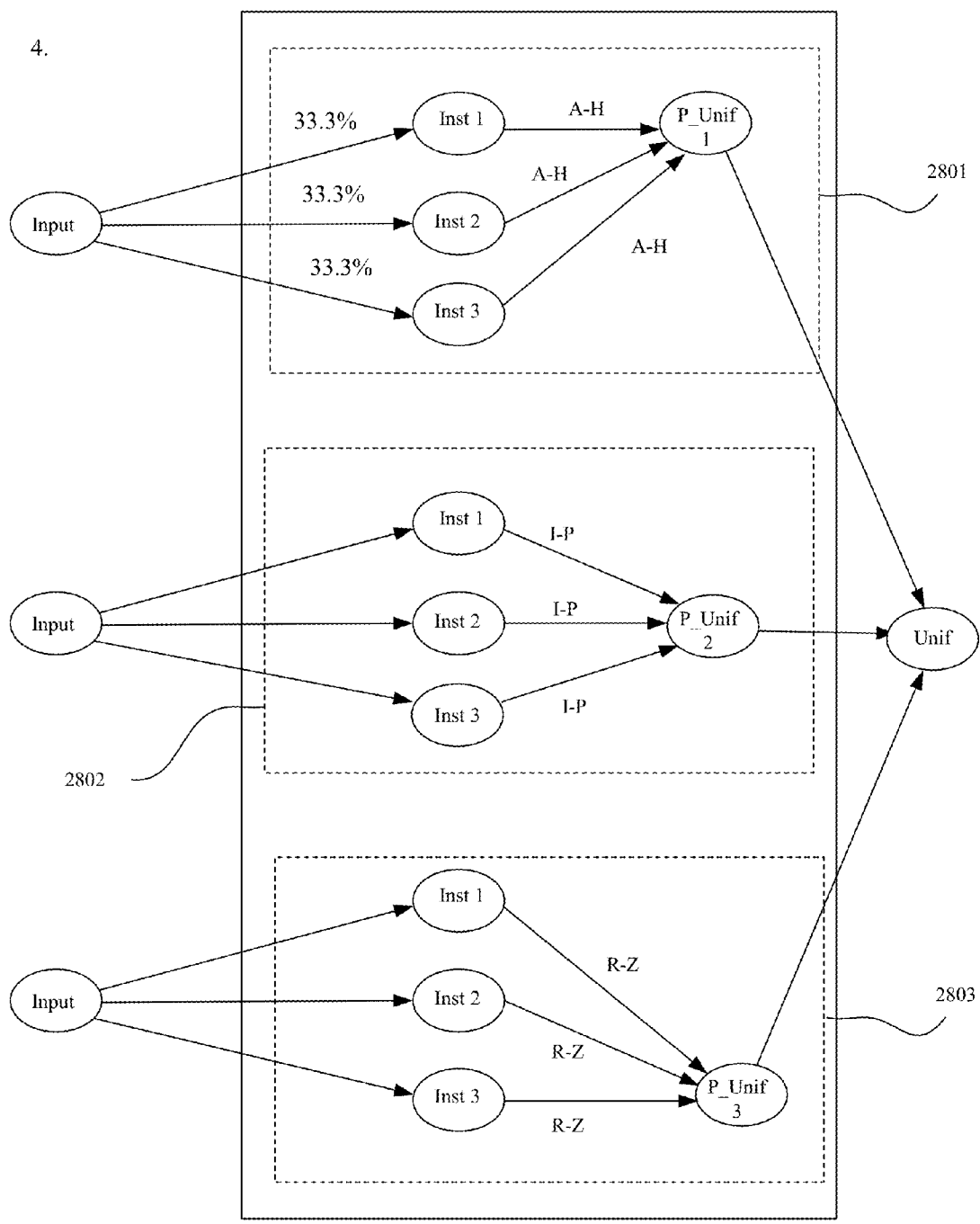
FIG. 28B is a diagram showing a use case that uses partitionable unifiers, in accordance with an example embodiment.

FIG. 28B is a diagram showing a use case that uses partitionable unifiers, in accordance with an example embodiment. It will be appreciated that this figure involves operations similar to those depicted in FIG. 27. To some extent, the functionality described in this use case combines the load-balancing of the functionality described in use case 2 with the sticky-key functionality described in use case 3. In use case 4 depicted in this figure, the values are distributed between the three operator instances (Inst 1, Inst 2, and Inst 3) using a round-robin scheme that results in each operator instance receiving approximately 33.3% of the values. Each of the operator instances keeps a count of unique values and emits those unique values to a group of partitionable unifiers (labeled "P_Unif 1", "P_Unif 2", and "P_Unif 3") using a sticky-key partition based on the first letter (e.g., an ASCII char value or char) in a surname (e.g., a string/array of ASCII char values or chars). So as shown in the topmost box labeled 2801, operator instances Inst 1, Inst 2, and Inst 3 each emit unique values of surnames beginning with a letter between A-H inclusive to partitionable unifier P_Unif 1. As shown in the middle box labeled 2802, operator instances Inst 1, Inst 2, and Inst 3 each emit unique values of surnames beginning with a letter between I-P inclusive to partitionable unifier P_Unif 2. And as shown in the bottommost box labeled 2803, operator instances Inst 1, Inst 2, and Inst 3 each emit unique values of surnames beginning with a letter between R-Z inclusive to partitionable unifier P_Unif 3. Each of the partitionable unifiers creates its own count of unique values and then transmits the count to a unifier (labeled "Unif") that sums the counts. In an example embodiment, the sum might replace the counts initially made by operator instance Inst 1, operator Inst 2, and operator Inst 3.

In FIG. 28B, the example uses surnames (e.g., a string/array of ASCII char values or chars) as the values input to the partitioned operator instances. This example is not meant to be limiting. In the same or an alternative embodiment, the values input to the partitioned operator instances might be integers, floating point numbers, enumerated values, or any other ordinal values, whether individually or in a collection such as an array or list. It will be appreciated that partitionable unifiers, as described in FIGS. 27 and 28B, allow the computation of unique (or distinct) values in a scalable and distributed fashion.

In an example embodiment, the operations described in FIGS. 27 and 28B might be implemented as platform functionality. In such an embodiment, the sticky-key partition amongst the partitionable unifiers might be performed using a function call, e.g., Get_Partionable_Unifier_Key.

Though some of the embodiments described above have involved a stock ticker, they are intended as illustrative rather than limiting. In another example embodiment, some or all of the operations described above might be used with online machine learning (including online active learning) where predictions are compared with subsequent feedback received from a data stream (e.g., a stock ticker) or a human classifier/labeler. Or some or all of the operations described above might be used to provide pricing in real time to a stock exchange, an advertising exchange, or other online market. Also, some or all of the operations described above might be used for analyzing websites, targeting ads, recommending goods or services, providing search results or other responses to queries, geo-positioning including geo-location, inventory analysis, online gaming including social gaming, network routing including routing in wireless networks, etc. Or some or all of the operations described above might be used for security including fraud detection, outage detection (e.g., in a data center), or other analyses of event data (including sensor data), in real time.

In an example embodiment, advertising models that use bidding mechanisms can also benefit from near real-time performance analysis, which enables buyers and sellers to make faster changes to ad pricing or inventory adjustments.

Returning to FIG. 1, personal computer 102 and the servers in website 104 and website 105 might include (1) hardware consisting of one or more microprocessors (e.g., from the x86 family, the PowerPC family, the ARM family, etc.), volatile storage (e.g., RAM), and persistent storage (e.g., a hard disk or solid-state drive), and (2) an operating system (e.g., Linux, Windows Server, Mac OS Server, Windows, Mac OS, etc.) that runs on the hardware. Similarly, in an example embodiment, mobile device 103 might include (1) hardware consisting of one or more microprocessors (e.g., from the ARM family, the x86 family, etc.), volatile storage (e.g., RAM), and persistent storage (e.g., flash memory such as microSD) and (2) an operating system (e.g., Symbian OS, RIM BlackBerry OS, iPhone OS, Palm webOS, Windows Mobile, Android, Linux, etc.) that runs on the hardware.

Also in an example embodiment, personal computer 102 and mobile device 103 might each include a browser as an application program or as part of an operating system. Examples of browsers that might execute on personal computer 102 include Internet Explorer, Mozilla Firefox, Safari, and Google Chrome. Examples of browsers that might execute on mobile device 103 include Safari, Mozilla Firefox, Android Browser, and Palm webOS Browser. It will be appreciated that users of personal computer 102 and mobile device 103 might use browsers to communicate (e.g., through a graphical user interface or GUI) with website software running on the servers at website 104. Alternatively, a users of personal computer 102 and mobile device 103 might communicate with website 104 directly or indirectly (e.g., using a script) through a command line interface (CLI).

It will be appreciated that the above example embodiments include functionality that (1) enables a slave (e.g., STRAM Child) to monitor operator instances in the slave's container and effectuate dynamic adjustments ordered by the STRAM; (2) generates streaming windows using control tuples inserted by an input adapter that creates data tuples from an external data stream through the application of a schema; (3) displays data from data tuples in a GUI view using an output adapter that removes control tuples; and (4) supports checkpointing on streaming window boundaries using checkpoint tuples inserted by an input adapter.

With the above embodiments in mind, it should be understood that the inventions might employ various computer-implemented operations involving data stored in computer systems. Any of the operations described herein that form part of the inventions are useful machine operations. The inventions also relate to a device or an apparatus for performing these operations. The apparatus may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. For example, some or all of the processes described above might be used with streaming media such as streaming audio or streaming video. Or the hardware for the distributed streaming platform might include a quantum computer (e.g., D-Wave System's quantum computer), along with or instead of traditional servers (e.g., in the x86 or ARM families). Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

The example embodiments described in this disclosure include the following: (1) a method, comprising the operations of: launching an application that runs on a streaming platform, wherein the application is structured as a directed acyclic graph (DAG) with instances of operators as nodes and streams as edges between nodes; receiving an indication that a first instance of an operator is I/O bound, wherein a stream connects the first instance of an operator to a second instance of another operator in a single container provided by the streaming platform; transmitting the indication to the application and receiving a request to combine the first instance with the second instance into a single third instance of an operator; and creating the third instance and re-initiating the stream using a recovery policy, wherein each of the operations is executed by one or more processors in real time or near real time rather than offline; (2) a method as in (1), wherein the instances of operators are program instructions and the streams are unbound sequences of streaming windows that are ordered in terms of time; (3) a method as in (2), wherein each streaming window is an atomic microbatch of sequential structured tuples; (4) a method as in (1), wherein the indication includes a platform measurement as to resource use; (5) a method as in (4), wherein the platform measurement is throughput of streaming windows; (6) a method as in (4), wherein the platform measurement is throughput of tuples; (7) a method as in (1), wherein the third instance is created at least in part through compiler in-lining; (8) a method as in (1), wherein the request sets an attribute of the stream; (9) one or more computer-readable media persistently storing one or more programs, wherein the one or more programs, when executed, instruct one or more processors to perform the following operations: launch an application that runs on a streaming platform, wherein the application is structured as a directed acyclic graph (DAG) with instances of operators as nodes and streams as edges between nodes; receive an indication that a first operator instance is I/O bound, wherein a stream connects the first operator instance to a second operator instance in a single container provided by the streaming platform; transmit the indication to the application and receive a request to combine the first operator with the second operator instance into a single third operator instance; and create the third operator instance and re-initiate the stream using a recovery policy, wherein each of the operations is executed in real time or near real time rather than offline; (10) computer-readable media as in (9), wherein the operators are program instructions and the streams are unbound sequences of streaming windows that are ordered in terms of time; (11) computer-readable media as in (10), wherein each streaming window is an atomic microbatch of sequential structured tuples; (12) computer-readable media as in (9), wherein the indication includes a platform measurement as to resource use; (13) computer-readable media as in (12), wherein the platform measurement is throughput of streaming windows; (14) computer-readable media as in (12), wherein the platform measurement is throughput of tuples; (15) computer-readable media as in (9), wherein the third instance is created at least in part through compiler in-lining; (16) computer-readable media as in (9), wherein the request sets an attribute of the stream; (17) a method, comprising the operations of: launching an application that runs on a streaming platform, wherein the application is structured as a directed acyclic graph (DAG) with instances of operators as nodes and streams as edges between nodes; receiving an indication that a first operator instance is I/O bound, wherein a stream connects the first operator instance to a second operator instance in a single container provided by the streaming platform; transmitting the indication to the application and receiving a request to combine the first operator with the second operator instance into a single third operator instance, wherein the request sets an attribute on a stream; and creating the third operator instance and re-initiate the stream, wherein each of the operations is executed by one or more processors in real time or near real time rather than offline; (18) a method as in (17), wherein the indication includes a platform measurement as to resource use; (19) a method as in (18), wherein the platform measurement is throughput of tuples; (20) a method as in (17), wherein the third instance is created at least in part through compiler in-lining.

The example embodiments described in this disclosure further include the following: (1) a method, comprising the operations of: receiving an application that runs on a streaming platform, wherein the application is structured as a directed acyclic graph (DAG) with instances of operators as nodes and streams as edges between nodes and wherein the application is associated with a pre-defined hint that is a key-value pair; launching the application by assigning the instances of operators to containers provided by streaming platform and initiating the streams; reading a value for the pre-defined hint and transmitting the value to the application through an application programming interface (API) exposed by the streaming platform; receiving a request from the application through the API to make a dynamic adjustment; and making the dynamic adjustment and re-launching the application using a recovery policy, wherein each of the operations is executed by one or more processors in real time or near real time rather than offline; (2) a method as in (1), wherein the instances of operators are program instructions and the streams are unbound sequences of streaming windows that are ordered in terms of time; (3) a method as in (2), wherein each streaming window is an atomic microbatch of sequential structured tuples; (4) a method as in (1), wherein the dynamic adjustment includes a dynamic partition of an instance of an operator into a plurality of instances; (5) a method as in (4), wherein the instance of the operator reads from and/or writes to a hash table or hash map associated with the instance; (6) a method as in (5), wherein the pre-defined hint is a count of entries in the hash table or hash map; (7) a method as in (6), wherein the application makes the request upon determining that the count exceeds a limit that is pre-defined; (8) a method as in (6), wherein the application makes the request upon determining that the count exceeds a limit that is dynamically determined; (9) one or more computer-readable media persistently storing one or more programs, wherein the one or more programs, when executed, instruct one or more processors to perform the following operations: receive an application that runs on a streaming platform, wherein the application is structured as a directed acyclic graph (DAG) with instances of operators as nodes and streams as edges between nodes and wherein the application is associated with a pre-defined hint that is a key-value pair; launch the application by assigning the instances of operators to containers provided by streaming platform and initiate the streams; read a value for the pre-defined hint and transmitting the value to the application through an application programming interface (API) exposed by the streaming platform; receive a request from the application through the API to make a dynamic adjustment; and make the dynamic adjustment and re-launching the application using a recovery policy, wherein each of the operations is executed in real time or near real time rather than offline; (10) computer-readable media as in (9), wherein the instances of operators are program instructions and the streams are unbound sequences of streaming windows that are ordered in terms of time; (11) computer-readable media as in (10), wherein each streaming window is an atomic microbatch of sequential structured tuples; (12) computer-readable media as in (9), wherein the dynamic adjustment includes a dynamic partition of an instance of an operator into a plurality of instances; (13) computer-readable media as in (12), wherein the instance of the operator reads from and/or writes to a hash table or hash map associated with the instance; (14) computer-readable media as in (13), wherein the pre-defined hint is a count of entries in the hash table or hash map; (15) computer-readable media as in (14), wherein the application makes the request upon determining that the count exceeds a limit that is pre-defined; (16) computer-readable media as in (14), wherein the application makes the request upon determining that the count exceeds a limit that is dynamically determined; (17) a method, comprising the operations of: receiving an application that runs on a streaming platform, wherein the application is structured as a directed acyclic graph (DAG) with instances of operators as nodes and streams as edges between nodes and wherein the application is associated with a pre-defined hint; launching the application by assigning the instances of operators to containers provided by streaming platform and initiating the streams; reading a value for the pre-defined hint and transmitting the value to the application through an application programming interface (API) exposed by the streaming platform; receiving a request from the application through the API to make a dynamic adjustment; and making the dynamic adjustment and re-launching the application, wherein the dynamic adjustment includes a dynamic partition of an instance of an operator into a plurality of instances and wherein each of the operations is executed by one or more processors in real time or near real time rather than offline; (18) a method as in (17), wherein the instance of the operator reads from and/or writes to a hash table or hash map associated with the instance; (19) a method as in 18, wherein the pre-defined hint is a count of entries in the hash table or hash map; and (20) a method as in 19, wherein the application makes the request upon determining that the count exceeds a limit that is pre-defined.

And the example embodiments described in this disclosure further include the following: (1) a method, comprising the operations of: receiving an application that runs on a streaming platform, wherein the application is structured as a directed acyclic graph (DAG) with instances of operators as nodes and streams as edges between nodes and wherein multiple instances of an operator access a shared database; receiving a pre-defined hint associated with the application, wherein the pre-defined hint sets a maximum period of time for local caching of a result from a query of the database by each of the multiple instances; launching the application by assigning the instances of operators to one or more containers provided by the streaming platform and initiating the streams, wherein each container is associated with a local cache; monitoring a performance statistic for accesses to the database by each of the multiple instances and transmitting results of the monitoring to the application through an application programming interface (API) exposed by the streaming platform; receiving a request from the application through the API to make a dynamic adjustment that increases the maximum period of time for local caching of a result from a query of the database by each of the multiple instances; and making the dynamic adjustment and re-launching the application using a recovery policy, wherein each of the operations is executed by one or more processors in real time or near real time rather than offline; (2) a method as in (1), wherein the instances of operators are program instructions and the streams are unbound sequences of streaming windows that are ordered in terms of time; (3) a method as in (2), wherein each streaming window is an atomic microbatch of sequential structured tuples; (4) a method as in (1), wherein the local cache is resizable upward or downward; (5) a method as in (1), wherein the performance statistic measures throughput; (6) a method as in (1), wherein the performance statistic measures keys read; (7) a method as in (1), wherein the performance statistic measures keys written; (8) one or more computer-readable media persistently storing one or more programs, wherein the one or more programs, when executed, instruct one or more processors to perform the following operations: receive an application that runs on a streaming platform, wherein the application is structured as a directed acyclic graph (DAG) with instances of operators as nodes and streams as edges between nodes and wherein multiple instances of an operator access a shared database; receive a pre-defined hint associated with the application, wherein the pre-defined hint sets a maximum period of time for local caching of a result from a query of the database by each of the multiple instances; launch the application by assigning the instances of operators to one or more containers provided by the streaming platform and initiating the streams, wherein each container is associated with a local cache; monitor a performance statistic for accesses to the database by each of the multiple instances and transmit results of the monitoring to the application through an application programming interface (API) exposed by the streaming platform; receive a request from the application through the API to make a dynamic adjustment that increases the maximum period of time for local caching of a result from a query of the database by each of the multiple instances; and make the dynamic adjustment and re-launch the application using a recovery policy, wherein each of the operations is executed in real time or near real time rather than offline; (9) computer-readable media as in (8), wherein the instances of operators are program instructions and the streams are unbound sequences of streaming windows that are ordered in terms of time; (10) computer-readable media as in (9), wherein each streaming window is an atomic microbatch of sequential structured tuples; (11) computer-readable media as in (8), wherein the local cache is resizable upward or downward; (12) computer-readable media as in (8), wherein the performance statistic measures throughput; (13) computer-readable media as in (8), wherein the performance statistic measures keys read; (14) computer-readable media as in (8), wherein the performance statistic measures keys written; (15) a method, comprising the operations of: receiving an application that runs on a streaming platform, wherein the application is structured as a directed acyclic graph (DAG) with instances of operators as nodes and streams as edges between nodes and wherein multiple instances of an operator access a shared database; receiving a pre-defined hint associated with the application, wherein the pre-defined hint sets a maximum period of time for local caching of a result from a query of the database by each of the multiple instances; launching the application by assigning the instances of operators to one or more containers provided by the streaming platform and initiating the streams, wherein each container is associated with a local cache which is resizable upward or downward; monitoring a performance statistic for accesses to the database by each of the multiple instances and transmitting results of the monitoring to the application through an application programming interface (API) exposed by the streaming platform; receiving a request from the application through the API to make a dynamic adjustment that increases the maximum period of time for local caching of a result from a query of the database by each of the multiple instances; and making the dynamic adjustment and re-launching the application, wherein each of the operations is executed by one or more processors in real time or near real time rather than offline; (16) a method such as (15), wherein the instances of operators are program instructions and the streams are unbound sequences of streaming windows that are ordered in terms of time; (17) a method such as (16), wherein each streaming window is an atomic microbatch of sequential structured tuples; (18) a method such as (15), wherein the performance statistic measures throughput; (19) a method such as (15), wherein the performance statistic measures keys read; and (20) a method such as (15), wherein the performance statistic measures keys written.

What is claimed is:

1. A method, comprising the operations of:
   receiving an application that runs on a distributed streaming platform, wherein the application is structured as a directed acyclic graph (DAG) with operators as nodes and streams as edges between nodes and wherein the application includes an operator that receives a plurality of values, counts the values that are unique, and emits the unique values in a stream;
   partitioning an instance of the operator into at least two partitioned instances, wherein the partitioning is dynamic partitioning at run-time based on results of monitoring throughput through the instance and determining that the instance is a bottleneck;
   assigning a unique value emitting from a partitioned instance to one of a plurality of unifiers according to a pre-defined scheme, wherein each unifier creates a count of the unique values received by the unifier;
   transmitting the counts from each of the unifiers to a downstream instance of an operator that aggregates the counts into a sum; and
   displaying the sum in a graphical user interface (GUI), wherein the distributed streaming platform is integrated with a distributed computing framework that includes functionality for handling distributed computations that are not structured as batch jobs for Map-Reduce processing and wherein each of the operations is executed by one or more processors in real time or near real time rather than offline.

2. A method as in claim 1, wherein the instances of operators are program instructions and the streams are unbound sequences of streaming windows that are ordered in terms of time.

3. A method as in claim 2, wherein each streaming window is an atomic sequence of sequential structured tuples.

4. A method as in claim 1, wherein monitoring throughput includes monitoring ordinal streaming window identifiers.

5. A method as in claim 1, wherein the partitioning is a sticky-key partition.

6. A method as in claim 1, wherein the pre-defined scheme is ASCII.

7. A method as in claim 1, wherein the pre-defined scheme is numerical.

8. A method as in claim 1, wherein the partitioning results in a round-robin distribution of values to the partitioned instances.

9. A method as in claim 1, wherein the values are values in a key-value table or a key-value map.

10. One or more computer-readable media that are non-transitory and that store one or more programs, wherein the one or more programs, when executed, instruct one or more processors to perform the following operations:
    receive an application that runs on a distributed streaming platform, wherein the application is structured as a directed acyclic graph (DAG) with operators as nodes and streams as edges between nodes and wherein the application includes an operator that receives a plurality of values, counts the values that are unique, and emits the unique values in a stream;
    partition an instance of the operator into at least two partitioned instances, wherein the partitioning is dynamic partitioning at run-time based on results of monitoring throughput through the instance and determining that the instance is a bottleneck;
    assign a unique value emitting from a partitioned instance to one of a plurality of unifiers according to a pre-defined scheme, wherein each unifier creates a count of the unique values received by the unifier;
    transmit the counts from each of the unifiers to a downstream instance of an operator that aggregates the counts into a sum; and
    display the sum in a graphical user interface (GUI), wherein the distributed streaming platform is integrated with a distributed computing framework that includes functionality for handling distributed computations that are not structured as batch jobs for Map-Reduce processing and wherein each of the operations is executed in real time or near real time rather than offline.

11. The computer-readable media as in claim 10, wherein the instances of operators are program instructions and the streams are unbound sequences of streaming windows that are ordered in terms of time.

12. The computer-readable media as in claim 11, wherein each streaming window is an atomic sequence of sequential structured tuples.

13. The computer-readable media as in claim 10, wherein monitoring throughput includes monitoring ordinal streaming window identifiers.

14. The computer-readable media as in claim 10, wherein the partitioning is a sticky-key partition.

15. The computer-readable media as in claim 10, wherein the pre-defined scheme is ASCII.

16. The computer-readable media as in claim 10, wherein the pre-defined scheme is numerical.

17. The computer-readable media as in claim 10, wherein the partitioning results in a round-robin distribution of values to the partitioned instances.

18. The computer-readable media as in claim 10, wherein the values are values in a key-value table or a key-value map.

19. A method, comprising the operations of:
    receiving an application that runs on a distributed streaming platform, wherein the application is structured as a directed acyclic graph (DAG) with operators as nodes and streams as edges between nodes and wherein the application includes an operator that receives a plurality of values, counts the values that are unique, and emits the unique values in a stream;

partitioning an instance of the operator into at least two partitioned instances, wherein the partitioning is dynamic partitioning at run-time based on results of monitoring throughput through the instance and determining that the instance is a bottleneck and the partitioning results in a round-robin distribution of values to the partitioned instances;

assigning a unique value emitting from a partitioned instance to one of a plurality of unifiers according to a pre-defined scheme, wherein each unifier creates a count of the unique values received by the unifier;

transmitting the counts from each of the unifiers to a downstream instance of an operator that aggregates the counts into a sum; and displaying the sum in a graphical user interface (GUI), wherein the distributed streaming platform is integrated with a distributed computing framework that includes functionality for handling distributed computations that are not structured as batch jobs for Map-Reduce processing and wherein each of the operations is executed by one or more processors in real time or near real time rather than offline.

20. A method as in claim 19, wherein the pre-defined scheme is ASCII.

* * * * *